United States Patent
Lee et al.

(10) Patent No.: US 12,132,792 B2
(45) Date of Patent: *Oct. 29, 2024

(54) METHOD AND ELECTRONIC DEVICE FOR PROVIDING MULTI-ACCESS EDGE COMPUTING SERVICE USING MULTI-ACCESS EDGE COMPUTING DISCOVERY

(71) Applicant: Samsung Electronics Co., Ltd., Suwon-si (KR)

(72) Inventors: Wonbo Lee, Suwon-si (KR); Youngki Hong, Suwon-si (KR); Sangcheol Lee, Suwon-si (KR); Songyean Cho, Suwon-si (KR); Jungsam Kim, Suwon-si (KR); Sojeong Park, Suwon-si (KR); Jangwoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 14 days.

This patent is subject to a terminal disclaimer.

(21) Appl. No.: 17/486,793

(22) Filed: Sep. 27, 2021

(65) Prior Publication Data
US 2022/0014595 A1  Jan. 13, 2022

Related U.S. Application Data

(63) Continuation of application No. 16/938,824, filed on Jul. 24, 2020, now Pat. No. 11,134,127, which is a
(Continued)

(30) Foreign Application Priority Data

| Jul. 13, 2018 | (KR) | 10-2018-0081919 |
| Feb. 18, 2019 | (KR) | 10-2019-0018833 |
| Jul. 15, 2019 | (KR) | 10-2019-0085343 |

(51) Int. Cl.
H04L 67/51 (2022.01)
H04L 61/4511 (2022.01)
(Continued)

(52) U.S. Cl.
CPC .......... H04L 67/51 (2022.05); H04L 61/4511 (2022.05); H04L 67/01 (2022.05); H04L 67/52 (2022.05); H04L 67/561 (2022.05)

(58) Field of Classification Search
CPC ..... H04L 67/16; H04L 61/1511; H04L 67/18; H04L 67/2804; H04L 67/42
(Continued)

(56) References Cited

U.S. PATENT DOCUMENTS

| 9,548,982 B1 | 1/2017 | Karunakaran et al. |
| 10,194,320 B1 | 1/2019 | Egner et al. |

(Continued)

FOREIGN PATENT DOCUMENTS

| CN | 101069402 A | 11/2007 |
| CN | 102763395 A | 10/2012 |

(Continued)

OTHER PUBLICATIONS

ETSI, GS MEC 016 V1.1.1, Sep. 2017 (Year: 2017).*
(Continued)

*Primary Examiner* — Hee Soo Kim

(57) ABSTRACT

Various embodiments of the present invention provide a method and electronic device for supporting an edge computing service (e.g., a multi-access edge computing (MEC) service). An electronic device according to various embodiments comprises a network interface, and a processor, wherein the processor is configured to: acquire, using the network interface, information relating to applications which can be provided within a base station or to at least one external server connectable through the base station by the
(Continued)

at least one external server; select an external server including an application corresponding to a specified condition, on the basis of the information relating to the applications; and perform data transmission with the selected external server. Various embodiments are possible.

20 Claims, 44 Drawing Sheets

Related U.S. Application Data continuation of application No. PCT/KR2019/008730, filed on Jul. 15, 2019.

(60) Provisional application No. 62/826,275, filed on Mar. 29, 2019.

(51) Int. Cl.
*H04L 67/01* (2022.01)
*H04L 67/52* (2022.01)
*H04L 67/561* (2022.01)

(58) Field of Classification Search
USPC .......................................................... 709/203
See application file for complete search history.

(56) References Cited

U.S. PATENT DOCUMENTS

| | | |
|---|---|---|
| 11,711,678 B2 | 7/2023 | Sabella et al. |
| 11,765,584 B2 | 9/2023 | Yuan et al. |
| 11,838,756 B2 | 12/2023 | Li et al. |
| 11,909,845 B2 | 2/2024 | Shim et al. |
| 11,936,654 B2 | 3/2024 | Hu et al. |
| 2005/0265327 A1 | 12/2005 | Buch et al. |
| 2008/0127320 A1 | 5/2008 | De Lutiis et al. |
| 2010/0275248 A1 | 10/2010 | Li |
| 2011/0171953 A1 | 7/2011 | Faccin et al. |
| 2011/0202988 A1 | 8/2011 | Otranen et al. |
| 2013/0007858 A1 | 1/2013 | Shah et al. |
| 2013/0080613 A1 | 3/2013 | Thireault |
| 2014/0351915 A1 | 11/2014 | Otranen et al. |
| 2015/0189014 A1 | 7/2015 | Grunenberger |
| 2016/0254918 A1 | 9/2016 | Liu et al. |
| 2016/0269285 A1 | 9/2016 | Herrero et al. |
| 2017/0048876 A1 | 2/2017 | Mahindra et al. |
| 2017/0063836 A1 | 3/2017 | Cui |
| 2017/0118311 A1* | 4/2017 | Frydman ................. H04L 67/42 |
| 2018/0049179 A1* | 2/2018 | Shah ........................ H04L 67/12 |
| 2018/0146360 A1 | 5/2018 | Uchiyama |
| 2018/0183855 A1* | 6/2018 | Sabella ................. G06F 9/5027 |
| 2018/0192471 A1 | 7/2018 | Li et al. |
| 2018/0242204 A1 | 8/2018 | Zhu et al. |
| 2018/0317137 A1 | 11/2018 | Loehr et al. |
| 2018/0352050 A1* | 12/2018 | Li ............................... H04W 8/08 |
| 2019/0007992 A1 | 1/2019 | Kim et al. |
| 2019/0053117 A1 | 2/2019 | Bae et al. |
| 2019/0174449 A1 | 6/2019 | Shan et al. |
| 2019/0357014 A1 | 11/2019 | Hu et al. |
| 2019/0387448 A1 | 12/2019 | Stauffer et al. |
| 2019/0394684 A1 | 12/2019 | Li et al. |
| 2020/0015295 A1 | 1/2020 | Stauffer et al. |
| 2020/0068391 A1 | 2/2020 | Liu et al. |
| 2020/0120022 A1 | 4/2020 | Stammers et al. |
| 2020/0260370 A1 | 8/2020 | Nithiyanantham et al. |
| 2020/0267518 A1 | 8/2020 | Sabella et al. |
| 2020/0344655 A1 | 10/2020 | Rommer et al. |
| 2020/0374762 A1 | 11/2020 | Ghadge et al. |
| 2024/0073796 A1 | 2/2024 | Azizi et al. |

FOREIGN PATENT DOCUMENTS

| | | | |
|---|---|---|---|
| CN | 106131081 A | 11/2016 | |
| CN | 107113662 A | 8/2017 | |
| CN | 107430657 A | 12/2017 | |
| CN | 108063773 A | 5/2018 | |
| EP | 2234343 A1 | 9/2010 | |
| KR | 10-1120800 B1 | 3/2012 | |
| KR | 10-1645728 B1 | 8/2016 | |
| KR | 10-2018-0019538 A | 2/2018 | |
| KR | 10-2019-0004221 A | 1/2019 | |
| WO | 2017/066945 A1 | 4/2017 | |
| WO | WO-2017100640 A1 * | 6/2017 | ............ H04W 76/10 |
| WO | 2018/031070 A1 | 2/2018 | |
| WO | 2018/089417 A1 | 5/2018 | |
| WO | 2018/208949 A1 | 11/2018 | |

OTHER PUBLICATIONS

ETSI, GS MEC 010-2 V1.1.1, Jul. 2017 (Year: 2017).*
Supplementary European Search Report dated Mar. 31, 2022, in connection with European Application No. 19922358.7, 7 pages.
"Mobile Edge Computing (MEC); UE application interface", ETSI GS MEC 016 V1.1.1 (Sep. 2017), 21 pages.
"Mobile Edge Computing (MEC); Framework and Reference Architecture", ETSI GS MEC 003 V1.1.1 (Mar. 2016), 18 pages.
International Search Report dated Oct. 23, 2019 in connection with International Patent Application No. PCT/KR2019/008730, 2 pages.
International Search Report dated Dec. 27, 2019 in connection with International Patent Application No. PCT/KR2019/008729, 3 pages.
"Mobile Edge Computing (MEC); Mobile Edge Management; Part 2: Application lifecycle, rules and requirements management", ETSI GS MEC 010-2 v1.1.1 (Jul. 2017), 48 pages.
Supplementary European Search Report dated Mar. 10, 2021 in connection with European Patent Application No. EP 19 83 5024, 9 pages.
Notification to Grant Patent Right for Invention dated Oct. 9, 2022 in connection with Chinese Patent Application No. 201980010111.1, 7 pages.
Hearing Notice dated Jul. 27, 2023, in connection with Indian Patent Application No. 202037031672, 2 pages.
Non-Final Office Action dated Aug. 1, 2023, in connection with U.S. Appl. No. 17/599,920, 35 pages.
Notification of the First Office Action dated Sep. 15, 2023, in connection with Chinese Patent Application No. 201980094904.6, 26 pages.
ETSI GS MEC 001 V1.1.1 (Mar. 2016), Group Specification, Mobile Edge Computing (MEC) Terminology, Mar. 2016, 7 pages.
Final Office Action dated Dec. 6, 2023, in connection with U.S. Appl. No. 17/599,920, 31 pages.
Office Action dated Jul. 4, 2024, in connection with Korean Application No. 10-2019-0085343, 14 pages.
Final Office Action dated May 22, 2024, in connection with U.S. Appl. No. 17/599,920, 25 pages.
Notification of Granting of Patent Right to Invention dated Sep. 5, 2024, in connection with Chinese Application No. 201980094904.6, 8 pages.

* cited by examiner

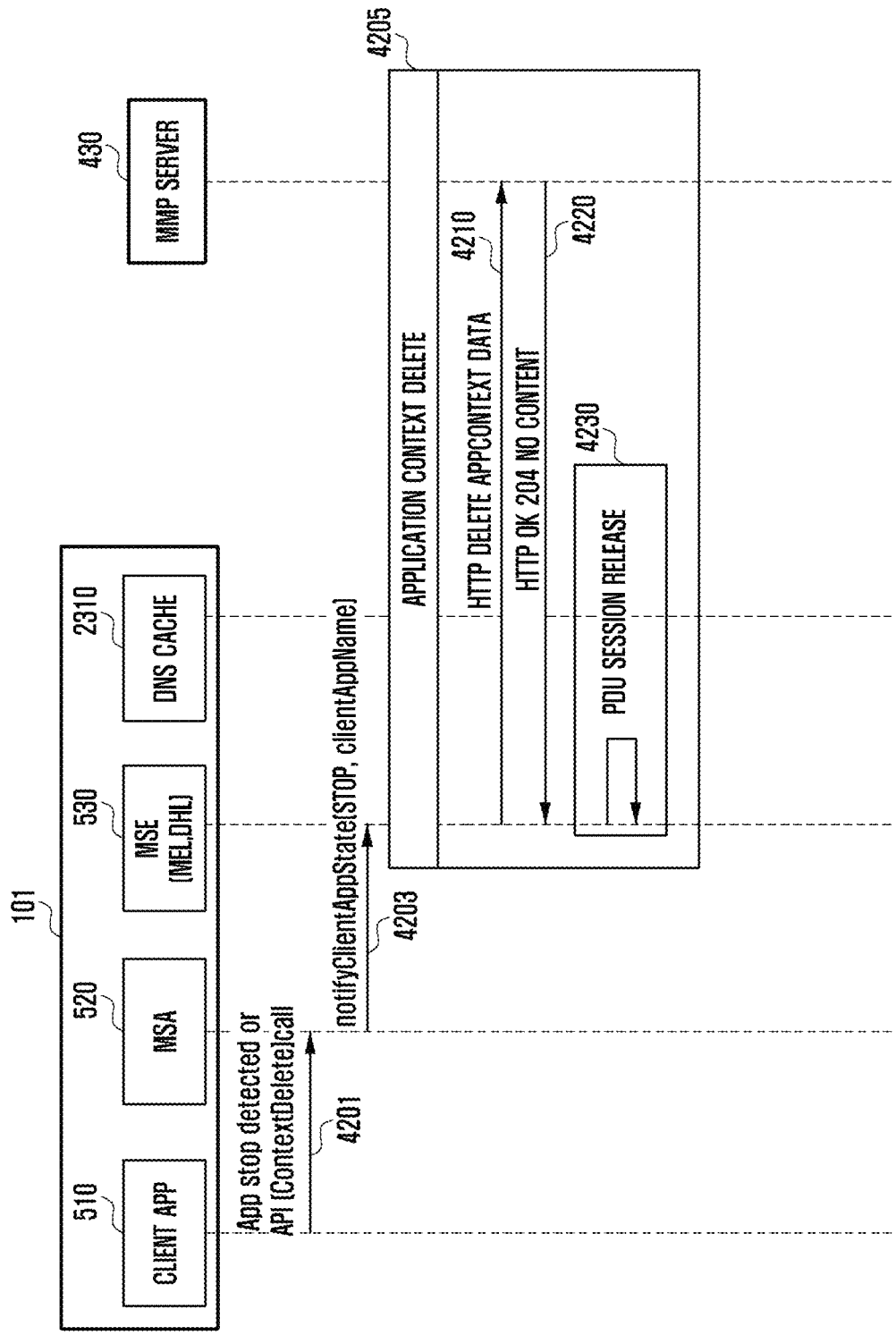

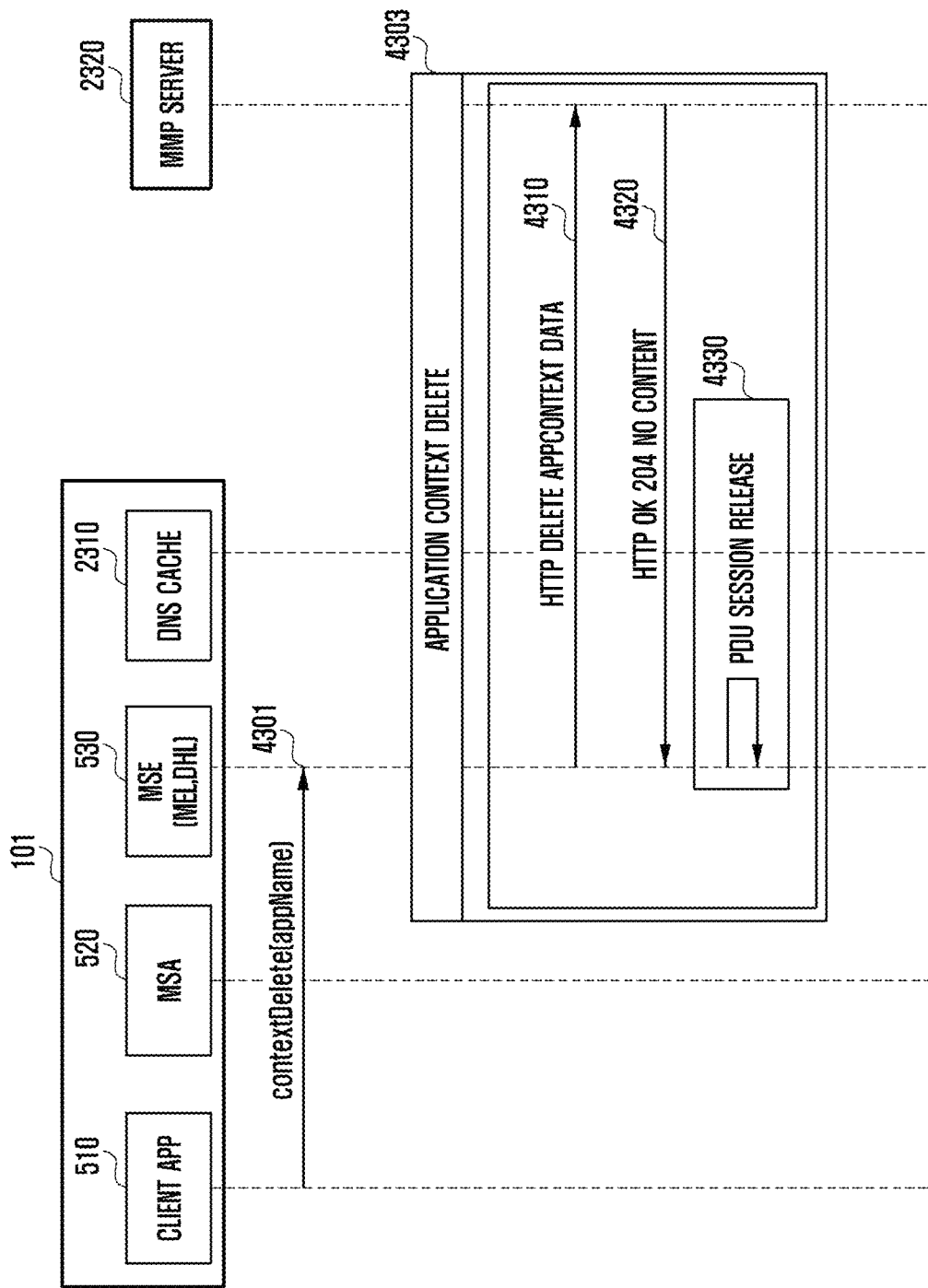

METHOD AND ELECTRONIC DEVICE FOR PROVIDING MULTI-ACCESS EDGE COMPUTING SERVICE USING MULTI-ACCESS EDGE COMPUTING DISCOVERY

CROSS-REFERENCE TO RELATED APPLICATIONS

This application is a continuation of U.S. patent application Ser. No. 16/938,824 filed on Jul. 24, 2020, which is a continuation of International Application No. PCT/KR2019/008730 filed on Jul. 15, 2019, which claims priority to Korean Patent Application No. 10-2018-0081919 filed on Jul. 13, 2018, Korean Patent Application No. 10-2019-0018833 filed on Feb. 18, 2019, Korean Patent Application No. 10-2019-0085343 filed on Jul. 15, 2019 and U.S. Provisional Patent Application No. 62/826,275 filed on Mar. 29, 2019, the disclosures of which are herein incorporated by reference in their entirety.

BACKGROUND

1. Field

The disclosure relates to a method for supporting an edge computing service (e.g., multi-access edge computing (MEC) service), and an electronic device thereof.

2. Description of Related Art

Recently, an edge computing technology to transmit data using an edge server has been discussed. For example, the edge computing technology may include multi-access edge computing (MEC) or fog computing. The edge computing technology may mean a technology to provide an electronic device with data through a separate server (hereinafter referred to as an "edge server" or "MEC server") that is installed at a location geographically close to the electronic device (e.g., inside or near a base station). For example, an application requiring low latency among at least one application installed in the electronic device may transmit and receive data through an edge server installed at a geographically close location rather than through a server located in an external data network (DN) (e.g., Internet).

Recently, a service using an edge computing technology (hereinafter referred to as a "MEC based service" or "MEC service") has been discussed, and an electronic device supporting the MEC based service has been researched and developed. For example, an application of a mobile communication electronic device may transmit and receive edge computing based data on an edge server (or application of an edge server) and an application layer.

In a MEC based service, for example, in order to execute a service among an electronic device (or user), a network, an operator, or an application provider, it is required to provide a safe environment. For example, for a MEC service, an edge server (or MEC application(s)) is required to provide a service (or access) to an authenticated and access-authorized (or access-permitted) electronic device (or client application). For example, an application of an electronic device may communicate with an application of an edge server, and the edge server may perform authentication with respect to the application of the electronic device, and may authorize the application of the electronic device in accordance with the result of the authentication. For example, in the MEC based service, applications permitted between the electronic device and the edge server may communicate with each other. For example, if the mutual authentication between the electronic device and the edge server is completed, a discovery (e.g., MEC discovery) procedure (or MEC service discovery procedure) may be performed.

In case that a plurality of applications are installed in an electronic device, they may individually communicate with an edge server on an application layer to perform edge computing based data transmission. For example, in the related art, in an electronic device, applications may individually perform authentication to use the MEC service, authorization, and discovery procedure.

In various embodiments, a method and an apparatus are disclosed, which can provide a service by executing a MEC application based on a more optimum MEC host with respect to an electronic device.

In various embodiments, a method and an apparatus for performing a service discovery operation by an electronic device (e.g., MEC service module) rather than an individual application.

In various embodiments, a method and an apparatus are disclosed, which can perform a MEC discovery more promptly and efficiently and can select a MEC host capable of providing an optimum quality because an individual application does not take charge of the discovery, but an electronic device (e.g., MEC service module) performs the discovery.

In various embodiments, a method and an apparatus are disclosed, which can provide a stable edge computing service by integrally managing the states of applications and the state of an electronic device through a MEC service module installed in the electronic device.

SUMMARY

According to various embodiments of the disclosure, an electronic device may include a network interface; and a processor, wherein the processor is configured to: obtain information on applications that can be provided by at least one external server from the at least one external server connectable in a base station or through the base station using the network interface, select the external device including the application corresponding to a designated condition based on the information on the applications, and perform data transmission with the selected external server.

According to various embodiments of the disclosure, an electronic device may include a network interface; and a processor, wherein the processor is configured to: obtain an app list of serviceable applications from a designated external server based on a discovery policy, obtain, from the designated external server, information related to an application that is related to a client application of the electronic device and intended to be accessed based on the app list, determine a host for data transmission based on the obtained information, and perform the data transmission with the host.

According to various embodiments of the disclosure, an electronic device may include a network interface; and a processor, wherein the processor is configured to: obtain an app list of serviceable applications from a designated external server based on a discovery policy, obtain, from the designated external server, information related to an application that is related to a client application and intended to be accessed based on an event related to a context creation by the client application, select a host for data transmission based on the obtained information, and perform the data transmission with the host.

In order to solve the above-described problems, various embodiments of the disclosure may include a computer-readable recording medium recorded with a program for executing the method by a processor.

According to the electronic device and the operation method thereof according to the various embodiments, it is possible to provide a service by executing a MEC application based on a more optimum MEC host with respect to the device. According to various embodiments, it is possible to perform a service discovery operation by an electronic device (e.g., service enabler) rather than an individual application. According to various embodiments, an individual application does not take charge of the MEC discovery, but an electronic device (e.g., service enabler) performs the discovery, and thus the discovery can be performed more promptly and efficiently and a MEC host capable of providing an optimum quality can be selected. According to various embodiments, the states of applications and the state of an electronic device are integrally managed through a MEC service module installed in the electronic device, and thus a stable edge computing service can be provided.

In addition, various effects that are directly or indirectly grasped through the description can be provided.

BRIEF DESCRIPTION OF THE DRAWINGS

FIG. 42 is a diagram illustrating an example of a service close operation in a discovery procedure according to various embodiments; and FIG. 43 is a diagram illustrating an example of a service close operation in a discovery procedure according to various embodiments.

DETAILED DESCRIPTION

Figure 1:
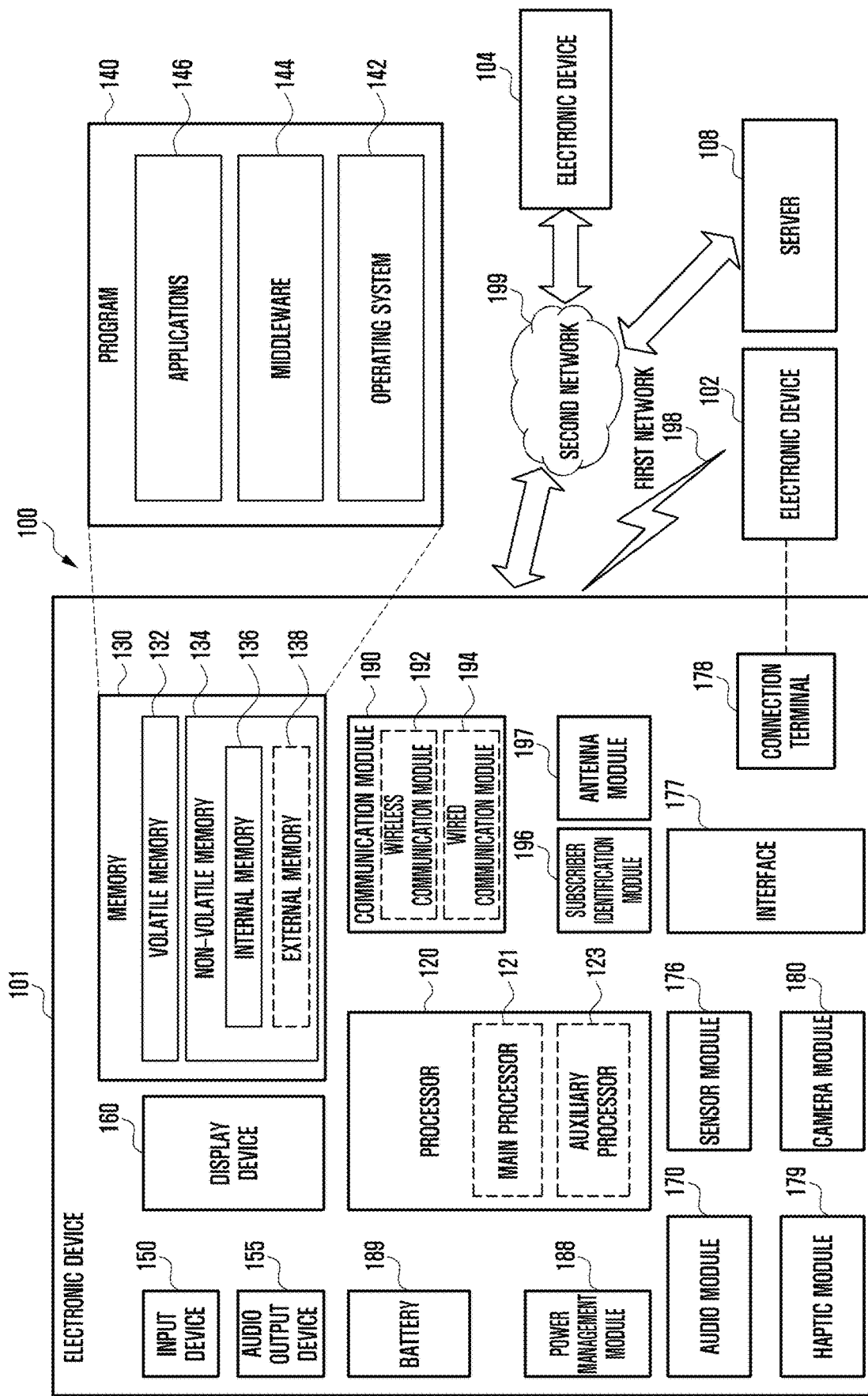
FIG. 1 is a block diagram of an electronic device in a network environment according to various embodiments.

FIG. 1 illustrates an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), with an electronic device 104 or a server 108 via a second network 199 (e.g., a long-range wireless communication network), or with the electronic device 104 via the server 108, and may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) card 196, and an antenna module 197. At least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. The processor 120 may load a command or data received from another component (e.g., the sensor module 176 or the communication module 190) in the volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101 and may include software (e.g., the program 140) and input data or output data for a command related thereto. The memory 130 may include the volatile memory 132 or the non-volatile memory 134.

The program 140 may be stored in the memory 130 as software, and may include an operating system (OS) 142, middleware 144, or an application 146.

The input device 150 may receive a command or data to be used by another component (e.g., the processor 120) of the electronic device 101, from the outside (e.g., a user) of the electronic device 101, and may include a microphone, a mouse, a keyboard, or a digital pen (e.g., a stylus pen).

The sound output device 155 may output sound signals to the outside of the electronic device 101 and may include a speaker or a receiver. The speaker may be used for general purposes, such as playing multimedia or playing record, and the receiver may be used for incoming calls and may be implemented as separate from, or as part of the speaker.

The display device 160 may visually provide information to the outside (e.g., a user) of the electronic device 101 and may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa, and may obtain the sound via the input device 150, or output the sound via the sound output device 155 or a headphone of an external electronic device (e.g., an electronic device 102) directly (e.g., over wires) or wirelessly coupled with the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state, and may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., over wires) or wirelessly, and may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102), and may include a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation, and may include a motor, a piezoelectric element, or an electric stimulator.

The camera module 180 may capture a still image or moving images and may include one or more lenses, image sensors, image signal processors, or flashes.

The power management module 188 may manage power supplied to the electronic device 101, and may be implemented as at least part of a power management integrated circuit (PMIC).

The battery 189 may supply power to at least one component of the electronic device 101, and may include a primary cell which is not rechargeable, a secondary cell which is rechargeable, or a fuel cell.

The communication module 190 (e.g., a transceiver) may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth, wireless-fidelity (Wi-Fi) direct, or infrared data association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101 and may include an antenna including a radiating element composed of a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected by the communication module 190 (e.g., the wireless communication module 192) from the plurality of antennas. The signal or the power may then be transmitted or received between the communication module 190 and the external electronic device via the selected at least one antenna. Another component (e.g., a radio-frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101.

All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing, as at least part of a reply to the request. To that end, a cloud, distributed, or client-server computing technology may be used, for example.

The electronic device 101 according to embodiments may be one of various types of electronic devices, such as a portable communication device (e.g., a smartphone), a computer device, a portable multimedia device, a portable medical device, a camera, a wearable device, or a home appliance. However, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., over wires), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Prior to the description of various embodiments of the disclosure, an electronic device 101 to which an embodiment of the disclosure can be applied will be described.

Figure 2:
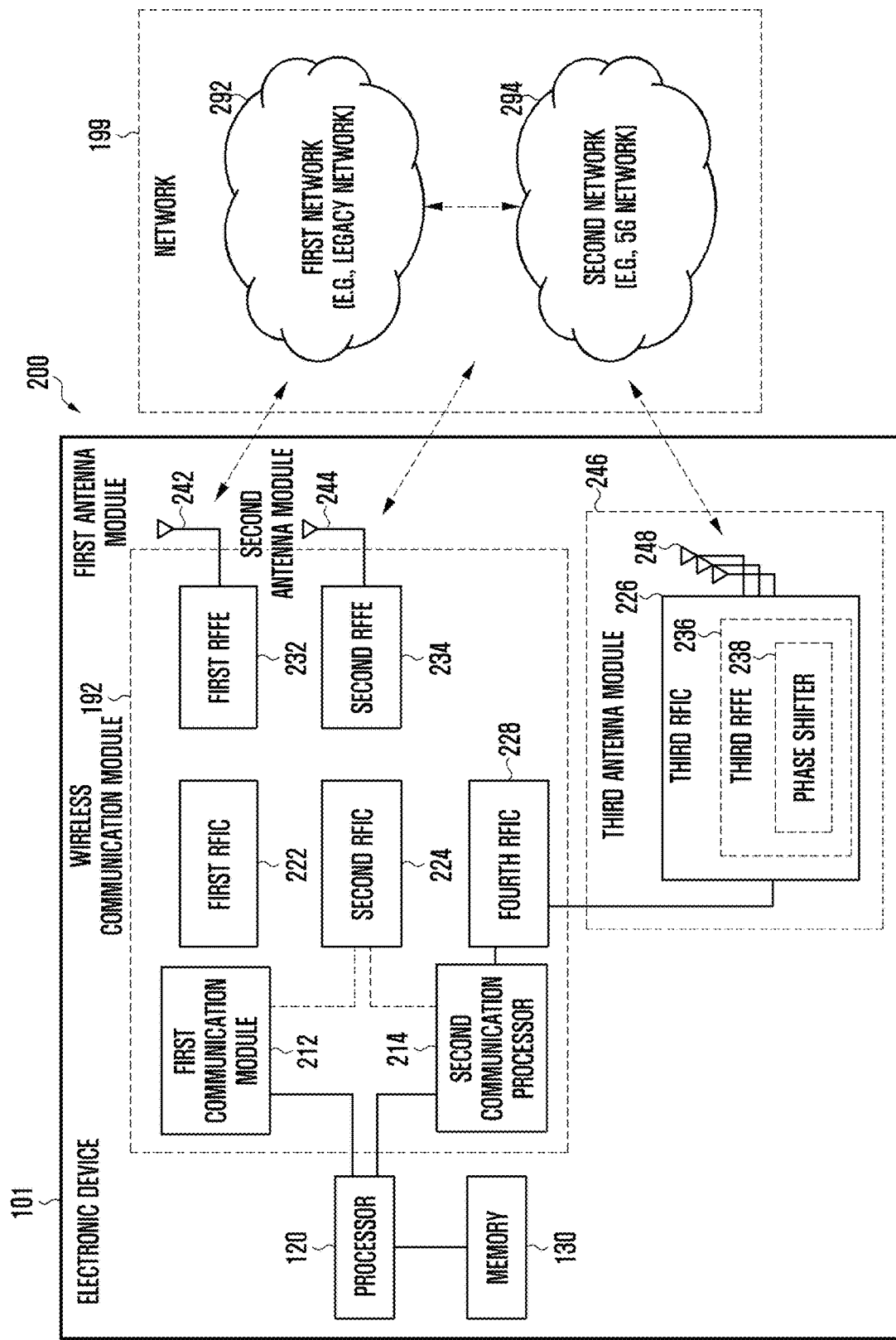
FIG. 2 is a block diagram of an electronic device for supporting legacy network communication and 5G network communication according to various embodiments.

FIG. 2 is a block diagram 200 of an electronic device 101 for supporting legacy network communication and 5G network communication according to various embodiments.

With reference to FIG. 2, an electronic device 101 may include a first communication processor 212, a second communication processor 214, a first RFIC 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120, and a memory 130.

A network 199 may include a first network 292 and a second network 294. According another embodiment, the electronic device 101 may further include at least one of constituent elements described in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may constitute at least a part of a wireless communication module 192. According to another embodiment, the fourth RFIC 228 may be omitted, or may be included as a part of the third RFIC 226.

The first communication processor 212 may set a communication channel of a band to be used for wireless communication with the first network 292, and may support a legacy network communication through the set communication channel. According to various embodiments, the first network 292 may be a legacy network including second generation (2G), 3G, 4G, or long term evolution (LTE) network.

The second communication processor 214 may set a communication channel corresponding to a designated band (e.g., about 6 GHz to 60 GHz) of a band to be used for wireless communication with the second network 294, and may support a 5G network communication through the set communication channel. According to various embodiments, the second network 294 may be a 5G network defined in 3GPP.

In addition, according to an embodiment, the first communication processor 212 or the second communication processor 214 may set a communication channel corresponding to another designated band (e.g., about 6 GHz or less) of the band to be used for wireless communication with the second network 294, and may support the 5G network communication through the set communication channel. According to an embodiment, the first communication processor 212 and the second communication processor 214 may be implemented in a single chip or in a single package. According to various embodiments, the first communication processor 212 or the second communication processor 214 may be formed in a single chip or a single package together with the processor 120, the auxiliary processor 123, or the communication module 190.

During transmission, the first RFIC 222 may convert a baseband signal generated by the first communication processor 212 into a radio frequency (RF) signal of about 700 MHz to 3 GHz used for the first network (e.g., legacy network) 292. During reception, the RF signal may be obtained from the first network (e.g., legacy network) 292 through the antenna (e.g., first antenna module 242), and the RF signal may be preprocessed through the RFFE (e.g., first RFFE 232). The first RFIC 222 may convert the preprocessed RF signal into a baseband signal so that the preprocessed RF signal can be processed by the first communication processor 212.

During transmission, the second RFIC 224 may convert a baseband signal generated by the first communication processor 212 or the second communication processor 214 into an RF signal (hereinafter referred to as "5G Sub6 RF signal") of a Sub6 band (e.g., about 6 GHz or less) that is used for the second network (e.g., 5G network) 294. During reception, the 5G Sub6 RF signal may be obtained from the second network (e.g., 5G network) 294 through the antenna (e.g., second antenna module 244), and the 5G Sub6 RF signal may be preprocessed through the RFFE (e.g., second RFFE 234). The second RFIC 224 may convert the preprocessed 5G Sub6 RF signal into a baseband signal so that the preprocessed 5G Sub6 RF signal can be processed by the corresponding one of the first communication processor 212 and the second communication processor 214.

The third RFIC 226 may convert a baseband signal generated by the second communication processor 214 into an RF signal (hereinafter referred to as "5G Above6 RF signal") of a 5G Above6 band (e.g., about 6 GHz to 60 GHz) to be used for the second network (e.g., 5G network) 294. During reception, the 5G Above6 RF signal may be obtained from the second network (e.g., 5G network) 294 through the antenna (e.g., antenna 248), and the 5G Above6 RF signal may be preprocessed through the third RFFE 236. The third RFIC 226 may convert the preprocessed 5G Above6 RF signal into a baseband signal so that the preprocessed 5G Above6 RF signal can be processed by the second communication processor 214. According to an embodiment, the third RFFE 236 may be formed as a part of the third RFIC 226.

According to an embodiment, the electronic device 101 may include the fourth RFIC 228 separately from the third RFIC 226 or as at least a part of the third RFIC 226. In this case, the fourth RFIC 228 may convert a baseband signal generated by the second communication processor 214 into an RF signal (hereinafter referred to as "IF signal") of an intermediate frequency band (e.g., about 9 GHz to 11 GHz), and may transfer the IF signal to the third RFIC 226. The third RFIC 226 may convert the IF signal into a 5G Above6 RF signal. During reception, the 5G Above6 RF signal may be received from the second network (e.g., 5G network) 294 through the antenna (e.g., antenna 248), and the 5G Above6 RF signal may be converted into an IF signal by the third RFIC 226. The fourth RFIC 228 may convert the IF signal into a baseband signal so that the IF signal can be processed by the second communication processor 214.

According to an embodiment, the first RFIC 222 and the second RFIC 224 may be implemented in a single chip or as at least a part of a single package. According to an embodiment, the first RFFE 232 and the second RFFE 234 may be implemented in a single chip or as at least a part of a single package. According to an embodiment, at least one of the first antenna module 242 and the second antenna module 244 may be omitted, or may be combined with another antenna module to process RF signals of a plurality of corresponding bands.

According to an embodiment, the third RFIC 226 and the antenna 248 may be deployed on the same substrate to form the third antenna module 246. For example, the wireless communication module 192 or the processor 120 may be deployed on a first substrate (e.g., main PCB). In this case, separately from the first substrate, the third RFIC 226 may be deployed on a partial area (e.g., lower surface) of a second substrate (e.g., sub PCB), and the antenna 248 may be deployed on the other partial area (e.g., upper surface) thereof to form the third antenna module 246. Because the third RFIC 226 and the antenna 248 are deployed on the same substrate, it is possible to reduce the length of a transmission line between them. For example, it is possible to reduce a loss (e.g., attenuation) of a signal of a high frequency band (e.g., about 6 GHz to 60 GHz) used for the 5G network communication that is caused by the transmission line. Through this, the electronic device 101 can improve the quality or speed of communication with the second network (e.g., 5G network) 294.

According to an embodiment, the antenna 248 may be formed as an antenna array including a plurality of antenna elements that can be used for beamforming. In this case, the third RFIC 226 may include, for example, as a part of the third RFFE 236, a plurality of phase shifters 238 corresponding to the plurality of antenna elements. During transmission, each of the plurality of phase shifters 238 may shift the phase of the 5G Above6 RF signal to be transmitted to an outside (e.g., base station of the 5G network) of the electronic device 101 through the corresponding antenna element. During reception, each of the plurality of phase shifters 238 may shift the phase of the 5G Above6 RF signal received from the outside through the corresponding antenna element to the same phase or substantially the same phase. This makes it possible to perform transmission or reception through beamforming between the electronic device 101 and the outside.

The second network (e.g., 5G network) 294 may operate independently of the first network (e.g., legacy network) (e.g., standalone (SA)), or may operate in connection with the first network 292 (e.g., non-standalone (NSA)). For example, in the 5G network, only an access network (e.g., 5G radio access network (RAN) or next generation RAN (NG RAN)) may exist, but a core network (e.g., next generation core (NGC)) may not exist. In this case, the electronic device 101 may access the access network of the 5G network, and then may access an external network (e.g., Internet) under the control of the core network (e.g., evolved packed core (EPC)) of the legacy network. Protocol information for communication with the legacy network (e.g., LTE protocol information) or protocol information for communication with the 5G network (e.g., new radio (NR) protocol information) may be stored in the memory 230 to be accessed by another constituent element (e.g., processor 120, first communication processor 212, or second communication processor 214).

Hereinafter, 5G network technology described in the drawings and description may refer to the standard specification (e.g., technical specification (TS) 23.501) defined by International Telecommunication Union (ITU) or 3GPP, and MEC technology may refer to the standard specification (e.g., MEC 001 to MEC 016) defined by European Telecommunication Standards Institute (ETSI). Hereinafter, although the contents will be described based on the MEC technology, the same or similar principle may be applied to fog computing technology defined by OpenFog Consortium.

Figure 3:
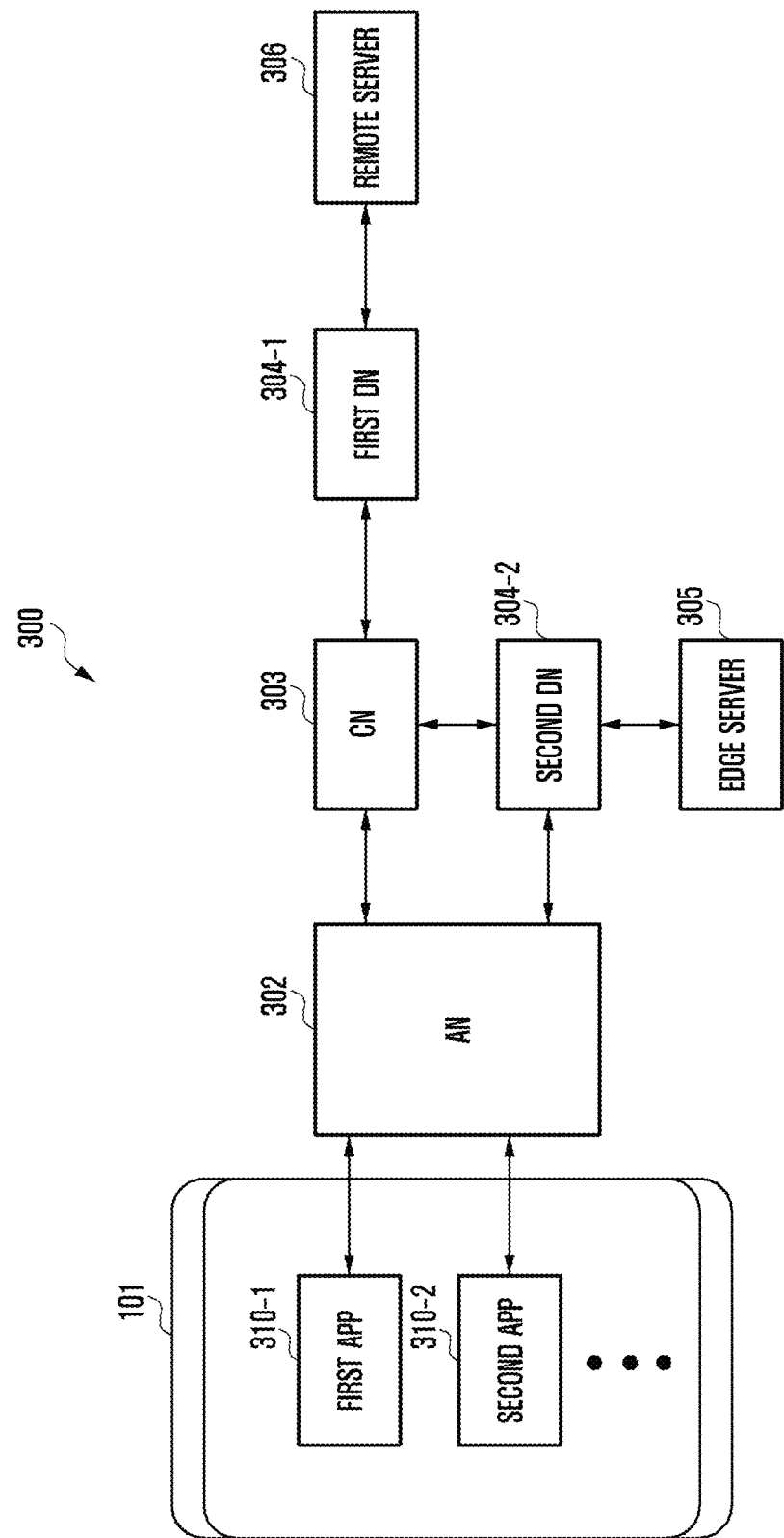
FIG. 3 is a schematic diagram explaining a MEC technology in a network environment according to various embodiments.

FIG. 3 is a schematic diagram explaining a MEC technology in a network environment according to various embodiments.

With reference to FIG. 3, each of constituent elements included in a network environment 300 (e.g., network environment 100 of FIG. 1) may mean a physical entity unit or a software or module unit capable of performing an individual function.

According to an embodiment, the electronic device 101 may mean a device used by a user. For example, the electronic device 101 may mean a terminal, user equipment (UE), a mobile station, a subscriber station, a remote terminal, a wireless terminal, or a user device.

According to an embodiment, an access network (AN) 302 may provide a channel for wireless communication with the electronic device 101. The AN 302 may mean a radio access network (RAN), base station, eNodeB (eNB), 5G node, transmission/reception point (TRP), or 5th generation NodeB (SGNB).

According to an embodiment, a core network (CN) 303 may manage at least one of subscriber information of the electronic device 101, mobility of the electronic device 101, access authorization of the electronic device 101, traffic of a data packet, or billing policy. The CN 303 may include at least one of a user plane function (UPF) node, an access & mobility management function (AMF) node, a session management function (SMF) node, a unified data management (UDM) node, or a policy control function (PCF) node.

According to an embodiment, a data network (DN) (e.g., first DN 304-1 and second DN 304-2) may provide a service (e.g., Internet service, IP multimedia subsystem (IMS) service) by transmitting or receiving data (or data packets) to or from the electronic device 101 through the CN 303 and the AN 302. For example, the DN 304-1 and 304-2 may be managed by a communication operator. According to an embodiment, the first DN 304-1 may be connected to a remote server 306 and the second DN 304-2 may be connected to an edge server (e.g., MEC server) 305. For example, if the CN 303 is deployed at a location adjacent to the AN 302 (or the edge server 305), the second DN 304-2 may be deployed at a location adjacent to the CN 303.

According to an embodiment, the remote server 306 may provide content related to an application. For example, the remote server 306 may be managed by a content provider.

According to an embodiment, a plurality of applications (e.g., first application (first App) 310-1, second application (second App) 310-2, and the like) may be installed (or stored) in the electronic device 101. For example, each of the plurality of applications may be one of a default application installed in advance in the electronic device 101, an application provided by a communication operator, or a 3$^{rd}$ party application. The plurality of applications may require different network services based on at least one of data transmission speed, latency (or speed), reliability, the number of electronic devices accessed to a network, network access cycle of the electronic device 101, or average data usage. For example, different network services may include enhanced mobile broadband (eMBB), ultra-reliable and low latency communication (URLLC), or massive machine type communication (mMTC). For example, the eMBB may mean a network service that requires high data transmission speed and low latency, such as a smartphone service. For example, the URLLC may mean a network service that requires low latency and high reliability such as a disaster relief network or vehicle to everything (V2X). For example, the mMTC may mean a network service that does not require low latency while a plurality of entities are connected to each other, such as the Internet of things (IoT).

According to an embodiment, the edge server 305 (e.g., MEC server) may be deployed inside a base station (e.g., AN 302) to which the electronic device 101 is connected, or at a location geographically close to the base station, and may provide content at least partly the same as the content provided by the remote server 306. Although not illustrated in FIG. 3, the edge server 305 may be deployed inside the CN 303 or may be deployed in a separate user computer. For example, the remote server 306 may provide the electronic device 101 with content regardless of the location of the electronic device 101, whereas the edge server 305 may have locality to provide content to the electronic device 101 located at a location adjacent to the edge server 305. According to an embodiment, a plurality of applications 310-1 and 310-2 of the electronic device 101 may perform data transmission with the remote server 306, or may perform data transmission based on edge computing (e.g., MEC) with the edge server 305.

According to an embodiment, the plurality of applications 310-1 and 310-2 may perform data transmission with the remote server 306 based on the required service type (e.g., network service type, application service type, and/or requirements), or they may perform data transmission based on edge computing with the edge server 305. For example, if the first application (first App) 310-1 does not require low latency, the first application 310-1 may perform data transmission with the remote server 306. As another example, if the second application 310-2 requires low latency, the second application (second App) 310-2 may perform data transmission with the edge server 305.

According to another embodiment, the plurality of applications 310-1 and 310-2 may perform data transmission based on whether the electronic device 101 (or an application) subscribes to an edge computing service without considering separate requirements. According to another embodiment, if the application is an application provided by a communication operator, the application may perform data transmission without considering separate requirements or whether to subscribe to the edge computing service.

Figure 4:
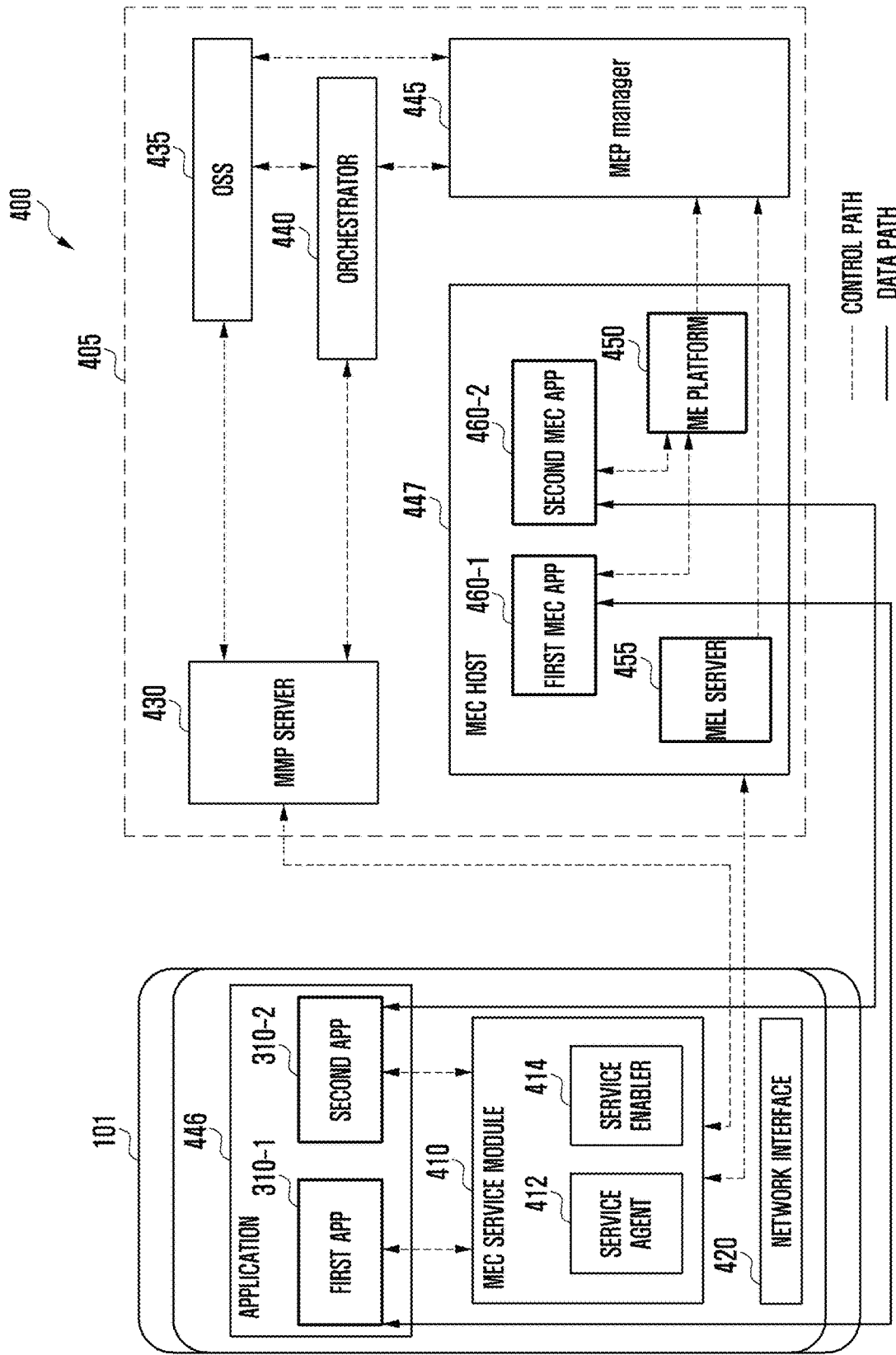
FIG. 4 is a diagram illustrating an electronic device and a MEC system performing MEC based data transmission in a network environment according to various embodiments.

FIG. 4 is a diagram illustrating an electronic device 101 and a MEC system 405 performing MEC based data transmission in a network environment 400 according to various embodiments.

According to an embodiment, a MEC host 447 illustrated in FIG. 4 may correspond to the edge server 305 as described above with reference to FIG. 3, and although not illustrated in FIG. 4, the electronic device 101 may perform wireless communication through the AN 302 deployed between the MEC host 447 and a MEC management proxy (MMP) server (e.g., lifecycle management (LCM) proxy server) 430.

As illustrated FIG. 4, for example, network entities may interwork with a MEC service module (or MEC service layer) 410 including a service agent (e.g., multi-access service agent (MSA)) 412 and a service enabler (e.g., multi-access service enabler) 414 in the electronic device 101 for an edge computing service (e.g., MEC service).

With reference to FIG. 4, in the network environment 400 (e.g., network environment 300 of FIG. 3), a MEC user plane may mean a path (e.g., data path) for transmitting a user data packet between applications (e.g., client applications (e.g., first App 310-1, second App 310-2, and the like)) and MEC applications (or edge applications or multi-access edge (ME) applications) (e.g., first MEC App 460-1, second MEC App 460-2, and the like) installed in the MEC host 447 (e.g., edge server (or MEC server) 305. According to an embodiment, the MEC control plane may mean a path (e.g., control path) for transmitting control information of an edge computing system (e.g., MEC system 405) for the user data packet transmitted or received on the user plane.

According to various embodiments, in the control path (e.g., MEC control plane) interworking between the service agent (e.g., MSA) 412 and the service enabler (e.g., MSE) 414 and the MMP server 430 as exemplified in FIG. 4, authentication, authorization, and discovery procedures will be disclosed. According to an embodiment, after the discovery procedure, a MEC data service may be provided through the data path (e.g., MEC user plane) between the applications (e.g., first App 310-1 and second App 310-2) of the electronic device 101 and the MEC applications (e.g., first MEC App 460-1 and second MEC App 460-2) of the MEC host 447. Although not illustrated in FIG. 4, the electronic device 101 may perform data communication with the DNS server through a domain name system (DNS) query/response data path.

According to an embodiment, the MEC system 405 may be deployed in a network of a communication operator, and may be used for MEC based data transmission. The MEC system 405 may include the MMP server 430, an operation support system (OSS) 435, an orchestrator 440, an ME platform (MEP) manager 445, and the MEC host 447. According to an embodiment, a plurality of MEC hosts 447 may be provided.

According to an embodiment, the MMP server 430 may provide user equipment (UE) (e.g., electronic device 101) with a user application interface (reference: refer to ETSI MEC 016 standards) for the edge computing system (e.g., MEC system 405). For example, the electronic device 101 may request the MMP server 430 to provide information (e.g., available application list) about application(s) that can be provided by the MEC system 405, and may transfer an execution request (e.g., context create) and an interruption request (e.g., context termination) of a specific application to the MEC system 405. As another example, the MMP server 430 may manage lifecycles (example) of applications (e.g., 460-1, 460-2, and the like) installed in the MEC system 405. For example, the MMP server 430 may receive a request from the electronic device 101, and may transfer the received request to the MEC system 405 (e.g., OSS 435 and orchestrator 440) to manage the lifecycles of the applications (e.g., 460-1, 460-2, and the like) installed in the MEC system 405.

According to an embodiment, the OSS 435 may grant an instantiation or termination of an application. The instance of the application may be a set of commands (or instructions) for executing the application, and the instantiation may mean an operation in which the processor of the MEC host 447 executes the MEC application through the instance.

According to an embodiment, the orchestrator 440 may manage and maintain overall functions of the MEC based data transmission on the basis of at least one of an available resource, an available MEC service, an application rule and requirements, an operator's policy, or topology. For example, the orchestrator 440 may select a MEC host (e.g., MEC host 447 of FIG. 4) suitable for the application of the electronic device 101, or may perform triggering or termination of the instantiation of the application.

According to an embodiment, the MEP manager 445 may manage at least one of the application rule, requirements, service approval, or traffic rule.

According to an embodiment, the MEC host 447 may include at least one ME application (e.g., 460-1 and 460-2) corresponding to at least one application (e.g., 310-1, 310-2, and the like) installed in the electronic device 101. According to an embodiment, the MEC host 447 may include an ME platform 450. The ME platform 450 may receive the traffic rule from the MEP manager 445, and may adjust the traffic rule on the MEC user plane.

According to an embodiment, the MEC host 447 may include a MEC enabling layer (MEL) server 455 configured to exchange data with a MEC service module (or MEC service layer) 410 of the electronic device 101. For example, the MEL server 455 may perform a function the same as or similar to the function of the MMP server 430. According to an embodiment, the MEC service module 410 may exchange control data to be described hereinafter with the MMP server 430 or the MEL server 455. According to an embodiment, the MEL server 455 may be an application (or a service) operating in the MEC host 447. According to another embodiment, the MEL server 455 may be deployed outside the MEC host 447. In this case, the MEL server 455 may be connected to at least one of the OSS 435, the orchestrator 440, or the MEP manager 445. According to an embodiment, the MEL server 455 may not be included as a constituent element of the MEC host 447. For example, the MEL server 455 in FIG. 4 may be omitted (or excluded).

According to an embodiment, control data may include data of at least one of an application discovery, a lifecycle synchronization (LCS), or an authentication procedure, which can be provided by the MEC system 405.

According to an embodiment, the electronic device 101 may include an application layer 446 (e.g., application 146 of FIG. 1) including a plurality of applications (e.g., 310-1, 310-2, and the like) and a MEC service module 410 for collectively managing MEC based data transmission. Each of the application layer 446 and the MEC service module 410 may mean software or program module. The software or program module may be composed of instructions executed by a processor (e.g., the processor 120 of FIG. 1) included in the electronic device 101. The electronic device 101 may process data for each layer, and may perform data transmission through a network interface (or communication circuit) 420 (e.g., wireless communication module 192 of FIG. 1 or FIG. 2). According to an embodiment, the network interface 420 may be at least a part of the auxiliary processor 123 or the communication module 190 of FIG. 1. FIG. 4 illustrates the MEC service module (or MEC service layer) 410 configured as a layer independent of the application layer 446. However, according to another embodiment, the MEC service module 410 may be configured in the form of an application of which at least a part is included in the application layer 446.

According to an embodiment, the MEC service module 410 may include a service agent (e.g., MSA) 412 and a service enabler (e.g., MSE) 414. According to various embodiments, the MEC service module 410 may receive and process authentication and authorization (e.g., authentication/authorization (AA)) and policies (e.g., app routing policy and discovery policy (or monitoring policy) (e.g., information list to be monitored) according to various embodiments. According to an embodiment, the MEC service module 410 may receive authentication/authorization (AA) and policy (e.g., information list to be monitored) using the service agent (e.g., MSA) 412, and may perform route setup based on the received policy and MEC discovery procedure using the service enabler (e.g., MSE) 414.

According to various embodiments, the MEC service module 410 may operate so that at least one entity (e.g., service agent (MSA) 412 or service enabler (SE) 414) in the MEC service module 410 performs monitoring of the MEC discovery condition, and it may operate to transfer the result monitored by the corresponding entity to the service enabler (MSE) 414. According to an embodiment, the MEC service module 410 may operate to obtain (or receive) AA and discovery related policy through the service agent (MSA) 412. According to an embodiment, if the service agent 412 performs monitoring, it monitors a MEC discovery condition, and if the condition is satisfied, the service agent 412 may transfer a MEC discovery request to the service enabler (MSE) 414, and may perform the MEC discovery procedure through the service enabler 414. According to another embodiment, if the service enabler 414 performs the monitoring, the service agent 412 may transfer the policy to the service enabler 414, and the service enabler 414 may monitor the MEC discovery condition in accordance with the transferred policy, and if the condition is satisfied, it may perform the MEC discovery procedure.

According to an embodiment, the service agent 412 may monitor context information of the electronic device 101. For example, the context information may mean at least one of information about an application, which supports MEC based data transmission, among applications (e.g., 310-1, 310-2, and the like) installed in the electronic device 101, information related to mobility of the electronic device 101, lifecycle information of an application, information about the state of the electronic device 101, information obtained by a sensor, or network performance. For example, the information related to mobility of the electronic device 101 may include at least one of information indicating a movement of the electronic device 101, information related to a change of a base station connected to the electronic device 101, or information related to whether the electronic device 101 enters a designated area. For example, the designated area may mean at least one of a local area data network (LADN), a tracking area (TA), a cell of a base station, an area in which handover occurs between base stations, or an area determined by a location based service (e.g., a location measuring technology based on cellular, satellite, or wireless fidelity (Wi-Fi)). For example, the lifecycle information of an application may indicate the state (e.g., lifecycle) of an application having a series of cycles. For example, the information about the state of the electronic device 101 may mean at least one of the on-off state of a display (e.g., display device 160 of FIG. 1), the state of a battery (e.g., battery 189 of FIG. 1), the usage state of a memory (e.g., memory 130 of FIG. 1), the intensity of a received signal, timeout information, or the usage state of a CPU (e.g., processor 120 of FIG. 1). For example, the information obtained by the sensor may mean information obtained by the sensor module 176 as described above with reference to FIG. 1. For example, the network performance may mean at least one of the frequency bandwidth or latency of a network to which the electronic device 101 is connected. The service agent 412 according to various embodiments will be described in detail with reference to the drawings to be described later.

According to an embodiment, the service enabler 414 may manage (or process) MEC based data transmission of applications (e.g., 310-1, 310-2, and the like) based on the monitored context information.

For example, a plurality of applications (e.g., 310-1, 310-2, and the like) do not individually request information from the MEC system 405, but if an event related to the mobility of the electronic device 101 is detected, the service enabler 414 according to various embodiments may request or receive information related to applications (e.g., MEC applications 460-1, 460-2, and the like) that the MEC system 405 can provide to the MMP server 430 or the MEC host 447, and thus a load of the electronic device 101 can be reduced.

As another example, the service enabler 414 may determine whether at least one application among MEC applications (460-1, 460-2, and the like) or applications (e.g., 310-1, 310-2, and the like) satisfies a designated condition to be able to perform MEC based data transmission, and may notify at least one application satisfying the designated condition to perform MEC based data transmission. If the at least one application satisfying the designated condition is not installed in the electronic device 101, the service enabler 414 may guide an application layer 446 and/or framework (e.g., middleware 144 and/or operating system 142) to install the application. For example, the application layer 446 and/or framework may operate to install a new application in the electronic device 101 in accordance with a request from the service enabler 414. According to various embodiments, the electronic device 101 may receive (or obtain) information about the new application (e.g., URL or IP address and application name) from the MEC system 405 (e.g., MEC host 447).

As another example, if a designated condition (hereinafter referred to as a "second condition") related to lifecycle synchronization is detected, the service enabler 414 may request the lifecycle synchronization from the MMP server (e.g., LCM proxy server) 430 or the edge server (or MEC server) 305, and thus resource consumption of the edge server 305 can be reduced. For example, the service enabler 414 may notify the MMP server 430 whether the applications 310-1, 310-2, and the like are in use. According to an embodiment, the MEC applications (e.g., 460-1, 460-2, and the like) operates (e.g., data transmission) only in case that the applications (e.g., 310-1, 310-2, and the like) are in use, and the MEC applications (e.g., 460-1, 460-2, and the like) may stop their operations in case that the applications (e.g., 310-1, 310-2, and the like) are not in use (e.g., at least one of screen off, client application background state change, or user movement speed equal to or higher than a predetermined speed is satisfied). According to an embodiment, the service enabler 414 notifies the MMP server 430 whether the applications 310-1, 310-2, and the like are in use as described above, and thus can efficiently manage the resource of the MEC host 447 (or edge server 305). According to an embodiment, with respect to the application that is not in use, the resource allocation of the MEC application may be released to reduce the resource consumption of the MEC host 447.

As another example, unlike the method in which a plurality of applications (e.g., 310-1, 310-2, and the like) individually perform authentication procedures for MEC based data transmission, the service enabler 414 may collectively perform the authentication procedure for the electronic device 101 in association with the MMP server 430 (or edge server 305), and thus the network load can be reduced.

Figure 5:
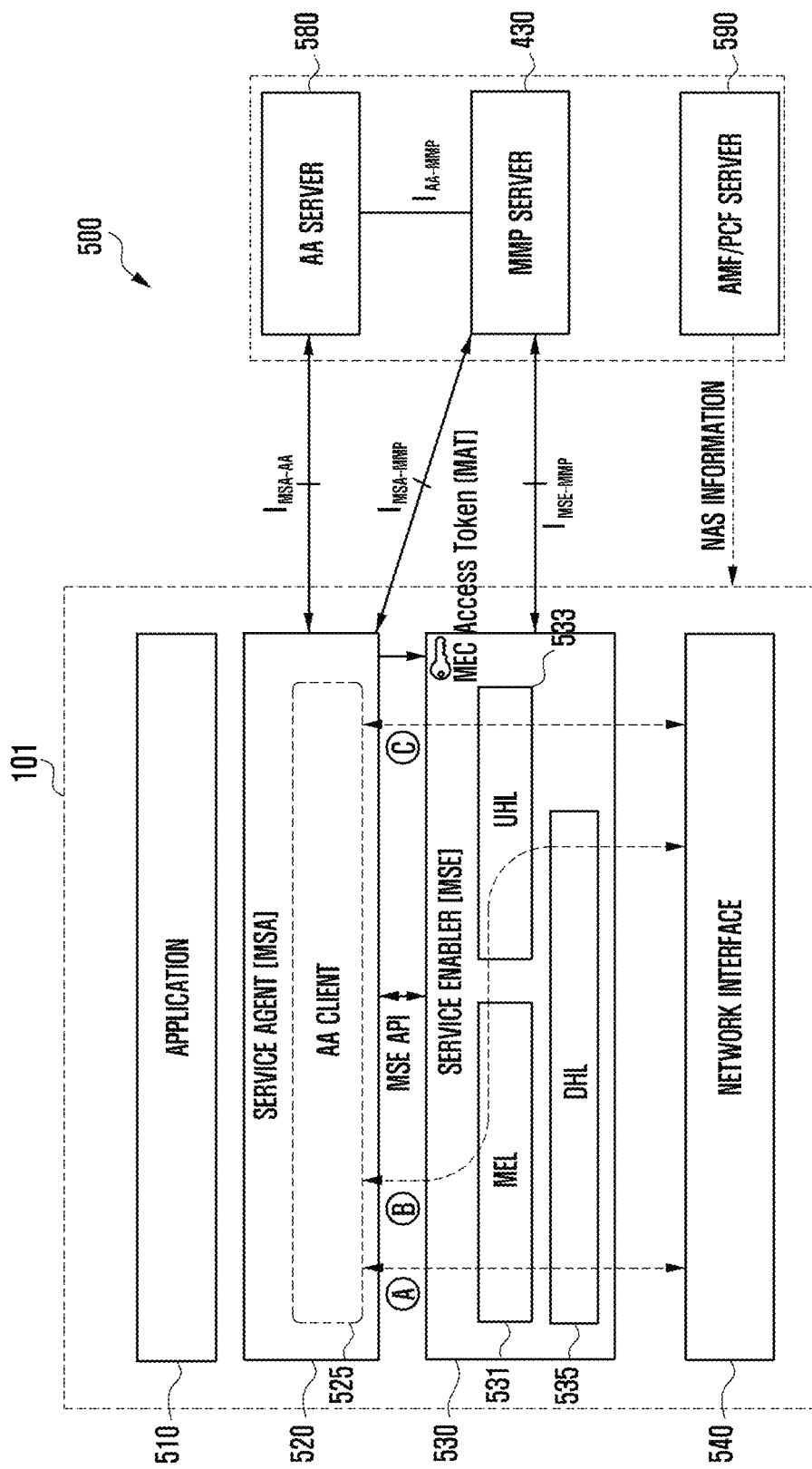
FIG. 5 is a diagram illustrating an electronic device and external servers for supporting a MEC based service in a network environment according to various embodiments.

FIG. 5 is a diagram illustrating an electronic device 101 and an external server 500 for supporting a MEC based service in a network environment according to various embodiments.

As illustrated in FIG. 5, an electronic device 101 of FIG. 5 may include an example of software architecture for the MEC authentication/authorization (MEC AA) procedure and the MEC discovery procedure.

According to an embodiment, the electronic device 101 may include application(s) (hereinafter referred to as "client application (App)") 510 for edge computing services (hereinafter referred to as "MEC services"), a service agent (e.g., MSA) 520 (hereinafter "MSA 520"), and a service enabler (e.g., MSE) 530 (hereinafter "MSE 520"). According to an embodiment, the electronic device 101 may include a network interface 540 (e.g., wireless communication module 192 of FIG. 1 or FIG. 2) for protocol data unit (PDU) session setup related to data transmission, and although not illustrated, it may include a network driver (e.g., software) to control driving of the network interface 540. According to an embodiment, the client application 510, the MSA 520, and the MSE 530 may be installed as software in the electronic device 101 or may be configured to have a physical configuration. According to an embodiment, the MSA 520 and the MSE 530 may be driven as a part of a processor (e.g., processor 120 of FIG. 1). According to an embodiment, the MSA 520 and the MSE 530 may be separate hardware configurations operating independently of the processor 120. According to another embodiment, the MSA 520 and the MSE 530 may be software (e.g., program 140 of FIG. 1). For example, the software type MSA 520 and MSE 530 may be stored in the form of commands (or instructions) in a memory (memory 130 of FIG. 1 or FIG. 2), and operations of the MSA 520 and the MSE 530 may be executed by the processor 120.

According to an embodiment, the client application 510 may include a 3$^{rd}$ party application installed in the electronic device 101 by a user. According to an embodiment, the client application 510 may be an application using a MEC service, such as MEC or fog computing. According to an embodiment, the client application 510 may include an application that uses a differentiated service, such as a free of charge (FOC) service.

According to an embodiment, the client application 510 for MEC may mean an application of the electronic device 101 that accesses a MEC application (e.g., first MEC App 460-1 and second MEC App 460-2 of FIG. 4) driven by a MEC host (e.g., MEC host 447 of FIG. 4). According to an embodiment, the MEC application may mean an application that is installed in and executed by the MEC host 447 adjacent to a user, and communicates with the client application 510. According to an embodiment, the client application 510 may be authenticated through the MSA (e.g., service agent) 520 that serves as a separate authentication client. According to an embodiment, the client application 510 may access a network based on a specific PDU session (e.g., MEC dedicated PDU session) through the network interface4 540, or may access the MEC application based on the existing PDU session (e.g., default PDU session) through a DNS proxy function of the MSE (e.g., service enabler) 530.

According to an embodiment, the client application 510 for the free-of-charge service may mean an application of the electronic device 101 applying a data non-billing policy. According to an embodiment, if the non-billing is authenticated through the MSA 520 in charge of a non-billing authentication, the client application 510 may register a routing rule for a corresponding unique identifier (UID) through a client application routing policy (CARP) or a UE route selection policy (URSP), and traffics generated by the corresponding UID may be transmitted and received through a non-billing dedicated PDU session. According to an embodiment, the URSP may indicate a path selection (or setup) policy of the electronic device (e.g., user terminal) 101 defined in the 3GPP standard, and may be included in a non-access stratum (NAS) message, which may be received from an AMF through a modem (or communication processor (CP)) of the electronic device 101. According to an embodiment, the CARP is a path selection (or setup) policy of the electronic device 101 defined according to various embodiments, and it may be received through an application layer (e.g., MSA 520 or MSE 530) of the electronic device 101 in an environment in which the URSP of 3GPP is not available.

According to an embodiment, the MSA (e.g., service agent) 520 may process an authentication procedure (e.g., authentication/authorization (AA) procedure) related to the MEC service with an authentication/authorization (AA) server (e.g., authentication server) 580 of an external server 500. For example, the MSA 520 may include a role of transferring, to the MSE 530, the URSP rule received as the result of the AA and/or MEC access token. According to an embodiment, the MSA 520 may include a role of detecting an application event (e.g., launch or end) or transferring a specific event to an application. According to various embodiments, the MSA 520 of the electronic device 101 may include an AA client 525. According to an embodiment, the AA client 525 may be provided by a producer (or manufacturer) producing the electronic device 101 or an operator (e.g., service provider). According to an embodiment, based on the AA client 525, the MSA 520 may perform the authentication/authorization (AA) based on subscriber identification information of the electronic device 101. The subscriber identity information may include, for example, a subscriber identity module (SIM), a universal SIM (USIM), an international mobile equipment identify (IMEI), or a generic public subscription identifier (GPSI). For example, the MSA 520 may be an application (or software) providing authentication and authorization functions in order to use a service (e.g., MSE service) by the MSE 530 through communication with the AA server 580 based on the subscriber identity information. According to an embodiment, the MSE service may commonly call a service, such as MEC, FOC, MMS, or ultra-reliable and low latency communications (URLLC), to receive, for example, the service through the MSE 530.

According to an embodiment, if the MSE service is authenticated and authorized through communication with the AA server 580, the MSA 520 may enable/disable the MSE 530 (e.g., enable/disable the MSE service) using a MSE application programming interface (API) with respect to the authorized service type, register the UID and rule (e.g., ApnSettings) of the usable client application 510 for each service type, and request routing setup. According to an embodiment, the MSE API may include an API provided from the electronic device 101 to a higher application layer for enable/disable for each MSE service type and routing rule setting for each UID. According to an embodiment, the MSE API may include an API for setting at least one policy, such as a policy for MEC discovery procedure or context monitoring policy. According to an embodiment, the client application 510 may access the corresponding service (e.g., MEC or FOC) through authentication and authorization procedures.

According to an embodiment, if the MSA 520 is implemented by an operator (e.g., service provider), for example, if an operator directly develops the MSA (e.g., operator MSA) using the MSE service, the MSA 520 may directly perform authentication and authorization procedures for MSE service usage through the AA server 580. According to an embodiment, the MSA 520 may receive a routing rule (e.g., data network name (DNN) (=APN in LTE) information in case of using the dedicated PDU session) for each application from the AA server 580 in the authentication and authorization procedures. According to an embodiment, in order for the MSA 520 to use the MSE API, the authentication and authorization procedures may be performed between the MSA 520 and the electronic device 101. For example, in case of preinstalling the MSA 520 in the electronic device 101, the authentication may be performed with a platform key through signing of an MSA app APK. According to an embodiment, in case that the electronic device 101 includes (or supports) an authentication module, it may operate to obtain a use authority for the MSE API through a separate authentication procedure with the authentication module in the electronic device 101. According to an embodiment, if the MSE service authentication procedure is completed, the MSA 520 may call the MSE API based on the received policy, and may perform create/termination of the PDU session and routing rule setting.

According to an embodiment, during the data path setup of an application for MEC, the electronic device 101 may set a data path (e.g., path ⓐ, path ⓑ, or path ⓒ) to pass through at least one of various entities of the MSE 530 (e.g., MEC enabling layer (MEL) 531, URSP handling layer (UHL) 533, and DNS handling layer (DHL) 535). According to an embodiment, during the data path setup of the MEC application, the electronic device 101 may differently set the data path based on usage of the default PDU session (e.g., path ⓐ) or usage of a separate dedicated PDU session (e.g., path ⓑ or path ⓒ). According to an embodiment, in case of using a separate dedicated PDU session, the data path (e.g., path ⓑ or path ⓒ) may be determined depending on whether to perform the MEC discovery procedure through the MEL 531 of the MSE 530.

According to an embodiment, the MSA 520 may configure the dedicated PDU session (e.g., set path ⓒ) as the service path) by directly requesting from the UHL 533 of the MSE 530 without passing through the MEL 531 of the MSE 530. For example, if pre-engaged with a specific server or network in case that the electronic device 101 executes a sponsored application, the MSA 520 may provide the corresponding service through the dedicated PDU session by requesting from the UHL 533. According to an embodiment, the MSA 520 may further create separate information for identifying the service through the UHL 533, or may receive the information from an external server.

According to various embodiments, the electronic device 101 may include the MSE (e.g., service enabler) 530 in a lower layer of the MSA 520.

According to an embodiment, the MSE 530 may provide the MSE API to the MSA 520 so that the client application 510 can use the MEC service (or MSE service) through the MSA 520, and thus a routing table for used PDU session for each application may be set. According to an embodiment, the MSE 530 may set the routing table for a PDU session path to be used for each application ID or URI, and may store the routing table in a memory (e.g., memory 130 of FIG. 1 or FIG. 2). According to an embodiment, the MSE 530 may set at least one of an application ID or URI as a set target of the PDU session path. The URI may include a domain name or IP address type. As an example, the PDU session path for each application ID may be set to, for example, "AppID 1: PDU session 1, AppID 2: PDU session 1, AppID 3: PDU session 2". As an example, the PDU session path for each URI may be set to, for example, "URI 1: PDU session 1, URI 2: PDU session 2". As an example, the PDU session path for each application ID and for each URI may be set to, for example, "AppID 1 & URI 1: PDU session 3, AppID 2 & URI 1: PDU session 1".

According to an embodiment, the MEC service may commonly call the procedure required to use the MEC application (or mobile edge (ME) application), a service provided through the MEC application, and a service related to information provided to the MEC application. According to an embodiment, for the MEC service, the MSE 530 may support an additional function, such as MEC service discovery, location identification, route selection, performance identification, or mobility support.

According to various embodiments, the MSE 530 may operate to set the dedicated PDU session to provide a specific service, or may operate to set the default PDU session in a state where the MSE 530 is connected to at least one MEC host (e.g., MEC host 447 of FIG. 4) (or MEC application). According to an embodiment, for example, a modem (or communication processor (CP)) of the electronic device 101 may receive information required to configure the dedicated PDU session or the default PDU session from an AMF/PCF server 590 through the non-access stratum (NAS) information.

According to an embodiment, the MSE 530 may include a MEL 531, a UHL 533, and a DHL 535.

According to an embodiment, the MEL 531 may perform necessary work to use the MEC service of the MSE services. For example, the MEL 531 may process functions of MEC service registration, MEC service discovery, route selection (e.g., DNN handling), performance pre-measurement, location services, and/or mobility handling.

According to an embodiment, the MEC service registration may be performed in a manner that whether to subscribe to the MEC service is authenticated by the MMP server 430 (or LCM proxy server) or a MEC solution provider server based on USIM or account (e.g., log-in) information of the electronic device 101, and a token (e.g., cookie) to match the MEC service authority level is received and stored in the memory (e.g., memory 130 of FIG. 1 or FIG. 2). Thereafter, the MEC service may perform a service request using the corresponding token during the token validity period.

According to an embodiment, the MEC service discovery may be performed in a manner that if the electronic device 101 enters a MEC serviceable area (e.g., specific cell ID access or LADN area entry), the MEL 531 detects this, at least one of an App list (e.g., MEC App (name) list) that is usable in the corresponding area or a domain name (e.g., domain name for each MEC application) is received, and various functions are performed in accordance with user's setting. For example, the MEL 531 may provide available MEC application notification, DNS proxying, and/or MEC application enabling. For example, the currently usable MEC application may be displayed on a notification window or an application icon (e.g., App icon). According to an embodiment, installation of the client application corresponding to the corresponding MEC application may be notified on the electronic device 101.

According to an embodiment, the MEL 531 may provide the DNS proxying. For example, if at least one of a corresponding application name or DNS query matches the MEC App list in case that the DNS query for the corresponding domain name occurs in order for the client application to access the MEC application, the MEL 531 may obtain an access IP address of the corresponding MEC application by transmitting the corresponding DNS query to the DNS server for MEC, and may return the IP address to the client application 510. According to an embodiment, the corresponding IP address may be stored, for example, in a DNS cache for MEC in the electronic device 101 during its validity period. MEC DNS resolving for the domain name on the MEC App list may be performed by the MEL 531 itself separately from the DNS query of the client application, and may be stored in the DNS cache for MEC.

According to an embodiment, the MEL 531 may provide the MEC application enabling. For example, if the MEC client application installed in the electronic device 101 is in use or is expected to be used, the MEC application enabling (e.g., instantiation) interlocking with this may be requested. According to an embodiment, if the corresponding MEC application is not installed in a MEC host of an access area of the electronic device 101, installation of the MEC application may be requested (e.g., including package URI).

According to an embodiment, if the default PDU session is not used, but the use of the dedicated PDU session for the MEC service or MEC application is desired, route selection (e.g., DNN handling) may set a routing rule for the UID of the client application. According to an embodiment, the MSE 530 may receive dedicated DNN information for the MEC service or MEC application from a predefined profile or the AA server 580, and may request setup of the MEC dedicated PDU session using the UHL API (not illustrated).

According to an embodiment, an advanced performance measurement may include, for example, an advanced performance test performed by the MEL 531 with respect to a plurality of candidate MEC hosts. For example, the MEL 531 may select an optimum MEC host through the advanced performance test (e.g., ping probing or bandwidth estimation).

According to an embodiment, a location service may include a service providing based on an area in which the electronic device 101 is located. According to an embodiment, the MEL 531 may provide information on a service availability (or location accuracy) at the corresponding location of the electronic device 101. As an example, the information on the service availability may include, for example, information on a serviceable area (location confirmed), corresponding service not found (location not found), or unserviceable area (location spoofed).

According to an embodiment, the mobility handling may provide handling for service continuity in an area in which a handover occurs. For example, the MEL 531 may process a handover from the MEC host to another MEC host or a handover from the MEC host to a remote host.

According to an embodiment, the MEL 531 may identify control and service kind for discovery of the MEC application of the MEC host (e.g., MEC host 447 of FIG. 4) through communication with the MMP server (e.g., MMP server 430 of FIG. 4). For example, the MEL 531 may identify the service by the predefined MSE API call. As another example, the MEL 531 may identify the service in accordance with the policy received from an operator server (e.g., AA server 580) or the MMP server 430.

According to an embodiment, if the service is, for example, a service using the default PDU session as the result of the service identification, the MEL 531 may set a path (e.g., path ⓐ) of the service passing through the DHL 535, and thus the MEC service may be provided by the MEL 531 and the DHL 535. According to an embodiment, in case of data path ⓐ for the MEC application, the MEL 531 may be configured to provide the service through the default PDU session. According to another embodiment, if the service is, for example, a service using the dedicated PDU session as the result of the service identification, the MEL 531 may set a path (e.g., path ⓑ) of the service passing through the MEL 531, UHL 533, and DHL 535, and thus the corresponding service may be provided by the MEL 531, the UHL 533, and the DHL 535. According to an embodiment, in case of data path ⓑ for the MEC application, the MEL 531 may be configured to request the UHL 533 to provide the service through the dedicated PDU session. According to an embodiment, in order to identify the above-described various services, the MSA 520 may further provide separate information to the MEL 531, or the MEL 531 may receive (or obtain) related information from the MMP server 430.

According to an embodiment, the UHL 533 may request a dedicated PDU session for each service type in accordance with the API call, and may bind the dedicated PDU session set with respect to the corresponding application.

According to an embodiment, the DHL 535 may support DNS pre-resolving or DNS proxy function with respect to the 3$^{rd}$ party application. For example, if a DNS query for the MEC client application to access a specific service occurs in a state where data is connected through the existing default PDU session, the DNS proxy may hook the DNS query to transfer the query to the DNS server in the domain name for MEC, or may return the corresponding MEC domain IP address through lookup in the DNS cache. Through this, the 3$^{rd}$ party application can provide the MEC service without separate software correction and without separate traffic filtering (or steering) work of an operator.

According to an embodiment, the AA server 580 may provide authentication and authorization for MSE service usage. According to an embodiment, the MSA 520 of the electronic device 101 may be authorized for each service type in accordance with the authentication and subscriber information through the AA server 580. According to an embodiment, the MSA 520 may authenticate the MSE service usable client application. According to an embodiment, the authentication procedure between the AA server 580 and the MSA 520 of the electronic device 101 may be performed using the default PDU session currently connected to the Internet through the communication, for example, LTE or Wi-Fi, without using a separate PDU session.

According to an embodiment, the MMP server 430 may mean a proxy server that communicates with the electronic device 101 for the authentication or MEC control of the electronic device 101. According to an embodiment, the MMP server 430 may perform request/response message exchange based on, for example, a hypertext transfer protocol (HTTP). According to an embodiment, if the electronic device 101 can directly communicate with the AA server 580 or a MEC solution providing server, an LCM proxy may not be necessary. For example, in case of using a server API provided by the LCM proxy, an authentication request message of the MSA 520 may be forwarded to the AA server 580 to be authenticated, and a MEC control message may be transferred to the MEC solution providing server. According to various embodiments, the interlocking API between the MSA 520 and the MMP server 430 or an entitlement server may be omitted, and information that is necessary in the AA procedure (e.g., authentication and authorization procedure) may be received in advance.

According to an embodiment, in an access and mobility function (AMF)/policy control function (PCF) server 590, MMP information and URPS rules are registered in the PCF, for example, in case of supporting the MEC in the 5G new radio (NR) standard, and the corresponding information may be received from the AMF through NAS signaling.

As described above, according to various embodiments, the MSA 520 may communicate with the AA server 580 to perform the authentication and to request desired information (e.g., authentication and authorization), and may receive and obtain the requested information from the AA server 580. According to various embodiments, the MSE 530 may communicate with the MMP server 530 to request desired information, and may receive and obtain the requested information from the MMP server 530. For example, the MSE 530 may communicate with the MMP server 430 to obtain a MEC App list or to perform MEC service discovery procedure, and may set a connection to at least one specific MEC host (or MEC application).

According to various embodiments, as described above with reference to FIGS. 4 and 5, in case of setting a data path of an application for MEC based on the electronic device 101 including the MSA 520 and the MSE 530, various service scenarios may be provided as follows.

1. Scenario (e.g., MSE on Single PDU Session) of a First Data Path (e.g., Path ⓐ)

The scenario of the first data path (e.g., path ⓐ) according to an embodiment may indicate a scenario in which the client application connects to the MEC application using the default PDU session (or public data network (PDN) connection) being used for the existing Internet data. According to an embodiment, the MEL 531 may request MEC application driving and connection from a MEC host that is close to the electronic device 101 by performing the MEC discovery procedure, and may receive an URI of the corresponding MEC application. If the client application 510 requests to access the corresponding MEC application, it may perform an access to the MEC application IP address obtained through DNS resolving for the corresponding URI. According to an embodiment, in the scenario (e.g., MSE on single PDU session) of the first data path, a separate PDU session for the MEC service is not used, and the UHL 533 that controls the URSP rule may not intervene in operation.

2. Scenario B (e.g., MSE on Multiple PDU Sessions with MEL) of a Second Data Path (e.g., Path ⓑ)

The scenario of the second data path (e.g., path ⓑ) according to an embodiment may indicate a scenario in which the client application connects to the MEC application by creating a separate MEC dedicated PDU session in addition to the default PDU session (or PDN connection) for the existing Internet. According to an embodiment, the MEC dedicated PDU session setup may follow the policy of an operator (e.g., mobile network operator (MNO) or MMP server 430), and the MSA 520 or the authenticated client application 510 may set the MEC dedicated PDU session through the UHL 533 using the MSE API. According to an embodiment, one or more MEC dedicated PDU sessions may always be open in addition to the default PDU session, and if necessary, they may be dynamically created or released by a request from the MEL 531 at a specific time. According to an embodiment, the UHL 533 of the MSE 530 may support to route traffics for the corresponding client application (or UID) or accessed URI to the MEC dedicated PDU session in accordance with the predefined rule (e.g., CARP or URSP rule) or a routing rule received from an external server (e.g., MMP server 430, AA server 580, or AMF/PCF server 590).

3. Scenario (e.g., MSE on Multiple PDU Sessions without MEL) of a Third Data Path (e.g., Path ⓒ)

The scenario of the third data path (e.g., path ⓒ) according to an embodiment may indicate a scenario in which only a dedicated PDU session is set and used with respect to a specific service without a function of the MEL 531. According to an embodiment, the MSA 520 or the authenticated client application 510 may set a separate dedicated PDU session using the MSE API, register an application (e.g., UID) rule using the corresponding PDU session, and operate to route traffics of the corresponding application to the corresponding PDU session. According to an embodiment, the scenario (e.g., MSE on multiple PDU sessions without MEL) of the third data path may be utilized in not only the MEC but also various types of services requiring the dedicated PDU session (e.g., FOC, MMS, or URLLC).

An electronic device 101 according to various embodiments of the disclosure may include a network interface 420 and a processor 120, and the processor 120 may obtain information on applications that can be provided by at least one external server from the at least one external server connectable in a base station or through the base station using the network interface, select the external device including the application corresponding to a designated condition based on the information on the applications, and perform data transmission with the selected external server.

According to various embodiments, the processor 120 may transmit a request message for requesting the information on the applications to the at least one external server, receive a response message including the information on the applications from the at least one external server, and obtain the information on the applications from the response message.

According to various embodiments, the processor 120 may designate a condition on the information on the applications in the request message, and transmit the request message to the at least one external server.

According to various embodiments, the request message may include at least one of clientappName, locationInfo, deviceType, serviceType, contextType, or URI request.

According to various embodiments, the response message may include at least one of referenceURI, clientAppName, clientAppPackageURL, uriTTL, uriOC, carpRule, DNN, S-NSSAI, accessType, sessionType, mptcp, or fqdnList.

An electronic device 101 according to various embodiments of the disclosure may include a network interface 420 and a processor 120, and the processor 120 may obtain an app list of serviceable applications from a designated external server based on a discovery policy, obtain, from the designated external server, information related to an application that is related to a client application of the electronic device and intended to be accessed based on the app list, determine a host for data transmission based on the obtained information, and perform the data transmission with the host.

According to various embodiments, the processor 120 may include a service agent performing an operation related to authentication and authorization by communicating with the external server, and a service enabler obtaining the app list by communicating with the external server and performing a discovery related operation.

According to various embodiments, the processor 120 may enable the service enabler through an API between the service agent and the service enabler, and perform a discovery procedure with the external server through the service enabler.

According to various embodiments, the processor 120 may include setting the discovery policy from the service agent to the service enabler, the discovery policy may include a client application name (clientAppName) and the discovery policy (discoveryPolicy), and the discovery policy (discoveryPolicy) may include at least one of whether to use a dynamic DNN (dynamicDnn), location information (locationInfo), a device type (deviceType), a service type (serviceType), or a context type (contextType).

According to various embodiments, the processor 120 may enable the service enabler based on reception of the discovery policy from the service agent, and request, from a proxy server, the app list satisfying a condition designated according to the discovery policy through the service enabler.

According to various embodiments, the processor 120 may request a URI of the application from a proxy server through the service enabler in case that the application related to the client application is not in the app list, and include an application name in the application and transmit the application to the proxy server in case that the application related to the client application is in the app list.

According to various embodiments, the processor 120 may download the application from the proxy server, or obtain an application package URI for installation from the proxy server in case that the application is not in the proxy server.

According to various embodiments, the processor 120 may perform a DNS query to the URI of the application through the service enabler, and store an IP address obtained as a DNS response corresponding to the DNS query in a local DNS cache.

According to various embodiments, the processor 120 may select the host based on additional information in case that a candidate IP list of a plurality of hosts is received from the external server, and the additional server may include information on a host location, a user's current location, a user speed, or a host performance.

An electronic device 101 according to various embodiments of the disclosure may include a network interface 420 and a processor 120, and the processor 120 may obtain an app list of serviceable applications from a designated external server based on a discovery policy, obtain, from the designated external server, information related to an application that is related to a client application and intended to be accessed based on an event related to a context creation by the client application, select a host for data transmission based on the obtained information, and perform the data transmission with the host.

According to various embodiments, the event related to the context creation may include at least one of an execution of the client application, a context creation request by the client application, or a DNS query generation by the client application.

According to various embodiments, the discovery policy may include a client application name (clientAppName) and a discovery policy (discoveryPolicy), and the discovery policy (discoveryPolicy) may include at least one of whether to use a dynamic DNN (dynamicDnn), location information (locationInfo), a device type (deviceType), a service type (serviceType), or a context type (contextType).

According to various embodiments, the processor 120 may request, from a proxy server, the app list satisfying a condition designated according to the discovery policy.

According to various embodiments, the processor 120 may request a URI of the application from a proxy server in case that the application related to the client application is not in the app list, and include an application name in the application and transmit the application to the proxy server in case that the application related to the client application is in the app list, whereas the processor 120 may download the application from the proxy server, or obtain an application package URI for installation from the proxy server in case that the application is not in the proxy server.

According to various embodiments, the processor 120 may perform a DNS query to the URI of the application, and store an IP address obtained as a DNS response corresponding to the DNS query in a local DNS cache.

Hereinafter, an operation method of an electronic device 101 according to various embodiments will be described. For example, various operations of receiving authentication and authorization (e.g., authentication/authorization (AA) and policy (e.g., app routing policy, discovery policy, or monitoring policy) according to various embodiments based on the electronic device 101 including the MSA 520 and the MSE 530, and performing route setup based on the received policy and MEC discovery procedure will be hereinafter described.

The operations performed by the electronic device 101 as described hereinafter may be executed by at least one processor of the electronic device 101 (e.g., at least one processor including a processing circuit, e.g., processor 120 of FIG. 1 (hereinafter referred to as "processor 120"). According to an embodiment, the operations performed by the electronic device 101 may be stored in a memory (memory 130 of FIG. 1 (hereinafter referred to as "memory 130"), and during execution, they may be executed by instructions for operating the processor 120.

Figure 6:
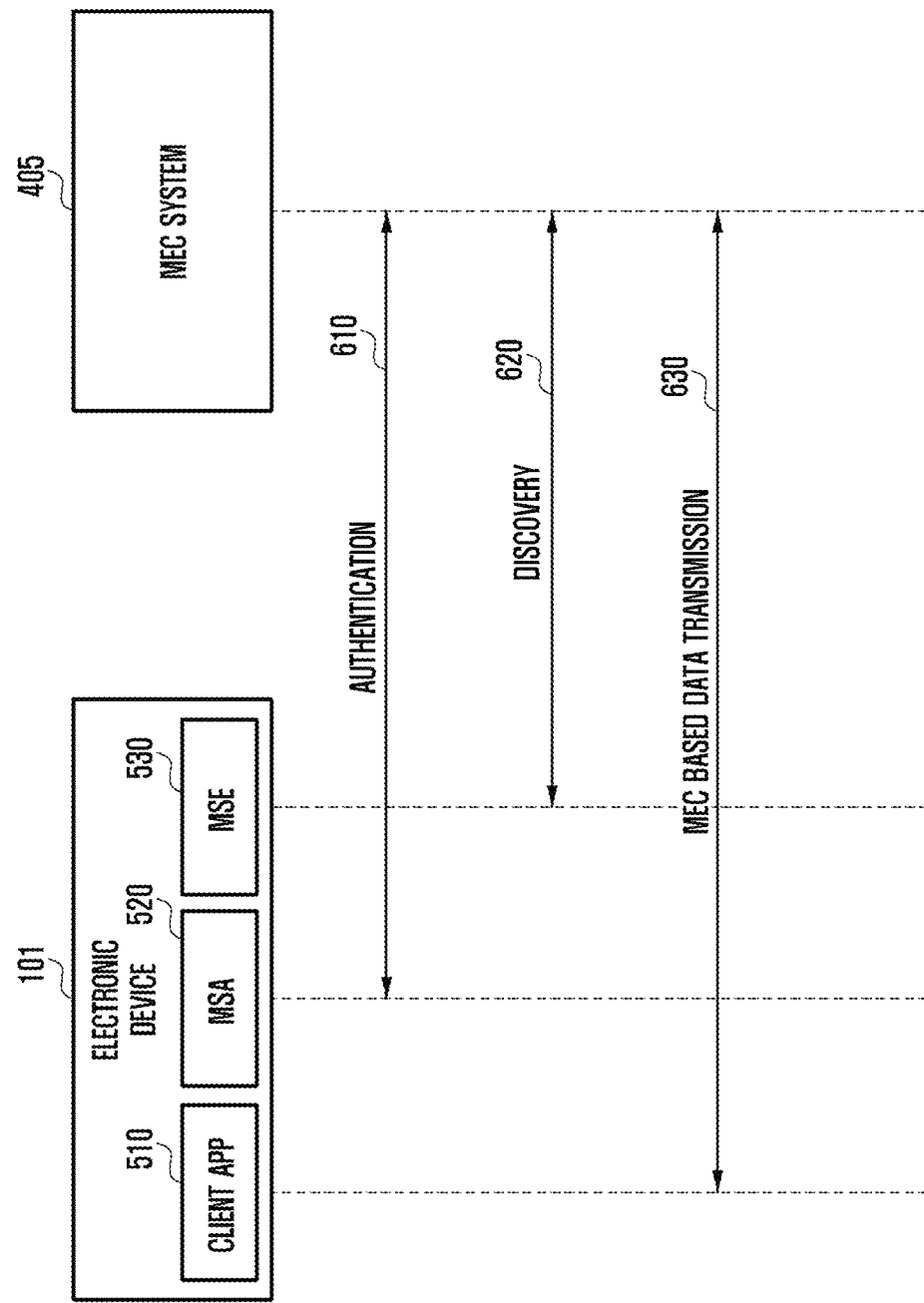
FIG. 6 is a diagram explaining authentication and discovery procedures for supporting a MEC service according to various embodiments.

FIG. 6 is a diagram explaining authentication and discovery procedures for supporting a MEC service according to various embodiments.

According to various embodiments, FIG. 6 illustrates an example of a signal flowchart for performing authentication (e.g., authentication & authorization) and discovery procedures of applications for the MEC service. According to an embodiment, although FIG. 6 illustrates an example in which the electronic device 101 exchanges signals (or data) with a MEC system 405, the electronic device 101 may exchange signals with constituent elements (e.g., AA server 580 of FIG. 5, MMP server 430, and/or AMF/PCF server 590) included in the MEC system 405 through an AN 302. According to an embodiment, the electronic device 101 may include a client application 510, an MSA (or service agent) 520, and an MSE (or service enabler) 530 as described above with reference to FIGS. 4 and 5. According to an embodiment, the MEC system 405 may correspond to the MEC system 405 as described above with reference to FIGS. 4 and 5, and may include the AA server 580, the MMP server 430, and/or the AMF/PCF server 590.

With reference to FIG. 6, at operation 610, the MSA 520 of the electronic device 101 may perform an authentication (e.g., MEC authentication) procedure with the MEC system 405. According to an embodiment, the authentication procedure is an AA procedure, and it may include, for example, authentication and/or authorization procedures. According to an embodiment, the authentication procedure may include a series of operations for identifying (or identifying a user) whether the MEC service is usable, and the authorization procedure may include a series of operations for identifying a MEC service level (e.g., QoS or resource amount). According to various embodiments, the MSA 520 may perform user (or subscriber) authentication by initially accessing the MMP server 430 or the AA server 580, and may receive MMP information (MMP Info) and necessary information for the authorization, traffic path, or control data, such as CARP or URSP rule for PDU session setup from the MMP server 430 or the AA server 580. According to an embodiment, the MSA 520 may perform the authentication procedure by accessing the corresponding MMP server 430 based on the reception of the control data. According to an embodiment, the MSA 520 may obtain (or receive) authentication information (e.g., access token (MEC access token (MAT))) for accessing the MEC system 405 from the MEC system 405 (e.g., MMP server 430). The access token (MAT) may include a key required for the application to receive the service from the MEC system 405. According to various embodiments, the authentication procedure will be described in detail with reference to the drawings to be described later.

According to various embodiments, the authentication and the authorization may include, for example, authentication for the electronic device 101 and/or the user. For example, the electronic device 101 may perform authentication of the electronic device (e.g., user terminal) 101 or the subscriber through the MSA 520, and if the authentication is completed, the client application 510 of the corresponding electronic device 101 may permit an access for the MEC service. In this case, the client application 510 may be an application internally authenticated by the MSA 520, and an operation of providing the client application 510 with a separate access token (e.g., MAT) may be omitted.

According to an embodiment, although not illustrated in FIG. 6, the electronic device 101 (e.g., MSA 520) may perform an authentication procedure for the client application 510 that can perform MEC based data transmission among a plurality of applications installed in the electronic device 101. According to an embodiment, the authentication procedure may be performed based on OAuth standards. According to another embodiment, the electronic device 101 may perform the authentication procedure through comparison of a white list agreed with the MEC system 405 or a white list received from a separate external server (or third server) (not illustrated) with information of the client application 510 (e.g., application package name) installed in the electronic device 101. According to an embodiment, if the authentication procedure is completed, the electronic device 101 may provide an access token to the authenticated client application 510. According to an embodiment, the access token may be a token that is used to accept an access request for using the corresponding access token through the authentication. For example, an unauthorized request that does not use the corresponding token may limit the service providing. According to an embodiment, the authentication procedure for the client application may be omitted, or may be performed prior to operation 610.

At operation 620, the MSE 530 of the electronic device 101 may perform a discovery (e.g., MEC service discovery) procedure with the MEC system 405. According to various embodiments, the MSE 530 may perform a discovery procedure to access an optimum MEC application at a location closest to the electronic device 101 using the received authentication information (e.g., MAT). According to an embodiment, the discovery procedure may include a series of procedures for identifying (or discovering) application(s) (e.g., MEC application(s) 460-1 and 460-2 of FIG. 4) that can be provided by the MEC system 405. The discovery procedure according to various embodiments will be described in detail with reference to the drawings to be described later. According to an embodiment, the electronic device 101 may perform the authentication procedure (e.g., operation 610) according to various embodiments, and then may perform the discovery procedure according to various embodiments to be described later. According to another embodiment, the electronic device 101 may perform the discovery operation, for example, with reference to a message exchange method for operations (e.g., application lookup and context create/release) defined in the MEC standard of European Telecommunication Standards Institute (ETSI).

At operation 630, the electronic device 101 may perform data transmission with the MEC system 405 after the discovery. According to an embodiment, the client application 510 of the electronic device 101 may access an optimum MEC application by obtaining (or receiving) an IP address of the MEC host that is closest to the electronic device 101 through performing of the DNS resolving from the URI of the MEC host (e.g., edge server or MEC server) intended to access. According to various embodiments, the client application 510 may perform the data transmission without performing an additional authentication procedure with the MEC system 405 based on the provided access token. FIG. 6 illustrates an embodiment in which one client application 510 performs the data transmission, but in case that a plurality of applications perform the data transmission, the plurality of applications may perform the data transmission through the access token (MAT) obtained through the MSA 520 without the necessity of individually performing the authentication procedure with the MEC system 405, and thus the network load can be reduced.

MEC Authentication Procedure

Figure 7:
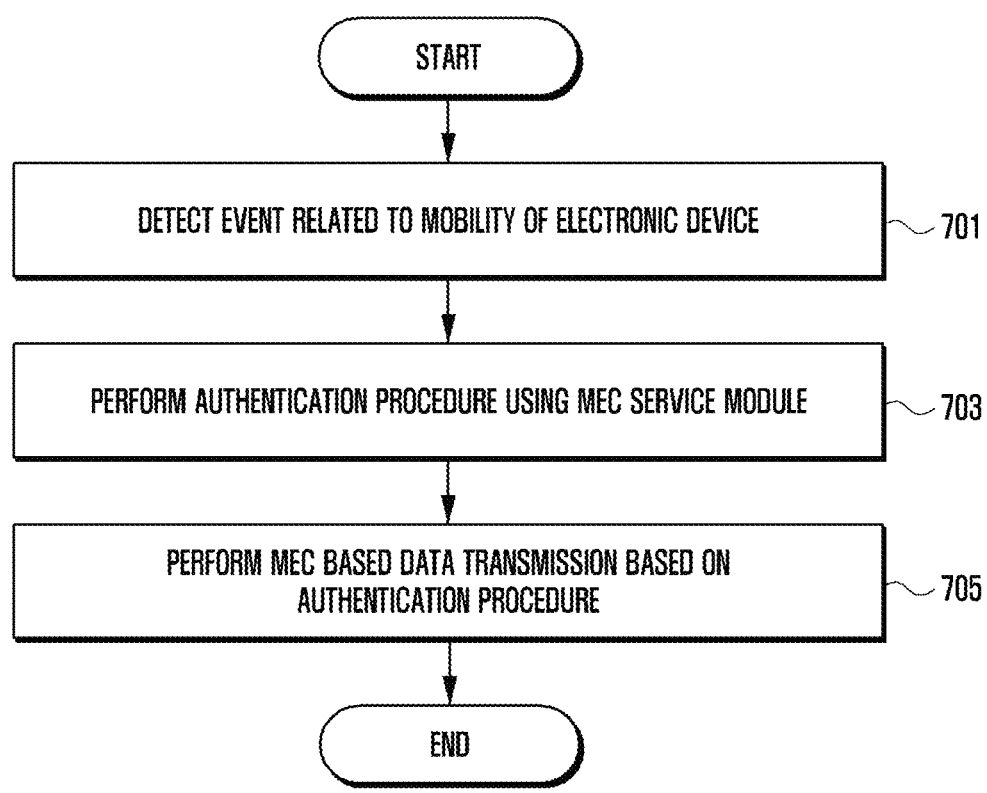
FIG. 7 is a flowchart illustrating an operation method of an electronic device for performing an authentication procedure of applications according to various embodiments.

FIG. 7 is a flowchart illustrating an operation method of an electronic device 101 according to various embodiments.

According to various embodiments, operations illustrated in FIG. 7 may be performed, for example, by the electronic device 101 or a constituent element (e.g., processor 120 of FIG. 1) included in the electronic device 101, or the MEC service module 410 of FIG. 4.

With reference to FIG. 7, at operation 701, the electronic device 101 may detect an event related to mobility of the electronic device 101. For example, the electronic device 101 may monitor context information (e.g., application related information, mobility related information, application lifecycle information, information on the state of the electronic device 101, sensor information, or network performance information), and may identify the event related to the mobility based on obtaining (or identifying) the mobility related information (e.g., information indicating movement of the electronic device 101, information related to a change of a base station connected to the electronic device 101, or information related to whether the electronic device 101 enters a designated area) based on the result of monitoring. According to an embodiment, the electronic device 101 may perform or may skip operation 701.

At operation 703, the electronic device 101 may perform an authentication procedure with the MEC system 405 using the MEC service module 410 (e.g., MSA 520). For example, the electronic device 101 may perform the authentication procedure in response to detection of entry of the electronic device 101 into a designated area. According to an embodiment, the electronic device 101 may perform the authentication procedure in accordance with the authentication procedure according to various embodiments to be described later, and may obtain the access token from the MEC system 405 (e.g., AA server 580 or MMP server 430).

At operation 705, the electronic device 101 may perform data transmission for at least one application based on the authentication procedure performed between the MEC service module 410 and the MEC system 405.

Hereinafter, a MEC authentication procedure according to various embodiments will be described. According to various embodiments, various authentication scenarios (e.g., scenario A, scenario B, and scenario C) may be provided based on a service providing type (or model).

According to various embodiments, although three kinds of authentication scenarios are disclosed, it will be understood that the embodiments as disclosed in the description are specific examples to help easy understanding of the technical contents according to the embodiments, and they do not limit the scope of the disclosure. Accordingly, the scope of the various embodiments is defined by the appended claims, and it will be construed that all corrections and modifications derived based on the technical idea of the disclosure fall within the scope of the disclosure.

Figure 8:
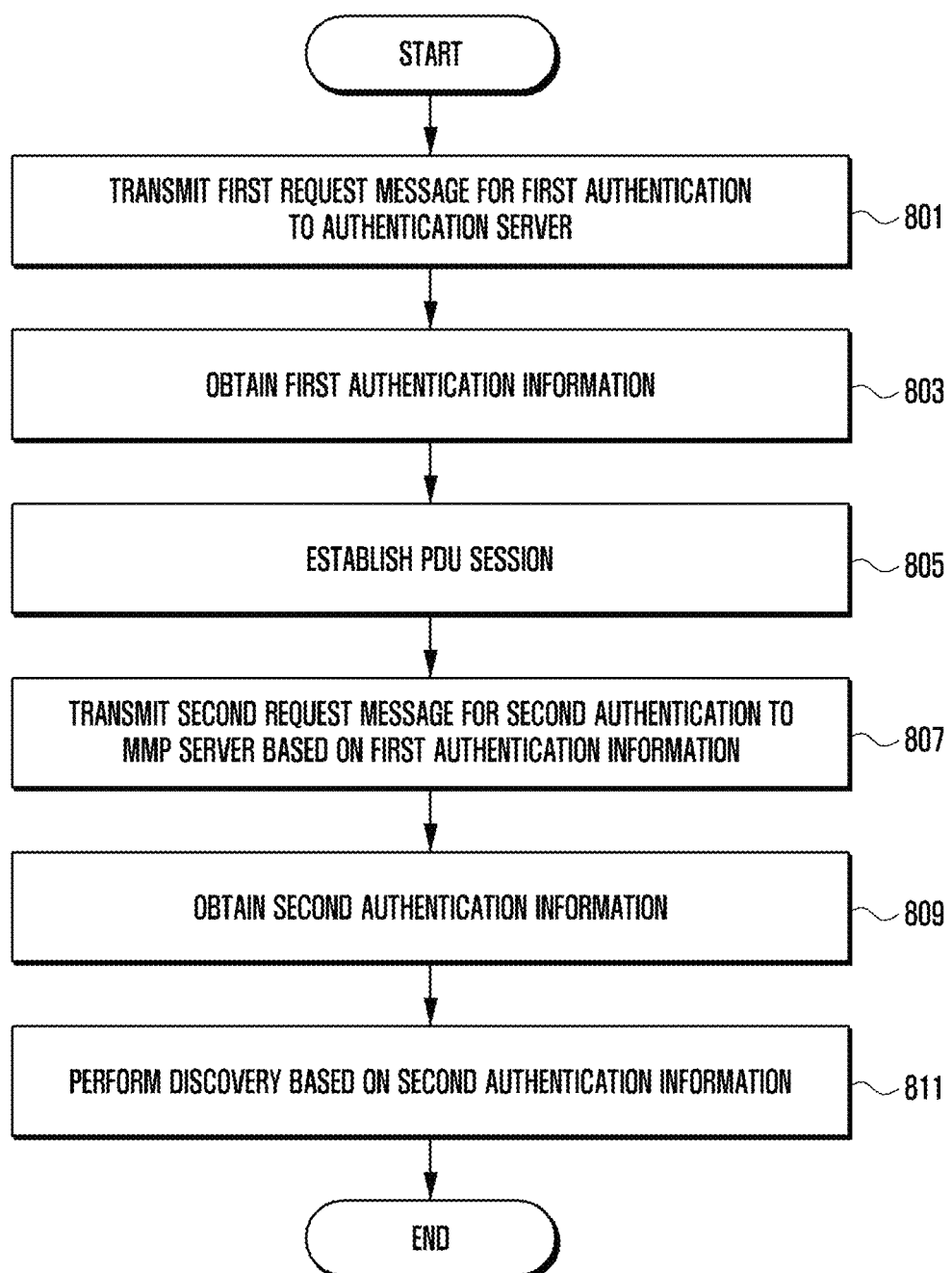
FIG. 8 is a flowchart illustrating an operation method of an electronic device for an authentication procedure according to various embodiments.

FIG. 8 is a flowchart illustrating a method by an electronic device 101 for performing an authentication procedure according to various embodiments.

With reference to FIG. 8, at operation 801, the processor 120 (or MSA 520 of FIG. 5) of the electronic device 101 may transmit a first request message for a first authentication (e.g., authentication) to an authentication server (e.g., AA server 580 of FIG. 5). According to an embodiment, the MSA 520 of the electronic device 101 may transmit a message for the authentication request to the AA server 580 based on at least one designated authentication method.

According to an embodiment, the MSA 520 may request the authentication from the AA server 580 using generic public subscription identifier (GPSI) based application-layer AKA method, ID/password based login method, or a GBA method.

At operation 803, the processor 120 may obtain first authentication information in accordance with the result of the authentication from an authentication server. According to an embodiment, the MSA 520 of the electronic device 101 may perform authentication with the AA server 580, and may obtain (or receive) the authentication information in accordance with the result of the authentication from the AA server 580. The authentication information may include, for example, MMP related information (hereinafter referred to as "MMP Info") and an authorization code (hereinafter referred to as "Auth code"). According to an embodiment, in addition to the above-described information, the authentication information may further include additionally (or selectively) required information, for example, at least one of identification token (e.g., ID_token) for authentication or a CARP or URSP rule for the MEC data service. According to an embodiment, the MMP Info may include, for example, information related to an access to the MMP server 430 (e.g., MMP access address). For example, the MMP Info may include address information (e.g., uniform resource identifier (URI) or IP address) of a new MMP server 430 to be accessed, a validity period for the corresponding address information, and/or location related information. According to an embodiment, the Auth code may include a code (e.g., OAuth2.0 based) required to request an access token (e.g., MAT) from the MMP server 430. According to an embodiment, the CARP or URSP rule may include, for example, DNN configuration related information, information related to usable application (or application group) for each DNN, a DNN list that can be set thereafter, or information related to the maximum number of DNNs that can be set.

At operation 805, the processor 120 may set up (e.g., policy update) a PDU session for the client application (e.g., dedicated PDU session for MEC). According to an embodiment, the MSA 520 of the electronic device 101 may set the PDU session through the MSE 530 in accordance with the CARP rule or the URSP rule (e.g., DNN). According to an embodiment, if the authentication procedure is completed, the MSA 520 of the electronic device 101 may perform policy update (e.g., PDU session setup) with the MSE 530. According to an embodiment, the MSA 520 may change the default PDU session, or may additionally set a new dedicated PDU session. According to an embodiment, the PDU session setup operation for the policy update at operation 807 may be performed, for example, by the MSA 520 in case that the CARP or URSP rule is provided from the AA server 580. According to an embodiment, the MSA 520 may perform an initial PDU session setup in accordance with the CARP or URSP rule (e.g., DNN). According to an embodiment, if the URSP rule is provided in information received from the MMP server 430, the MSA 520 may update the URSP rule using the MSE API.

At operation 807, the processor 120 may transmit a second request message for a second authentication (e.g., authorization) to the MMP server 430 based on the first authentication information. According to an embodiment, the second authentication (e.g., authorization) may include a procedure for obtaining an authorization request for the service usage and authorization (e.g., access token issuance) in accordance with the authorization request. According to an embodiment, after the authentication completion (or after the policy update performing or release with the MSE 530), the MSA 520 of the electronic device 101 may transmit a message for the authorization request to the MMP server 430. According to an embodiment, the MSA 520 may request the authentication from the MMP server 430 based on the authentication information (e.g., Auth code or additionally included identification token (ID_token)) obtained from the AA server 580.

At operation 809, the processor 120 may obtain second authentication information in accordance with the result of the authentication from the MMP server 430. According to an embodiment, the MSA 520 of the electronic device 101 may perform an authorization procedure with the AA server 580 through the MMP server 430, and may obtain (or receive) the authentication information in accordance with the result of the authentication from the MMP server 430. The authentication information may include, for example, the access token (e.g., MAT) and the MMP Info.

At operation 811, the processor 120 may perform the discovery procedure by accessing the corresponding MMP server 430 based on the second authentication information. According to an embodiment, if the authentication information (e.g., MAT) in accordance with the result of the authentication is received from the MMP server 430, the MSA 520 of the electronic device 101 may transfer the received authentication information to the MSE 530 of the electronic device 101, and may enable the MSE 530. According to an embodiment, together with the authentication information, the MSA 520 may transfer at least one piece of additional information, such as an access address (e.g., URI or IP address) of a new MMP server 430 to be accessed in order to perform the MEC discovery procedure, a DNS server address, or a DNN to be used, to the MSE 530 through the MSE API. According to an embodiment, the MSE 530 of the electronic device 101 may perform the MEC discovery procedure at least based on the authentication information (e.g., MAT) and/or other additional information (e.g., MMP Info, DNS server address, or DNN to be used). According to an embodiment, the MSE 530 may perform the MEC discovery procedure after accessing the corresponding MMP server 430 using the MMP Info and the MAT. According to an embodiment, if the MMP Info related to the new MMP server 430 is not included in the second authentication information, the processor 120 may perform the MEC discovery procedure based on the MMP Info included in the first authentication information.

According to various embodiments, the authentication procedure as illustrated in FIG. 8 may include, for example, a scenario in which the client application 510 connects to the MEC application using the default PDU session (or PDN). For example, the MSE 530 (e.g., MEL 531) may request MEC application driving and connection from a MEC host close to the electronic device 101 by performing the MEC discovery procedure, and may receive the URI of the corresponding MEC application. Thereafter, in case of requesting an access to the corresponding MEC application, the client application 510 may access the MEC application IP address obtained through the DNS resolving for the corresponding URI.

According to various embodiments, the authentication procedure as illustrated in FIG. 8 may include, for example, a scenario in which the client application connects to the MEC application by setting a separate MEC dedicated PDU session in addition to the default PDU session (or PDN). For example, the MEC dedicated PDU session setup may follow the policy of an operator (e.g., MNO or MMP server 430), and the MSA 520 or the authenticated client application may set the MEC dedicated PDU session through the UHL 533 using the MSE API. According to an embodiment, one or more MEC dedicated PDU sessions may always be open in addition to the default PDU session, and if necessary, they may be dynamically created or released by a request from the MEL 531 at a specific time. According to an embodiment, the UHL 533 of the MSE 530 may support to route traffics for the corresponding client application (or UID) or accessed URI to the MEC dedicated PDU session in accordance with the predefined rule (e.g., CARP or URSP rule) or a routing rule received from an external server (e.g., MMP server 430, AA server 580, or AMF/PCF server 590).

According to various embodiments, the authentication procedure as illustrated in FIG. 8 may include a scenario in which only the dedicated PDU session is set and used with respect to a specific service. According to an embodiment, the MSA 520 or the authenticated client application 510 may set a separate dedicated PDU session using the MSE API, register an application (e.g., UID) rule using the corresponding PDU session, and route traffics of the corresponding application to the corresponding PDU session.

Figure 9:
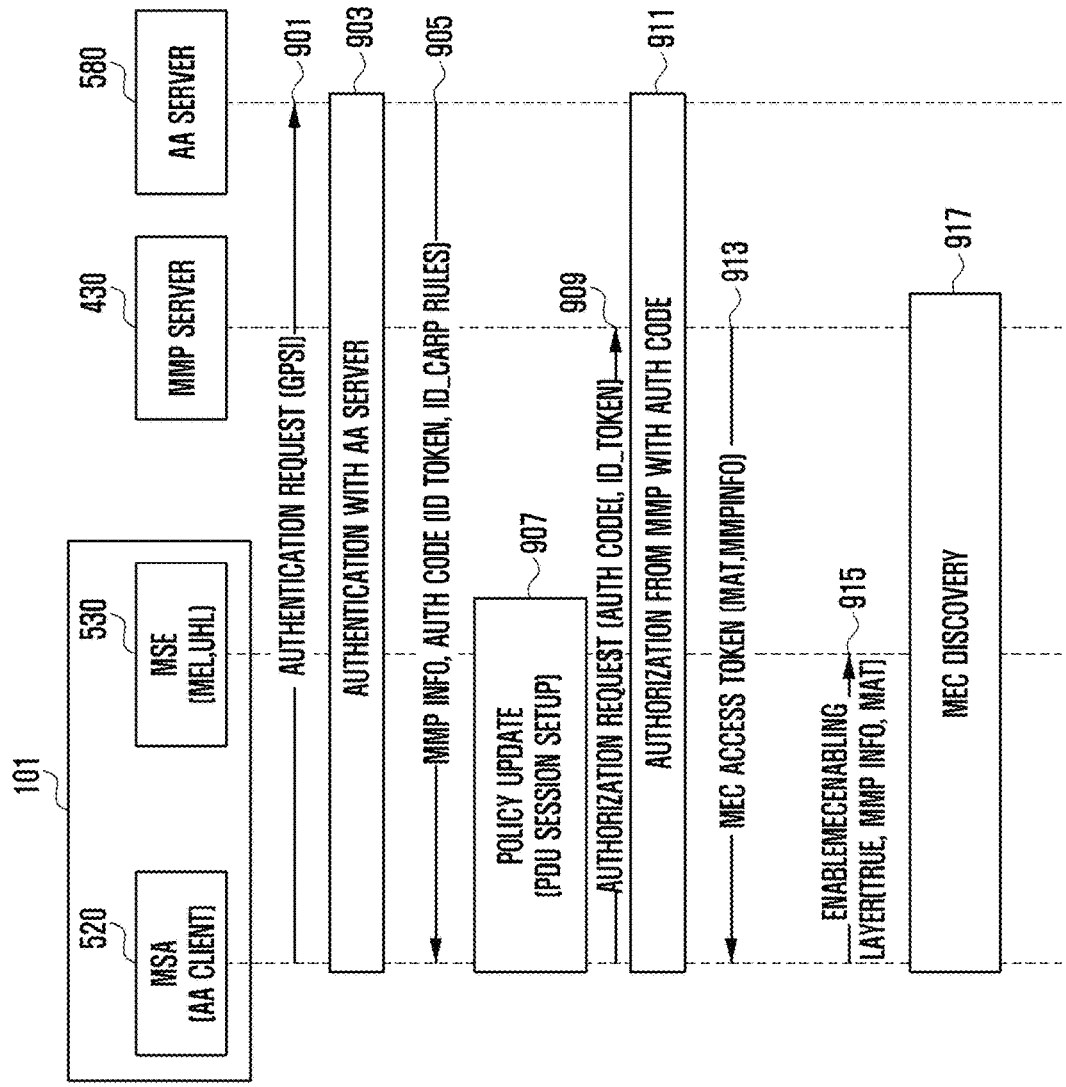
FIG. 9 is a diagram illustrating an example of an authentication procedure according to various embodiments.

FIG. 9 is a diagram illustrating an example of an authentication procedure according to various embodiments.

As illustrated in FIG. 9, the electronic device 101 may include an MSA (or service agent) 520 (e.g., including AA client 525) and an MSE (or service enabler) 530 (e.g., including MEL 531 or UHL 533).

With reference to FIG. 9, at operation 901, the MSA 520 of the electronic device 101 may transmit a message (e.g., first request message) for an authentication (e.g., first authentication) request to the AA server 580 based on at least one designated authentication method (e.g., first authentication). According to an embodiment, the MSA 520 may request the authentication from the AA server 580 using a generic public subscription identifier (GPSI) based application-layer AKA method, an ID/password based login method, or a GBA method.

At operation 903, the MSA 520 may perform the authentication with the AA server 580. According to an embodiment, the MSA 520 may perform GPSI based user authentication with the AA server 580.

At operation 905, if the authentication request is received from the electronic device 101, the AA server 580 may perform the authentication with the electronic device 101, and if the authentication is completed (e.g., authentication procedure completion), it may provide (or transmit) the authentication information (e.g., first authentication information) in accordance with the result of the authentication to the electronic device 101 (e.g., MSA 520). According to an embodiment, the authentication information may include, for example, MMP related information (hereinafter referred to as "MMP Info") and an authorization code (hereinafter referred to as "Auth code"). According to an embodiment, in addition to the above-described information, the authentication information may further include additionally (or selectively) required information, for example, at least one of ID_token for authentication or a CARP or URSP rule for the MEC data service.

According to an embodiment, the MMP Info may include, for example, information related to an access to the MMP server 430 (e.g., MMP access address). For example, the MMP Info may include address information (e.g., uniform resource identifier (URI) or IP address) of a new MMP server 430 to be accessed, a validity period for the corresponding address information, and/or location related information. According to an embodiment, the Auth code may include a code (e.g., OAuth2.0 based) required to request an access token (e.g., MAT or MEC access token) from the MMP server 430. According to an embodiment, the CARP or URSP rule may include, for example, related information (e.g., DNN) for PDU session setup, information related to a usable application (or application group) for each DNN, a DNN list that can be set thereafter, or information related to the maximum number of DNNs that can be set.

At operation 907, if the authentication procedure with the AA server 580 is completed, the MSA 520 may perform policy update (e.g., PDU session setup) with the MSE 530. According to an embodiment, the MSA 520 may set the PDU session in accordance with the CARP rule or URSP rule (e.g., DNN). For example, the MSA 520 may identify the policy of whether to set the PDU session in accordance with the CARP rule or URSP rule, and may transfer a PDU session setup request to the MSE 530 through the MSE API in accordance with the CARP rule or URSP rule. The MSE 530 may set the PDU session corresponding to the PDU session setup request. According to an embodiment, the MSA 520 may change the default PDU session, or may additionally set a new dedicated PDU session.

According to an embodiment, the policy update operation of the MSA 520 and the MSE 530 at operation 907 may be performed, for example, by the MSA 520 in case that the CARP or URSP rule is provided from the AA server 580. According to an embodiment, if the CARP or URSP rule is not provided from the AA server 580, the MSA 520 may not perform the policy update with the MSE 530. According to another embodiment, even if the CARP or URSP rule is provided from the AA server 580, the MSA 520 may not perform the policy update through determination of the MSA 520 itself or information exchange with the MSE 530.

At operation 909, after the authentication completion (or after create or release of the policy update with the MSE 520), the MSA 520 may transmit a message (e.g., second request message) for authorization (e.g., second authentication) request. According to an embodiment, the MSA 520 may request the authentication from the MMP server 430 based on the authentication information (e.g., Auth code or additionally included ID_token) obtained from the AA server 580.

At operation 911, the MSA 520 may perform the authentication (e.g., authorization procedure) with the AA server 580 through the MMP server 430. According to an embodiment, the MSA 520 may perform service authorization for service usage with the AA server 580 based on the Auth code.

At operation 913, the MMP server 430 may provide (or transmit) the authentication information (e.g., second authentication information) in accordance with the result of the authentication to the electronic device 101 (e.g., MSA 520) in response to the authentication request (e.g., second request message) from the MSA 520. According to an embodiment, the authentication information may include, for example, an access token (e.g., MAT or MEC access token) and the MMP Info. According to an embodiment, the MMP server 430 may transmit a response including the access token to the MSA 520 during or after performing of the authentication of the MSA 520.

At operation 915, the MSA 520 may enable the MSE 530. According to an embodiment, if the authentication information (e.g., access token (MAT)) in accordance with the result of the authentication is received from the MMP server 430 during or after performing of the authentication with the AA server 580, the MSA 520 may enable the MSE 530 by transferring the received authentication information (e.g., access token (MAT)) to the MSE 530. According to an embodiment, together with the authentication information (e.g., access token (MAT)), the MSA 520 may transfer at least one piece of additional information, such as an access address (e.g., URI or IP address) of a new MMP server 430 to be accessed in order to perform the MEC discovery procedure, a DNS server address, or a DNN to be used, to the MSE 530. According to an embodiment, the MSA 520 may enable the MSE 530 based on the received access token (MAT) and/or other additional information. According to an embodiment, if the MSA 520 performs the authentication (e.g., authorization) with the MMP server 430, it may receive the access token (e.g., MAT) from the MMP server 430 as the result of the authentication, and for example, it may transfer the MMP access information (MMP Info) and the access token (MAT) to the MSE 530 by calling, for example, enableMecEnablingLayer(true, MMP Info, MAT) of the MSE API.

At operation 917, the MSE 530 may receive the authentication information (e.g., MAT) and/or other additional information (e.g., MMP Info, DNS server address, or DNN to be used), and may perform the MEC discovery at least based on the authentication information and/or the additional information. According to an embodiment, the MSE 530 may perform the MEC discovery procedure after accessing the corresponding MMP server 430 using the MMP Info and the MAT.

Although not illustrated in FIG. 9, according to another embodiment, the MSE 530 may perform the authentication (e.g., service authorization at operation 911) with the MMP server 430. According to an embodiment, if the MSE 530 performs the authentication (e.g., authorization) with the MMP server 580, the MSA 520, which has completed the authentication, may receive the MMP Info and Auth code and/or other additional information (e.g., identification token (ID_token)) from the MMP server 430 as the result of the authentication, and for example, to enable the MSE 530, it may call enableMecEnablingLayer(true, MMP Info, Auth code, [ID-token]) of the MSE API to transfer the same to the MSE 530. The MSE 530 may perform the authorization directly with the MMP server 430 from the information transferred from the MSA 520, and may receive (or obtain) the MAT as the result. For example, in comparison with the operations of FIG. 9, among the internal configurations of the electronic device 101, the subject to perform the service authentication procedure for authorization may be divided into the MSA 520 and the MSE 530.

Figure 10:
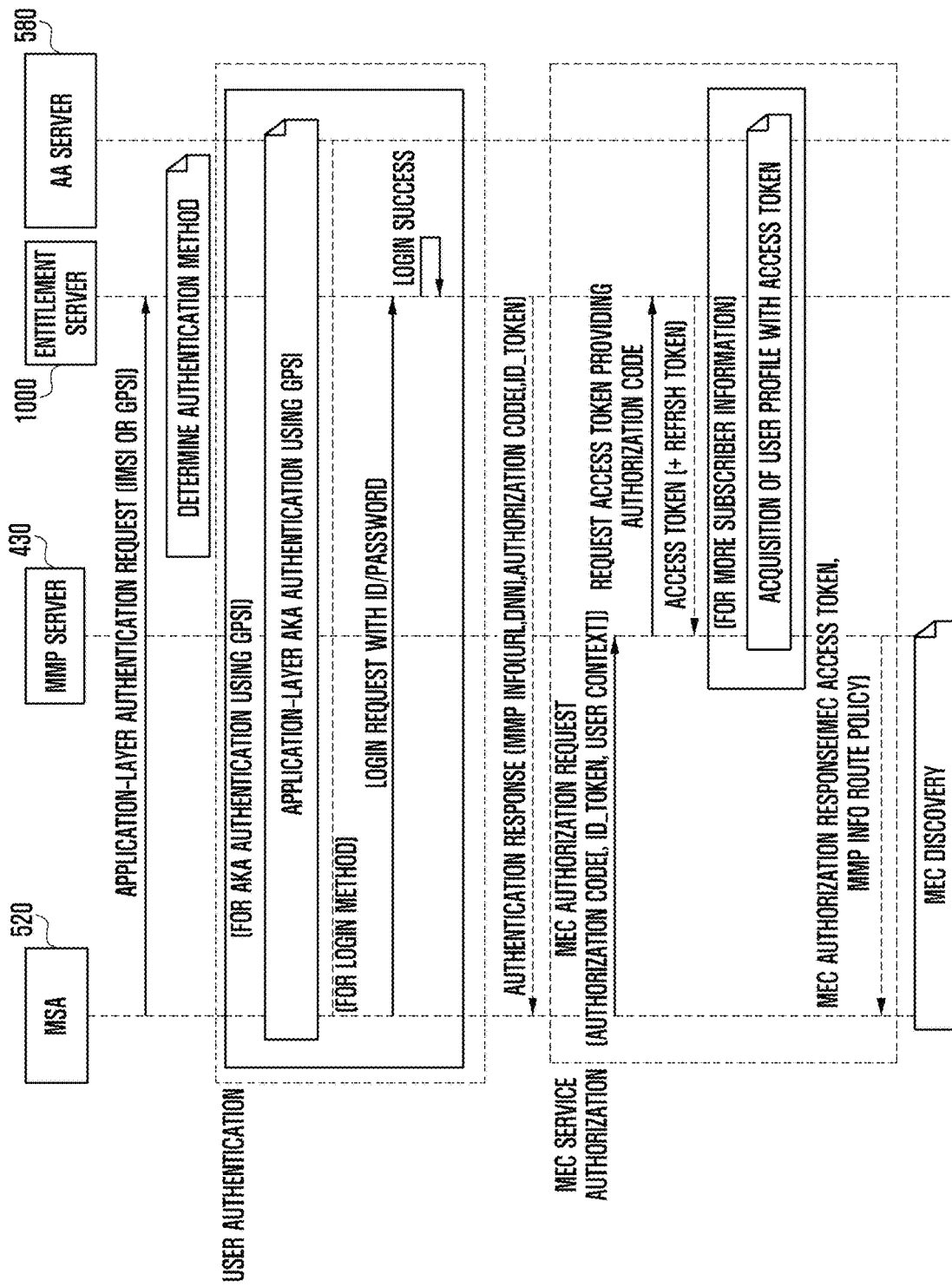
FIG. 10 is a diagram illustrating an example of an authentication procedure according to various embodiments.

FIG. 10 is a diagram illustrating an example of an authentication procedure according to various embodiments.

As illustrated in FIG. 10, FIG. 10 may show an example of a signal flow for an authentication procedure (e.g., scenario A of authentication/authorization (AA) and policy update) according to various embodiments. For example, FIG. 10 illustrates an example of a MEC service authentication flow for scenario A among authentication procedures according to various embodiments, and may include an operation (e.g., operation 1010) according to a detailed embodiment of "user authentication (or subscriber authentication)" corresponding to operation 909, operation 911, and operation 913 according to FIG. 9. According to an embodiment, as illustrated in FIG. 10, the scenario A for the MEC AA and policy update may be a scenario example for performing the MEC service authorization (e.g., operation 1020) after the user authentication (e.g., operation 1010).

With reference to FIG. 10, at operation 1001, the MSA 520 of the electronic device 101 may transmit a message for an authentication request to an entitlement server 1000.

At operation 1003, the entitlement server 1000 may determine an authentication method. According to an embodiment, the entitlement server 1000 may determine the authentication method corresponding to the authentication request of the electronic device 101 in at least one designated authentication method. According to an embodiment, the at least one authentication method may include, for example, an application-layer AKA using a GPSI or login (e.g., ID/password) type authentication. According to an embodiment, the MSA 520 may request an authorization code while transferring subscriber identification information (or terminal identification information) (e.g., GPSI or MISI) to the entitlement server 1000. According to an embodiment, as at operation 1010, the MSA 520 and the entitlement server 1000 may perform user authentication in the application-layer AKA or login method.

According to an embodiment, at operation 1005, the MSA 520 may perform an authentication (e.g., MEC subscriber authentication) procedure based on the application-layer AKA method with the AA server 580 through the entitlement server 1000, and may obtain an authentication response including authentication information according to the result of the authentication from the AA server 580. According to another embodiment, at operation 1007, the MSA 520 may perform the authentication procedure with the entitlement server 1000 based on the ID/password based login method, and at operation 1009, the MSA 520 may obtain the authentication response including the authentication information according to the result of the authentication from the entitlement server 1000 based on a login success with the entitlement server 1000.

At operation 1011, the MSA 520 may receive the authentication response corresponding to the authentication request. For example, at operation 1011, the MSA 520 may obtain the authentication information (e.g., MMP Info, Auth code, ID_token, CARP rule, or URSP rule) in accordance with the result of the authentication from the entitlement server 1000 or the AA server 580 through the entitlement server 1000. For example, as the result of the authentication, the MSA 520 may receive MMP related information (e.g., MMP access address) for performing the MEC discovery procedure, an authorization code (e.g., Auth code) for authorization, and an ID_token. According to an embodiment, the MSA 520 may receive information related to the CARP or URSP rule for the MEC data service based on whether to support the AA server 580.

According to an embodiment, after the "user authentication" as at operation 1010, the MSA 520 may perform the "MEC service authorization" as at operation 1020.

According to an embodiment, at operation 1013, the MSA 520 may transmit a message for an authorization request (authorization request) to the MMP server 430. For example, the MSA 520 may request the authorization from the MMP server 430 by transferring the obtained authentication information (e.g., Auth code or additionally included ID_token) to the MMP server 430. For example, after the authentication completion, the MSA 520 may perform the authorization procedure by accessing the MMP server 430 using an MMP access address.

At operation 1015, the MMP server 430 may request an access token from the entitlement server 1000, and at operation 1017, the MMP server 430 may obtain the access token from the entitlement server 1000. According to an embodiment, the MMP server 430 may identify whether the electronic device 101 is a MEC service subscriber by communicating with the entitlement server 1000 or by communicating with the AA server 580 through the entitlement server 1000. According to an embodiment, if it is identified that the electronic device 101 is the MEC service subscriber through the AA server 580, the MMP server 430 may issue (e.g., authorization) an access token (e.g., MAT) to the MSA 520.

At operation 1019, the MMP server 430 may transfer the MMP information and the authorization code to the entitlement server 1000 (or AA server 580), and may obtain the access token for accessing user profile information through a request.

At operation 1021, the MMP server 430 may transmit an authorization response corresponding to the authorization request to the MSA 520. According to an embodiment, the MMP server 430 may identify the user profile using the corresponding access token, and if it is identified that the MEC service is available based on the user profile, the MMP server 430 may transfer the authorization response including the MMP Info, MAT, or CARP rule to the MSA 520.

According to an embodiment, at operation 1021, the MSA 520 may obtain the access token (e.g., MAT) as the result of the authorization procedure. According to an embodiment, in case of performing the authorization procedure with the MMP server 430, the MSA 520 may receive the access token as the result of the authorization procedure, and may transfer the MMP information and the access token to the MSE 530 through the MSE API. According to another embodiment, in case that the MSE 530 performs the authorization procedure with the MMP server 430, the MSA 520 having completed the priority authentication may transfer, to the MSE 530, the MMP information and the authorization code (Auth code) received from the entitlement server 1000, and the ID_token in a selective manner through the MSE API. The MSE 530 may perform the authorization procedure directly with the MMP server 430 based on the information transferred from the MSA 520, and may receive the access token as the result.

At operation 1023, the MAA 520 may perform the MEC discovery procedure using the MMP Info and the access token through the MSE 530.

Figure 11:
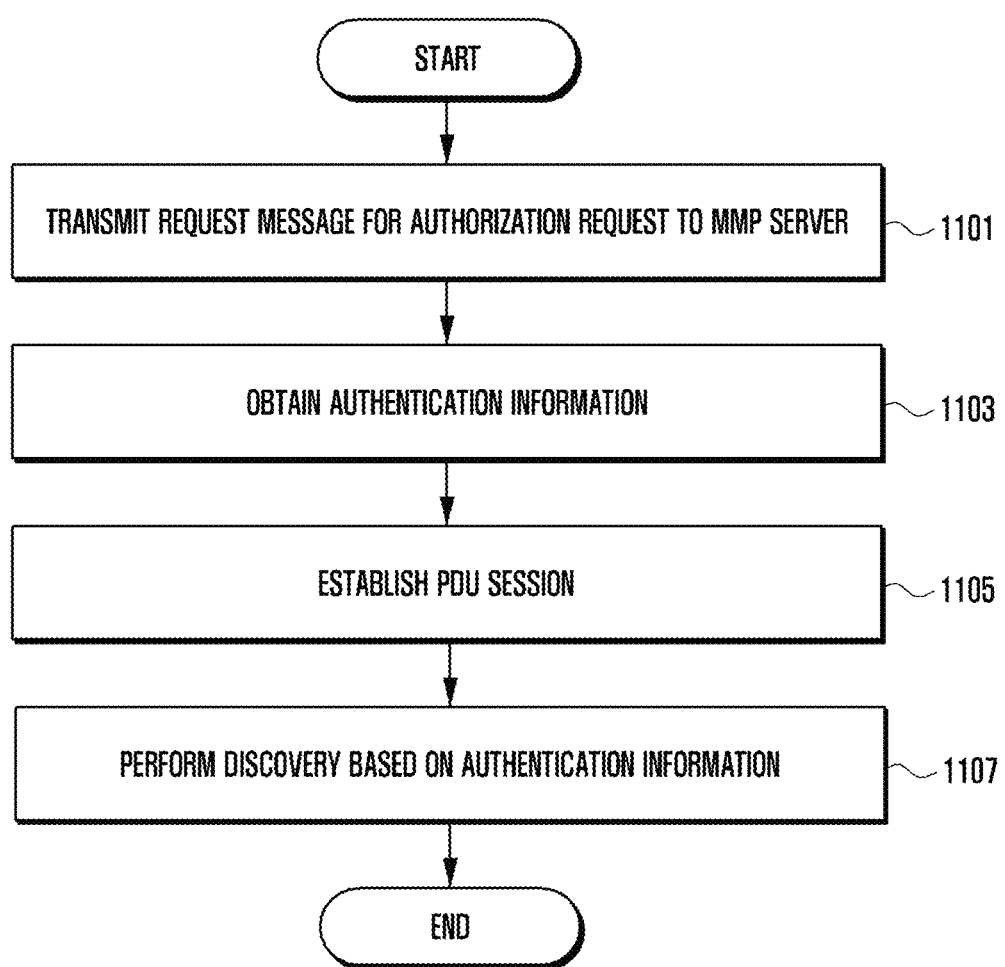
FIG. 11 is a flowchart illustrating an operation method of an electronic device for an authentication procedure according to various embodiments.

FIG. 11 is a flowchart illustrating an operation method of an electronic device 101 for an authentication procedure according to various embodiments.

With reference to FIG. 11, at operation 1101, the processor 120 (or MSA 520 of FIG. 5) of the electronic device 101 may transmit a request message for authentication to the MMP server 430. According to an embodiment, the MSA 520 of the electronic device 101 may transmit a message for an authentication request (e.g., authorization request message) for a service usage to the MMP server 430 based on at least one designated authentication method. According to an embodiment, in case of requesting the authorization for the service usage from the MMP server 430, the MSA 520 may transmit at least one or all of MNO information and a device ID (e.g., IMSI, IMEI, GPSI, or separately allocated unique ID) to the MMP server 430. According to an embodiment, the device ID may include an ID (e.g., UID) whereby the MMP server 430 can uniquely identify the electronic device 101.

At operation 1103, the processor 120 may obtain authentication information in accordance with the result of the authentication from the MMP server 430. According to an embodiment, the MSA 520 of the electronic device 101 may perform authentication (e.g., authentication & authorization (AA)) with the MMP server 430, and may obtain the authentication information in accordance with the result of the authentication from the MMP server 430. The authentication information may include, for example, MMP Info and an access token (e.g., MAT). According to an embodiment, in addition to the above-described information, the authentication information may further include additionally (or selectively) required information, for example, at least one of CARP or URSP rules for the MEC data service. According to an embodiment, the MMP Info may include, for example, information related to an access to the MMP server 430 (e.g., MMP access address). For example, the MMP Info may include address information (e.g., URI or IP address) of a new MMP server 430 to be accessed, a validity period for the corresponding address information, and/or location related information. According to an embodiment, the access token (e.g., MAT) may include, for example, an access token for identifying the MEC discovery authority. According to an embodiment, the CARP or URSP rule may include, for example, DNN configuration related information, information related to usable application (or application group) for each DNN, a DNN list that can be set thereafter, or information related to the maximum number of DNNs that can be set.

At operation 1105, the processor 120 may set a PDU session for the client application (e.g., dedicated PDU session for MEC). According to an embodiment, if the authentication procedure is completed, the MSA 520 of the electronic device 101 may perform the policy update (e.g., PDU session setup) with the MSE 530. According to an embodiment, the MSA 520 may perform an initial PDU session setup in accordance with the CARP or URSP rule (e.g., DNN). According to an embodiment, if the URSP rule is provided in the information received from the MMP server 430, the MSA 520 may update the URSP rule using the MSE API.

At operation 1107, the processor 120 may perform the discovery procedure by accessing the corresponding MMP server 430 based on the authentication information. According to an embodiment, if the authentication information (e.g., MAT) in accordance with the result of the authentication is received from the MMP server 430, the MSA 520 may transfer the received authentication information to the MSE 530 of the electronic device 101, and may enable the MSE 530. According to an embodiment, together with the authentication information, the MSA 520 may transfer at least one piece of additional information, such as an access address (e.g., URI or IP address) of a new MMP server 430 to be accessed in order to perform the MEC discovery procedure, a DNS server address, or a DNN to be used, to the MSE 530 through the MSE API. According to an embodiment, the MSE 530 of the electronic device 101 may perform the MEC discovery procedure at least based on the authentication information (e.g., MAT) and/or other additional information (e.g., MMP Info, DNS server address, or DNN to be used). According to an embodiment, the MSE 530 may perform the MEC discovery procedure after accessing the corresponding MMP server 430 using the MMP Info and the MAT.

According to various embodiments, the authentication procedure as illustrated in FIG. 11 may include, for example, a scenario in which the client application 510 connects to the MEC application using the default PDU session (or PDN). For example, the MSE 530 (e.g., MEL 531) may request MEC application driving and connection from a MEC host close to the electronic device 101 by performing the MEC discovery procedure, and may receive the URI of the corresponding MEC application. Thereafter, in case of requesting an access to the corresponding MEC application, the client application 510 may access the MEC application IP address obtained through the DNS resolving for the corresponding URI.

According to various embodiments, the authentication procedure as illustrated in FIG. 11 may include, for example, a scenario in which the client application connects to the MEC application by setting a separate MEC dedicated PDU session in addition to the default PDU session (or PDN). For example, the MEC dedicated PDU session setup may follow the policy of an operator (e.g., MNO or MMP server 430), and the MSA 520 or the authenticated client application may set the MEC dedicated PDU session through the UHL 533 using the MSE API. According to an embodiment, one or more MEC dedicated PDU sessions may always be open in addition to the default PDU session, and if necessary, they may be dynamically created or released by a request from the MEL 531 at a specific time. According to an embodiment, the UHL 533 of the MSE 530 may support to route traffics for the corresponding client application (or UID) or accessed URI to the MEC dedicated PDU session in accordance with the predefined rule (e.g., CARP or URSP rule) or a routing rule received from an external server (e.g., MMP server 430, AA server 580, or AMF/PCF server 590).

According to various embodiments, the authentication procedure as illustrated in FIG. 11 may include a scenario in which only the dedicated PDU session is set and used with respect to a specific service without the function of the MEL 531. According to an embodiment, the MSA 520 or the authenticated client application 510 may set a separate dedicated PDU session using the MSE API, register an application (e.g., UID) rule using the corresponding PDU session, and route traffics of the corresponding application to the corresponding PDU session.

Figure 12:
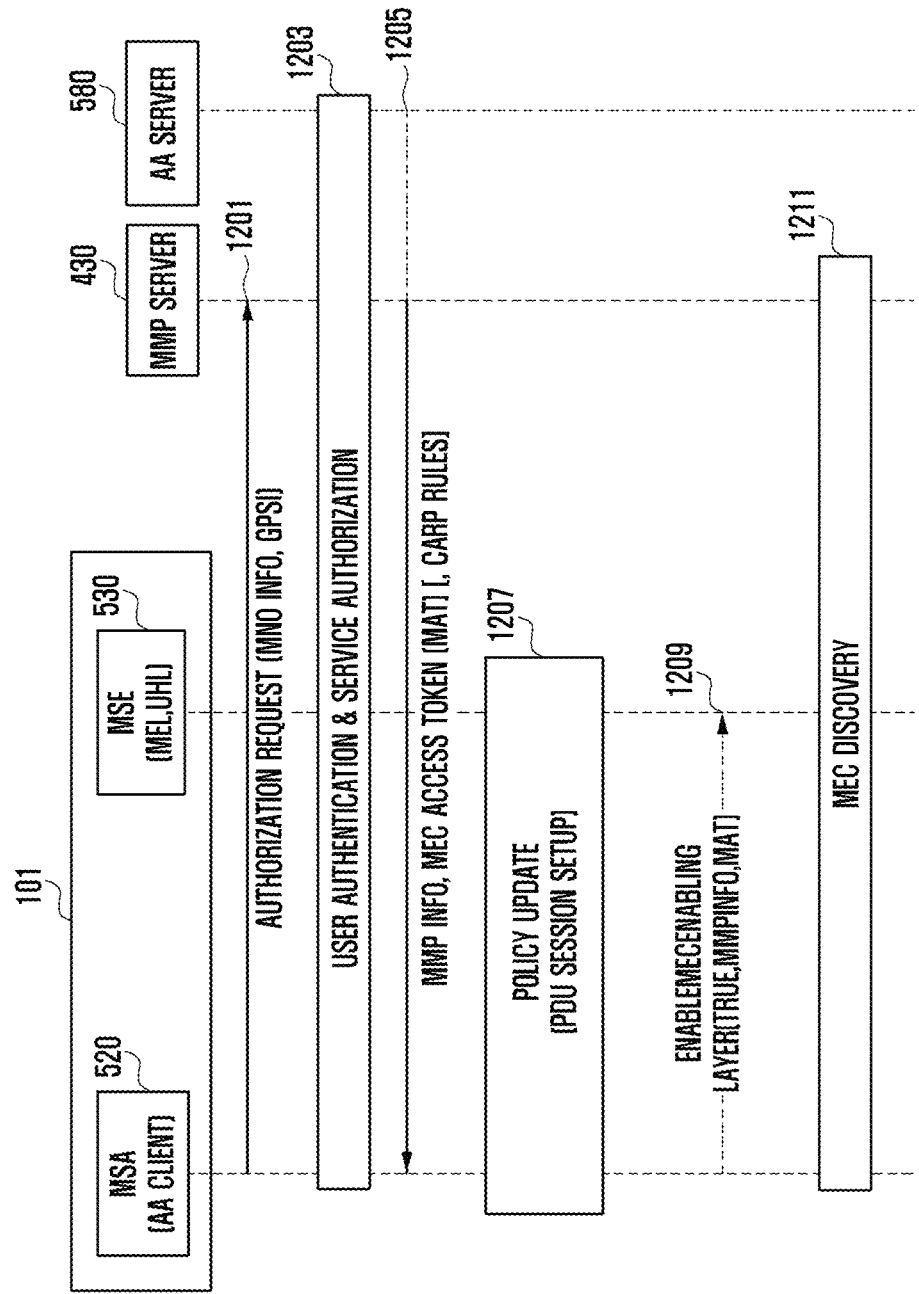
FIG. 12 is a diagram illustrating an example of an authentication procedure according to various embodiments.

FIG. 12 is a diagram illustrating an example of an authentication procedure according to various embodiments.

As illustrated in FIG. 12, the electronic device 101 may include an MSA (or service agent) 520 (e.g., including AA client 525) and an MSE (or service enabler) 530 (e.g., including MEL 531 or UHL 533).

With reference to FIG. 12, at operation 1201, the MSA 520 of the electronic device 101 may transmit a message for an authorization request for service usage (e.g., authorization request message) to the MMP server 430 based on at least one designated authentication method. According to an embodiment, in case of requesting authorization for the service usage from the MMP server 430, the MSA 520 may provide (or transmit) at least one or all of mobile network operator (MNO) (e.g., entitleme3nt server 1000) information and a device ID (e.g., IMSI, IMEI, GPSI, or separately allocated unique ID) to the MMP server 430. According to an embodiment, the device ID may include an ID whereby the MMP server 430 can uniquely identify the electronic device 101.

At operation 1203, the MSA 520 may perform the authentication and authorization (e.g., AA) procedure with the MMP server 430 or the AA server 580 through the MMP server 430. For example, if the authorization request is transferred to the MMP server 430, the MSA 520 may perform message exchange (e.g., refer to FIG. 13 to be described later) among the MSA 520, the MMP server 430, and the AA server 580. According to an embodiment, the MSA 520 may perform user authentication and service authorization (or authorization) with the MMP server 430. For example, the MSA may identify whether the electronic device 101 corresponds to a registered user, and may identify whether the corresponding service can be provided. According to an embodiment, the MMP server 430 may have a different AA method in accordance with the MNO information, and thus may perform the AA using a suitable method in accordance with the MNO information.

At operation 1205, if the authentication request is received from the electronic device 101, the MMP server 430 may perform the authentication with the electronic device 101, and if the authentication is completed (e.g., authentication procedure completion), it may provide (or transmit) the authentication information in accordance with the result of the authentication to the electronic device 101 (e.g., MSA 520). According to an embodiment, the authentication information may include, for example, MMP Info and an access token (e.g., MAT). According to an embodiment, in addition to the above-described information, the MMP server 430 may further include additionally (or selectively) required information, for example, at least one of CARP or URSP rules for the MEC data service in the authentication information to be provided. According to an embodiment, at operation 1205, the MSA 520 may receive all the authentication information (e.g., MMP Info, MAT, and CARP or URSP rule) according to the result of the authentication from the MMP server 430. According to another embodiment, at operation 1205, the MSA 520 may receive parts of the authentication information (e.g., MMP Info for discovery and MAT) from the MMP server 430, and may receive the CARP rule (or URSP rule) from the AA server 580 as the result of the user authentication as an example of FIG. 13 to be described later.

According to an embodiment, the MMP Info may include, for example, information related to an access to the MMP server 430 (e.g., MMP access address). For example, the MMP Info may include address information (e.g., uniform resource identifier (URI) or IP address) of a new MMP server 430 to be accessed, a validity period for the corresponding address information, and/or location related information. According to an embodiment, the access token (e.g., MAT) may include, for example, an access token for identifying the MEC discovery authority. According to an embodiment, the CARP or URSP rule may include, for example, information related to DNN configuration, information related to a usable application (or application group) for each DNN, a DNN list that can be set thereafter, or information related to the maximum number of DNNs that can be set.

At operation 1207, if the authentication procedure is completed, the MSA 520 may perform policy update (e.g., PDU session setup) with the MSE 530. According to an embodiment, the MSA 520 may set an initial PDU session in accordance with the CARP or URSP rule (e.g., DNN). For example, if the URSP rule is provided from the MMP server 430 to the received information, the MSA 520 may update the URSP rule using the MSE API.

According to an embodiment, the policy update operation of the MSA 520 and the MSE 530 at operation 1207 may be performed, for example, by the MSA 520 in case that the CARP or URSP rule is provided from the AA server 580. According to an embodiment, if the CARP or URSP rule is not provided from the AA server 580, the MSA 520 may not perform the policy update with the MSE 530. According to another embodiment, even if the CARP or URSP rule is provided from the AA server 580, the MSA 520 may not perform the policy update through determination of the MSA 520 itself or information exchange with the MSE 530.

At operation 1209, the MSA 520 may enable the MSE 530. According to an embodiment, in case of receiving the authentication information (e.g., access token (MAT)) in accordance with the result of the authentication from the MMP server 430 during or after performing of the authentication with the AA server 580, the MSA 520 may enable the MES 530 by transferring the received authentication information (e.g., access token (MAT)) to the MSE 530. According to an embodiment, together with the authentication information (e.g., access token (MAT)), the MSA 520 may transfer at least one piece of additional information, such as an access address (e.g., URI or IP address) of a new MMP server 430 to be accessed in order to perform the MEC discovery procedure, a DNS server address, or a DNN to be used, to the MSE 530. According to an embodiment, the MSA 520 may enable the MSE 530 based on the received access token (MAT) and/or other additional information. According to an embodiment, if the MSA 520 performs the authentication with the MMP server 430, it may receive the access token (e.g., MAT) from the MMP server 430 as the result of the authentication, and for example, it may transfer the MMP access information (MMP Info) and the access token (MAT) to the MSE 530 by calling, for example, enableMecEnablingLayer(true, MMP Info, MAT) of the MSE API.

At operation 1211, the MSE 530 may receive the authentication information (e.g., MAT) and/or other additional information (e.g., MMP Info, DNS server address, or DNN to be used), and may perform the MEC discovery procedure at least based on the authentication information and/or the additional information. According to an embodiment, the MSE 530 may perform the MEC discovery procedure after accessing the corresponding MMP server 430 using the MMP Info and the MAT.

Figure 13:
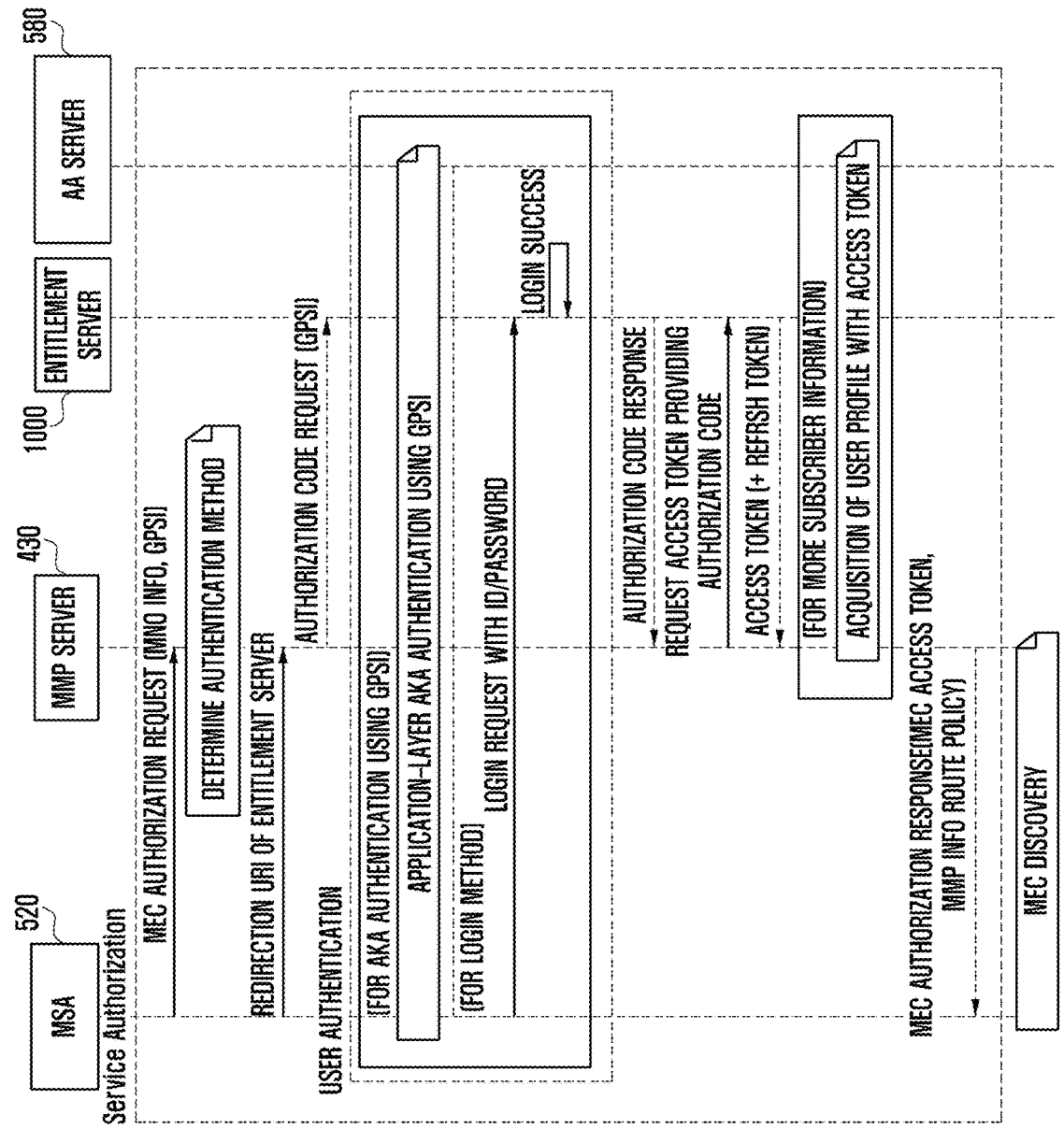
FIG. 13 is a diagram illustrating an example of an authentication procedure according to various embodiments.

FIG. 13 is a diagram illustrating an example of an authentication procedure according to various embodiments.

As illustrated, FIG. 13 may show an example of a signal flow for an authentication procedure (e.g., scenario B of AA and policy update) according to various embodiments. For example, FIG. 13 illustrates an example of a MEC service authentication flow for scenario B among authentication procedures according to various embodiments, and may include detailed embodiments corresponding to the operation 1201, operation 1203, and operation 1205 according to FIG. 12. According to an embodiment, in an embodiment illustrated in FIG. 13, a "user authentication (or subscriber authentication)" operation (e.g., operation 1320) may be included as a part of a "MEC service authorization" operation (e.g., operation 1310). According to an embodiment, as illustrated in FIG. 13, the scenario B for the MEC AA and policy update may be a scenario example for performing the MEC service authorization (e.g., operation 1310) prior to the user authentication (e.g., operation 1320).

With reference to FIG. 13, at operation 1301, the MSA 520 of the electronic device 101 may transmit an authorization request message for an authorization request to the MMP server 430. According to an embodiment, the authorization request message may include at least one or all of MNO information and a device ID (e.g., IMSI, IMEI, GPSI, or separately allocated unique ID).

At operation 1303, the MMP server 430 may determine an authentication method. According to an embodiment, the MMP server 430 may determine the authentication method corresponding to the authorization request of the electronic device 101 in at least one designated authentication method. According to an embodiment, the at least one authentication method may include, for example, an application-layer AKA or login (e.g., ID/password) method.

At operation 1305, the MSA 520 may transfer the URI of the entitlement server 1000 to the MMP server 430.

At operation 1307, the MMP server 430 may request an authorization code from the entitlement server 1000. According to an embodiment, if the MSA 520 transfers subscriber identification information (or terminal identification information) (e.g., GPSI or IMSI) to the MMP server 430, the MMP server 430 may request the authorization code while transferring the corresponding information to the entitlement server 1000 or the AA server 580 on the MNO side. According to an embodiment, if the MSA 520 is not authenticated with the AA server 580 with respect to the subscriber identification information, as exemplified at operation 1320, the user authentication may be performed in the application-layer AKA or login method. According to an embodiment, the authentication methods may differ in accordance with the MNO information, and the AA server 580 may perform the authentication using the method corresponding to the MNO information. For example, the MSA 520 may perform the authentication with the AA server 580 based on at least one designated authentication method.

According to an embodiment, at operation 1309, the MSA 520 may perform the authentication procedure with the AA server 580 based on the application-layer AKA method through the entitlement server 1000. According to another embodiment, at operation 1311, the MSA 520 may perform the authentication procedure with the entitlement server 1000 based on the ID/password based login method, and at operation 1313, the MSA 520 may perform the authentication procedure through a login success with respect to the entitlement server 1000.

At operation 1315, if an authorization code response corresponding to an authorization code request is received from the entitlement server 1000, the MMP server 430, at operation 1317, may request an access token for identifying a user profile with respect to the AA server 580 from the entitlement server 1000, and may receive the access token from the entitlement server 1000. According to an embodiment, if the authentication of the corresponding electronic device 101 is completed, the AA server 580, if necessary, may transfer the CARP or URSP rule to the MSA 520, and may transfer the authorization code requested by the MMP server 430 to the MMP server 430. According to an embodiment, the MMP server 430 may transfer the MMP information and the authorization code to the entitlement server 1000 or the AA server 580, and request and receive the access token for accessing the user profile information.

According to an embodiment, at operation 1321, the MMP server 430 may obtain a user profile using the access token. For example, the MSA 520 may transfer a MEC service subscriber authentication and authorization code of the electronic device 101 to the MMP server 430 through the AA server 580. According to an embodiment, the MMP server 430 and the AA server 580 may identify the subscriber profile based on the issued access token using the authorization code.

At operation 1323, the MMP server 430 may transmit the authorization response corresponding to the authorization request to the MSA 520. According to an embodiment, the MMP server 430 may identify the user profile using the corresponding access token, and if it is identified that the MEC service is available based on the user profile, the MMP server 430 may transfer, to the MSA 520, the authorization response including the access token (e.g., MAT), MMP Info (e.g., URI), and/or route policy (e.g., CARP or URSP rule (e.g., dedicated DNN)) as the result of the authorization procedure.

According to an embodiment, at operation 1323, the MSA 520 may obtain the access token (e.g., MAT) as the result of the authorization procedure. According to an embodiment, in case of performing the authorization procedure with the MMP server 430, the MSA 520 may receive the access token as the result of the authorization procedure, and may transfer the MMP information and the access token to the MSE 530 through the MSE API. According to another embodiment, in case that the MSE 530 performs the authorization procedure with the MMP server 430, the MSA 520 having completed the priority authentication may transfer, to the MSE 530, the MMP information and the authorization code (Auth code) received from the MMP server 430, and the ID_token in a selective manner through the MSE API. The MSE 530 may perform the authorization procedure directly with the MMP server 430 based on the information transferred from the MSA 520, and may receive the access token as the result.

At operation 1325, the MSE 530 may perform the MEC discovery procedure using the MMP Info and the access token through the MSE 530.

Figure 14:
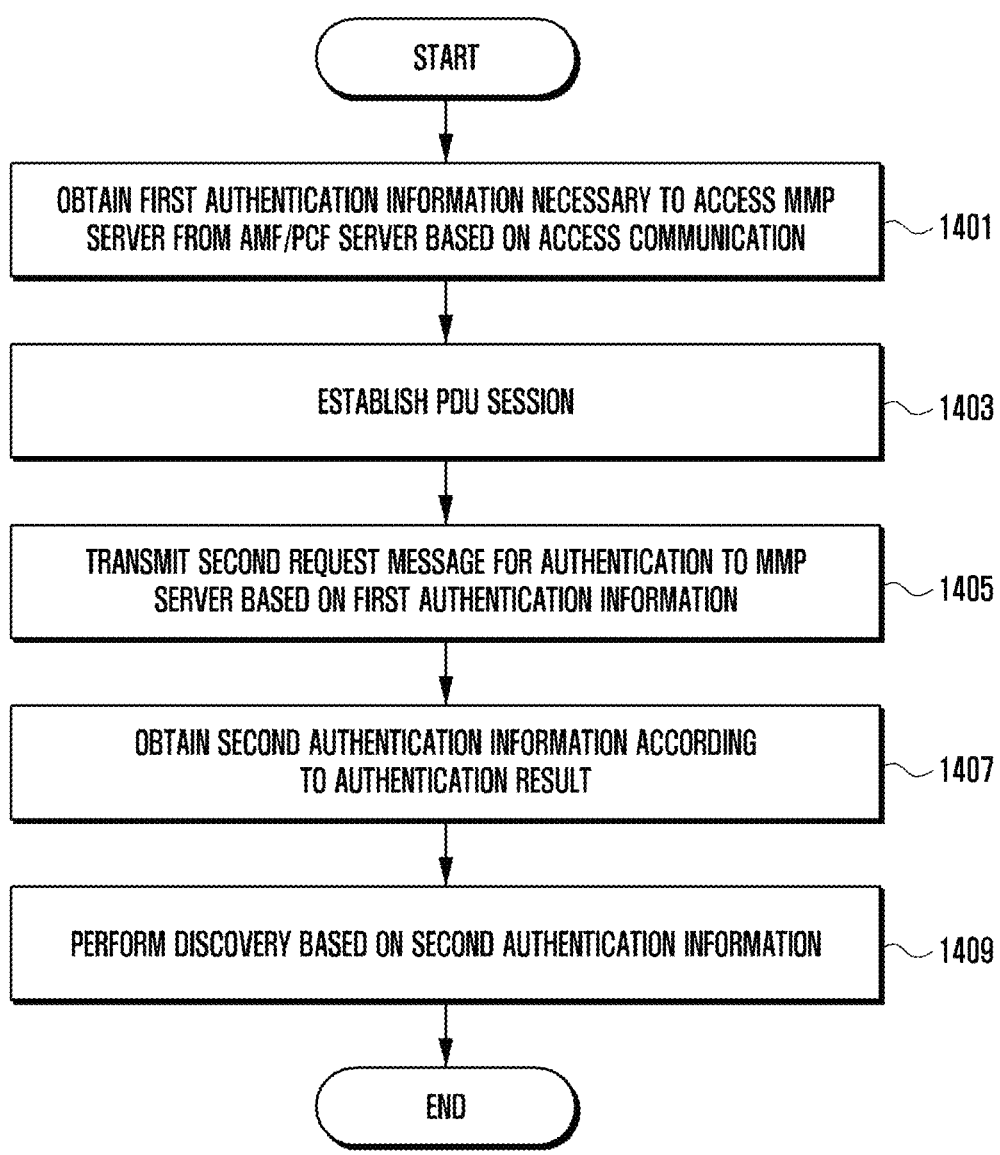
FIG. 14 is a flowchart illustrating an operation method of an electronic device for an authentication procedure according to various embodiments.

FIG. 14 is a flowchart illustrating an operation method of an electronic device 101 for an authentication procedure according to various embodiments.

At operation 1401, the processor 120 (or MSE 530 of FIG. 5) of the electronic device 101 may obtain first authentication information that is required to access the MMP server 430 from the AMF/PCF server 590 based on an access communication. According to an embodiment, the MSA 520 of the electronic device 101 may perform a NAS signaling procedure with the AMF/PCF server (e.g., AMF) 590. According to an embodiment, the AMF/PCF server 590 may provide first authentication information to the electronic device 101 based on NAS signaling. According to an embodiment, the first authentication information may include the MMP Info and an Auth code, and may additionally include the ID_token and/or CARP or URSP rule. According to an embodiment, the MSE 530 may receive a NAS signaling message that a modem (or communication processor (CP)) of the electronic device 101 receives from the AMF through the UHL 533 of the MSE 530. For example, the modem of the electronic device 101 may obtain at least one piece of information among MMP Info and Auth code, ID_token, or CARP or URSP rule from the NAS signaling message, and may transfer the obtained information to the MSA 520 through the UHL 533.

At operation 1403, the processor 120 (or MSE 530 of FIG. 5) may set a PDU session for the client application. According to an embodiment, the MSE 530 of the electronic device 101 may obtain first authentication information (e.g., at least one piece of information among MMP Info, Auth code, and/or ID_token) from the NAS signaling message, and may transfer the obtained first authentication information to the MSA 520. According to an embodiment, if the CARP or URSP rule is included in the obtained information, the MSA 520 of the electronic device 101 may perform policy update with the MSE 530 using the MSE API. According to an embodiment, if the CARP or URSP rule is not provided in the information obtained through the NAS signaling, the MSA 520 may not perform the policy update with the MSE 530. According to another embodiment, even if the CARP or URSP rule is provided, the MSA 520 may not perform the policy update through determination of the MSA 520 itself or information exchange with the MSE 530.

At operation 1405, the processor 120 (or MSA 520 of FIG. 5) may transmit a second request message for an authorization request form the MMP server 430 based on the first authentication information. According to an embodiment, after the authentication completion (or after the policy update performing or release with the MSE 530), the MSA 520 of the electronic device 101 may transmit a message for an authorization request (authorization request) to the MMP server 430. According to an embodiment, the MSA 520 may request the authorization from the MMP server 430 based on the first authentication information (e.g., Auth code or additionally included ID_token) obtained from the NAS signaling message.

At operation 1407, the processor 120 (or MSA 520 of FIG. 5) may obtain second authentication information in accordance with the result of the authentication from the MMP server 430. According to an embodiment, the MSA 520 of the electronic device 101 may perform the authentication (e.g., authorization procedure) with the AA server 580 through the MMP server 430, and may obtain (or receive) the second authentication information in accordance with the result of the authentication from the MMP server 430. The second authentication information may include, for example, the access token (e.g., MAT) and the MMP Info.

At operation 1409, the processor 120 (or MSA 520 of FIG. 5) may perform the discovery procedure by accessing the MMP server 430 based on the second authentication information. According to an embodiment, if the second authentication information (e.g., MAT) in accordance with the result of the authentication is received from the MMP server 430, the MSA 520 of the electronic device 101 may transfer the received second authentication information to the MSE 530 of the electronic device 101, and may enable the MSE 530. According to an embodiment, together with the MAT, the MSA 520 may transfer at least one piece of additional information, such as an access address (e.g., URI or IP address) of a new MMP server 430 to be accessed in order to perform the MEC discovery procedure, a DNS server address, or a DNN to be used, to the MSE 530 through the MSE API. According to an embodiment, the MSE 530 of the electronic device 101 may perform the MEC discovery procedure at least based on the MAT and/or other additional information (e.g., MMP Info, DNS server address, or DNN to be used). According to an embodiment, the MSE 530 may perform the MEC discovery after accessing the corresponding MMP server 430 using the MMP Info and the MAT.

According to various embodiments, the authentication procedure as illustrated in FIG. 14 may include, for example, a scenario in which the client application 510 connects to the MEC application using the default PDU session (or PDN). For example, the MSE 530 (e.g., MEL 531) may request MEC application driving and connection from a MEC host close to the electronic device 101 by performing the MEC discovery procedure, and may receive the URI of the corresponding MEC application. Thereafter, in case of requesting an access to the corresponding MEC application, the client application 510 may access the MEC application IP address obtained through the DNS resolving for the corresponding URI.

According to various embodiments, the authentication procedure as illustrated in FIG. 14 may include, for example, a scenario in which the client application connects to the MEC application by setting a separate MEC dedicated PDU session in addition to the default PDU session (or PDN). For example, the MEC dedicated PDU session setup may follow the policy of an operator (e.g., MNO or MMP server 430), and the MSA 520 or the authenticated client application may set the MEC dedicated PDU session through the UHL 533 using the MSE API. According to an embodiment, one or more MEC dedicated PDU sessions may always be open in addition to the default PDU session, and if necessary, they may be dynamically created or released by a request from the MEL 531 at a specific time. According to an embodiment, the UHL 533 of the MSE 530 may support to route traffics for the corresponding client application (or UID) or accessed URI to the MEC dedicated PDU session in accordance with the predefined rule (e.g., CARP or URSP rule) or a routing rule received from an external server (e.g., MMP server 430, AA server 580, or AMF/PCF server 590).

According to various embodiments, the authentication procedure as illustrated in FIG. 14 may include a scenario in which only the dedicated PDU session is set and used with respect to a specific service without the function of the MEL 531. According to an embodiment, the MSA 520 or the authenticated client application 510 may set a separate dedicated PDU session using the MSE API, register an application (e.g., UID) rule using the corresponding PDU session, and route traffics of the corresponding application to the corresponding PDU session.

Figure 15A:
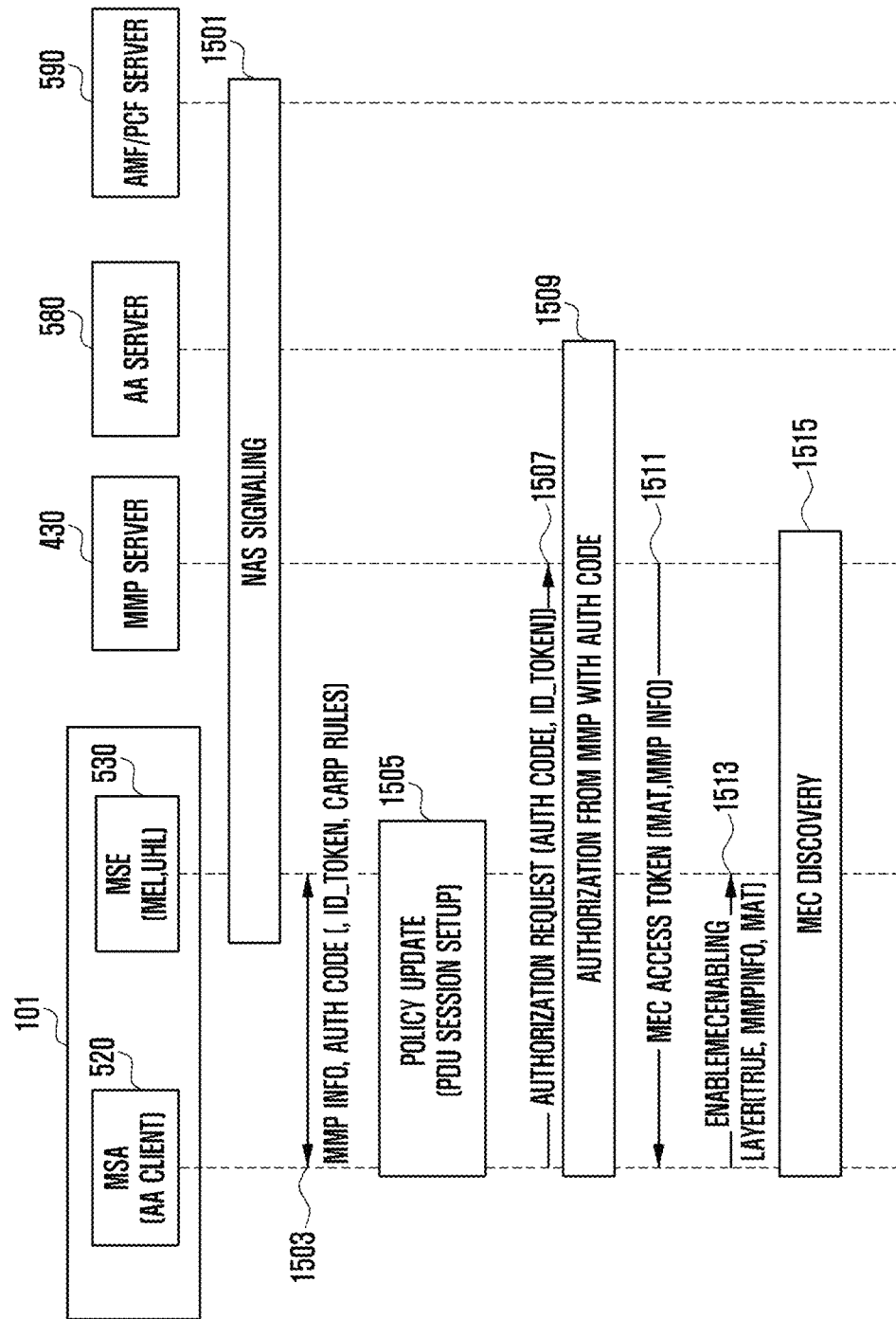
FIG. 15A is a diagram illustrating an example of an authentication procedure according to various embodiments.

FIG. 15A is a diagram illustrating an example of an authentication procedure according to various embodiments.

As illustrated in FIG. 15A, the electronic device 101 may include an MSA (or service agent) 520 (e.g., including AA client 525) and an MSE (or service enabler) 530 (e.g., including MEL 531 or UHL 533). According to an embodiment, the PCF of the AMF/PCF server 590 may manage information required for MMP access (e.g., MMP Info, Auth code, or ID_token) by adding the URSP thereto.

With reference to FIG. 15A, at operation 1501, the MSE 530 of the electronic device 101 may perform a NAS signaling procedure with the AMF/PCF server (e.g., AMF) 590. According to an embodiment, the AMF/PCF server 590 may provide MMP Info and an Auth code to the electronic device 101, and may additionally provide an ID_token and/or CARP or URSP rule. According to an embodiment, the MSE 530 may receive a NAS signaling message that a modem (or communication processor) of the electronic device 101 receives from the AMF 590 through the UHL 533 of the MSE 530. For example, the modem of the electronic device 101 may obtain at least one piece of information among MMP Info and Auth code, ID_token, or CARP or URSP rule from the NAS signaling message received from the AMF, and may transfer the obtained information to the MSA 520 through the UHL 533.

At operation 1503, the MSE 530 may obtain at least one piece of information among MMP Info, Auth code, and/or ID_token from the NAS signaling message, and may transfer the obtained information to the MSA 520. According to an embodiment, the MMP Info may include, for example, information (e.g., MMP access address) related to an access to the MMP server 430. For example, the MMP Info may include address information (e.g., uniform resource identifier (URI) or IP address) of a new MMP server 430 to be accessed, a validity period for the corresponding address information, and/or location related information. According to an embodiment, the CARP or URSP rule may include, for example, information related to DNN configuration, information related to a usable application (or application group) for each DNN, a DNN list that can be set thereafter, or information related to the maximum number of DNNs that can be set.

According to an embodiment, at least one piece of information among the MMP Info, Auth code, ID_token, or CARP or URSP rule provided from the AMF/PCF server 590 may be obtained from the MSA 520 through the MSE 530.

At operation 1505, the MSA 520 may perform policy update (e.g., PDU session setup) with the MSE 530. According to an embodiment, the MSA 520 may set a PDU session in accordance with the CARP or URSP rule (e.g., DNN). For example, if the URSP rule is provided in the information received from the MMP server 430, the MSA 520 may update the URSP rule using the MSE API. According to an embodiment, if the CARP or URSP rule is included in the information obtained through the NAS signaling message, the MSA 520 may perform the policy update with the MSE 530. According to an embodiment, if the CARP or URSP rule is not provided in the information obtained through the NAS signaling message, the MSA 520 may not perform the policy update with the MSE 530. According to another embodiment, even if the CARP or URSP rule is provided, the MSA 520 may not perform the policy update through determination of the MSA 520 itself or information exchange with the MSE 530. According to an embodiment, during the policy update between the MSA 520 and the MSE 530, the PDU session setup may be performed.

At operation 1507, after receiving the NAS signaling message (or after the policy update with the MSE 530 is performed or omitted), the MSA 520 may transmit a message (e.g., authorization request message) for an authorization request (e.g., service usage authority request) to the MMP server 430. According to an embodiment, the MSA 520 may request the MMP server 430 to authorize the service usage based on the authentication information (e.g., Auth code or additionally included ID_token) obtained from the NAS signaling message.

At operation 1509, the MSA 520 may perform the authentication (e.g., authorization procedure) with the AA server 580 through the MMP server 430. According to an embodiment, the MSA 520 may request service authorization for service usage with the AA server 580 by providing (or transmitting) at least one or all of Auth code or ID_token to the MMP server 430.

At operation 1511, the MMP server 430 may provide (or transmit) the authentication information to the electronic device 101 (e.g., MSA 520) in response to the authorization request (e.g., authorization request message) from the MSA 520. According to an embodiment, the authentication information may include, for example, an access token (e.g., MAT) and the MMP Info. According to an embodiment, the MMP server 430 may transmit a response including the access token and the MMP Info to the MSA 520 during or after performing of the authentication of the MSA 520.

At operation 1513, the MSA 520 may enable the MSE 530. According to an embodiment, if the authentication information (e.g., access token (MAT) and MMP Info) is received from the MMP server 430, the MSA 520 may enable the MSE 530 by transferring the received authentication information (e.g., access token (MAT) and MMP Info) to the MSE 530. According to an embodiment, together with the access token (MAT), the MSA 520 may transfer at least one piece of additional information, such as an access address (e.g., URI or IP address) of a new MMP server 430 to be accessed in order to perform the MEC discovery procedure, a DNS server address, or a DNN to be used, to the MSE 530. According to an embodiment, the MSA 520 may enable the MSE 530 (enable MEC) based on the received access token (MAT) and/or other additional information. According to an embodiment, if the MSA 520 performs the authorization process with the MMP server 430, it may receive the access token (e.g., MAT) from the MMP server 430, and for example, it may transfer the MMP access information (MMP Info) and the access token (MAT) to the MSE 530 by calling, for example, enableMecEnablingLayer (true, MMP Info, MAT) of the MSE API.

At operation 1515, the MSE 530 may receive the authentication information (e.g., MAT) and/or other additional information (e.g., MMP Info, DNS server address, or DNN to be used), and may perform the MEC discovery procedure at least based on the authentication information and/or the additional information. According to an embodiment, the MSE 530 may perform the MEC discovery procedure after accessing the corresponding MMP server 430 using the MMP Info and the MAT.

Figure 15B:
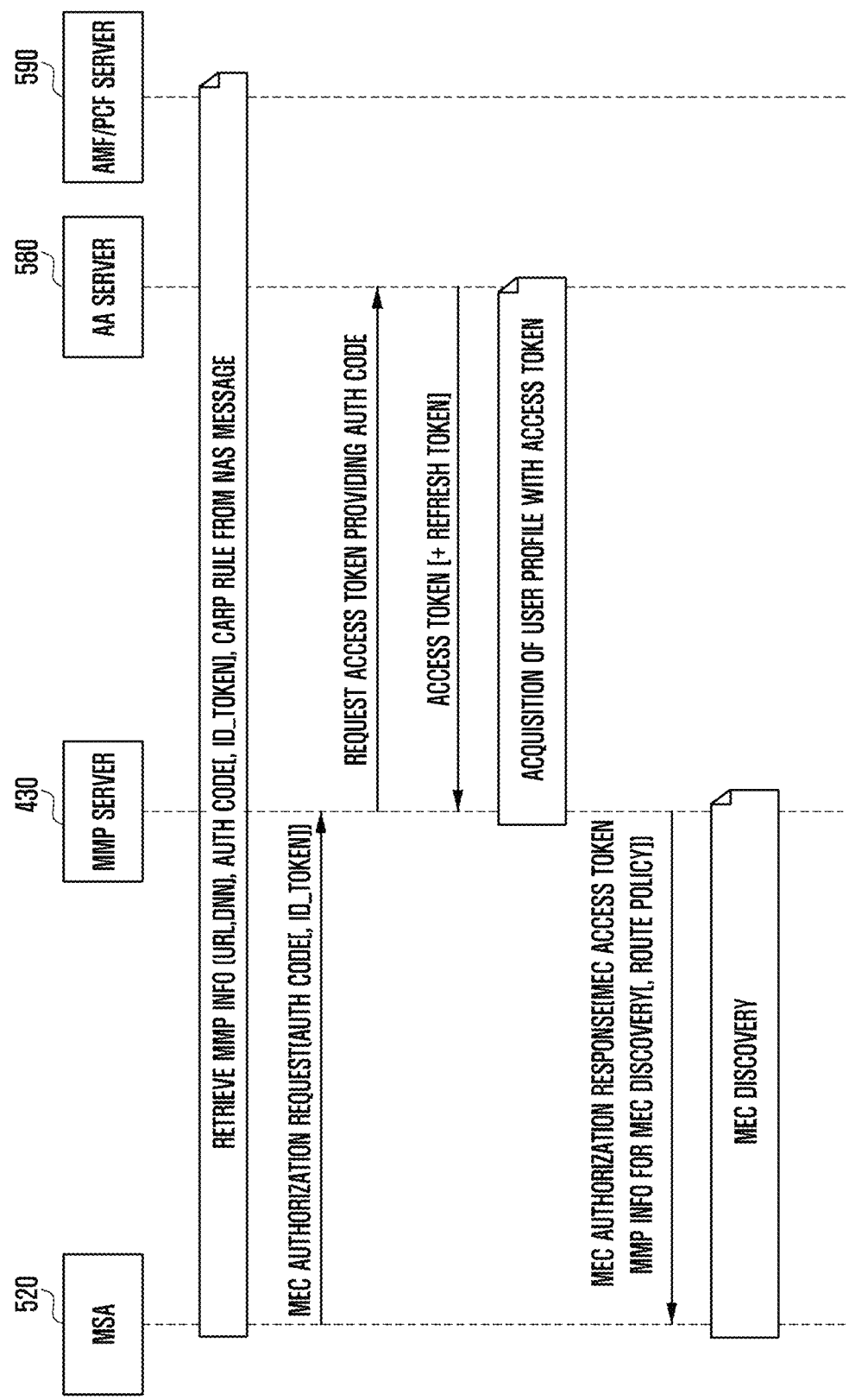
FIG. 15B is a diagram illustrating an example of an authentication procedure according to various embodiments.

FIG. 15B is a diagram illustrating an example of an authentication procedure according to various embodiments.

As illustrated in FIG. 15B, FIG. 15B may show an example of a signal flow for an authentication procedure (e.g., scenario C of the AA and policy update) according to various embodiments. For example, FIG. 15B illustrates an example of a MEC service authentication flow for scenario C (e.g., authentication procedure according to FIG. 15A) among authentication procedures according to various embodiments, and the scenario C may be a scenario example being performed by a 5G NAS based model.

With reference to FIG. 15B, at operation 1531, the MSA 520 of the electronic device 101 may obtain information, such as MMP Info (e.g., URI and DNN), Auth code, and CARP or URSP rule, from a NAS message received through NAS signaling with the AMF/PCF server 590. According to an embodiment, the NAS message may further include the ID_token.

At operation 1533, the MSA 520 may transmit a message (e.g., authorization request message) for an authorization request (e.g., service usage authority request) using the information obtained as the result of the NAS signaling. For example, the MSA 520 may request the authorization from the MMP server 430 by transferring the obtained information (e.g., MMP Info, Auth code, CARP or URSP rule) to the MMP server 430.

At operation 1535, the MMP server 430 may request the access token for accessing the user profile information from the AA server 580, and may obtain the access token from the AA server 580 at operation 1537.

At operation 1539, the MMP server 430 may obtain the user profile using the access token. For example, the MMP server 430 may transfer the MMP information and the authorization code to the AA server 580, and may obtain the access token for accessing the user profile information through a request.

At operation 1541, the MMP server 430 may transmit an authorization response corresponding to the authorization request to the MSA 520. According to an embodiment, the MMP server 430 may identify the user profile using the corresponding access token, and if it is identified that the MEC service is available based on the user profile, the MMP server 430 may transfer, to the MSA 520, the authorization response including the MMP Info for the MEC discovery, access token (e.g., MAT), and/or route policy (e.g., CARP or URSP rule) for the MEC data service as the result of the authorization procedure.

According to an embodiment, at operation 1541, the MSA 520 may obtain the access token (e.g., MAT) as the result of the authorization procedure. According to an embodiment, in case of performing the authorization procedure with the MMP server 430, the MSA 520 may receive the access token as the result of the authorization procedure, and may transfer the MMP information and the access token to the MSE 530 through the MSE API. According to another embodiment, in case that the MSE 530 performs the authorization procedure with the MMP server 430, the MSA 520 may receive the access token as the result of the authorization procedure, and may transfer the MMP information and the access token to the MSE 530 through the MSE API. According to another embodiment, in case that the MSE 530 performs the authorization procedure with the MMP server 430, the MSA 520 having completed the priority authentication may transfer the MMP information and Auth code received from the MMP server, and the ID_token in a selective manner to the MSE 530 through the MSE API. The MSE 530 may perform the authorization procedure directly with the MMP server 430 based on the information transferred from the MSA 520, and may receive the access token as the result.

At operation 1543, the MSA 520 may perform the MEC discovery procedure using the MMP Info and the access token through the MSE 530.

Figure 16:
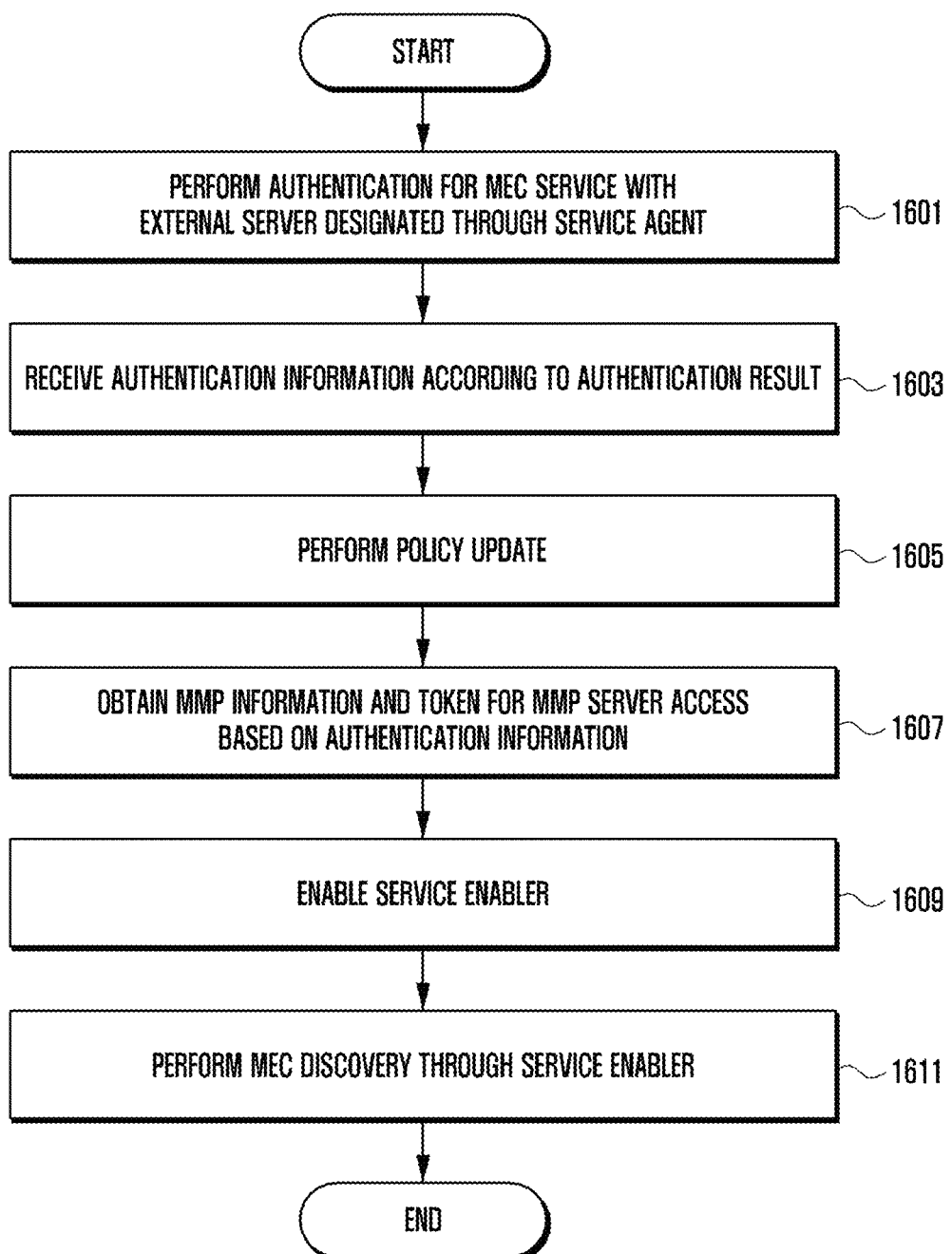
FIG. 16 is a flowchart illustrating an operation method of an electronic device according to various embodiments.

FIG. 16 is a flowchart illustrating an operation method of an electronic device 101 according to various embodiments.

With reference to FIG. 16, at operation 1601, the processor 120 (or MEC service module 410 of FIG. 4) of the electronic device 101 may perform authentication (e.g., user authentication or service authentication) for a MEC service with a designated external server (e.g., authentication server or MMP server) of a network through the MSA (or service agent) 520.

At operation 1603, the processor 120 (or MEC service module 410 of FIG. 4) may receive authentication information in accordance with the result of the authentication from the external server.

At operation 1605, the processor 120 (or MEC service module 410 of FIG. 4) may selectively perform policy update with the MSE (or service enabler) 530 based on reception of the authentication information.

At operation 1607, the processor 120 (or MEC service module 410 of FIG. 4) may obtain MMP Info and a token for an access to the MMP server based on the authentication information.

At operation 1609, the processor 120 (or MEC service module 410 of FIG. 4) may enable the MSE 530 by transferring the MMP Info and the token to the MSE 530 through the MSE API.

At operation 1611, the processor 120 (or MEC service module 410 of FIG. 4) may perform MEC discovery procedure by accessing the corresponding MMP server 430 through the MSE 530.

PDU Session Setup

Hereinafter, operations performed inside an electronic device 101 corresponding to an authentication procedure for a MEC service will be described.

Figure 17:
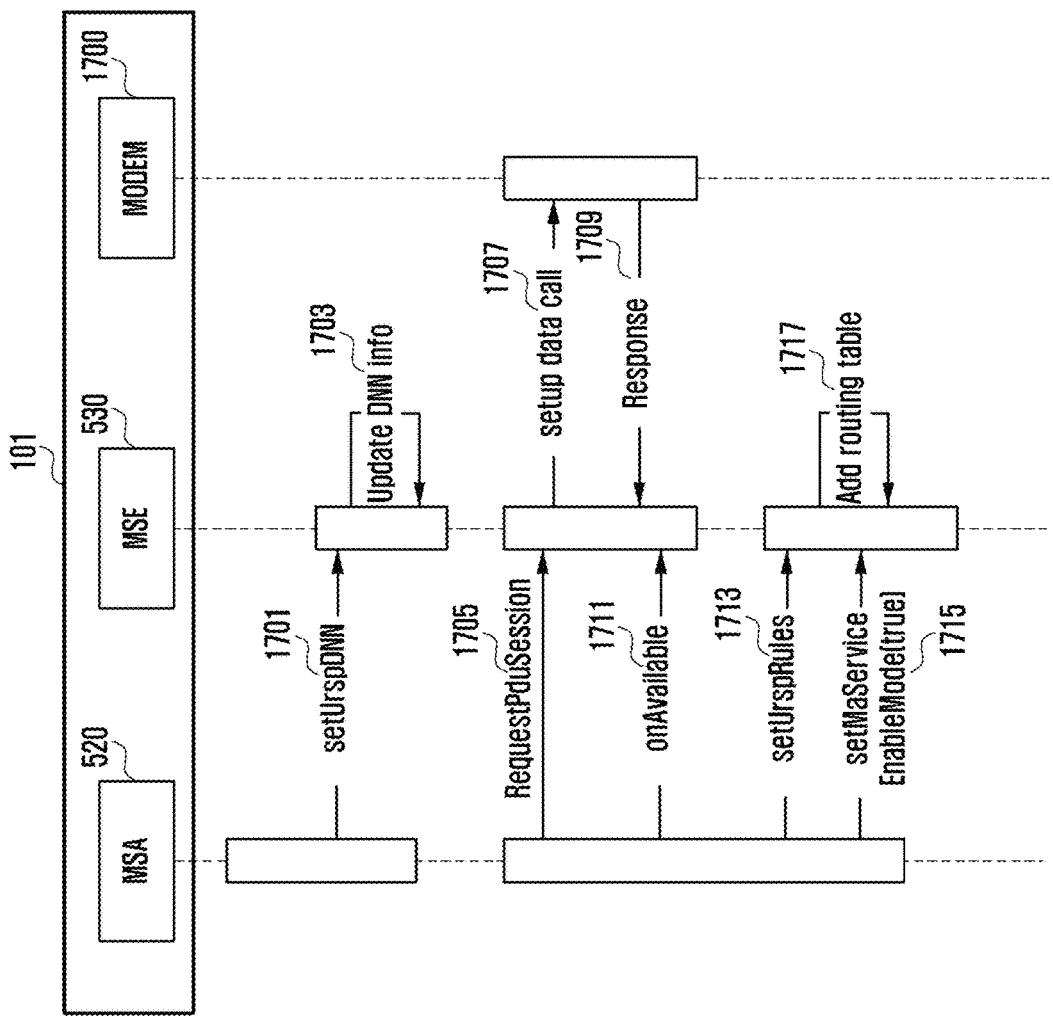
FIG. 17 is a diagram illustrating an example of a policy update operation performed by an electronic device according to various embodiments.

FIG. 17 is a diagram illustrating an example of a policy update operation performed by an electronic device 101 according to various embodiments.

As illustrated in FIG. 17, FIG. 17 may show an example of a PDU session establishment in a policy update (e.g., PDU session setup), and may show an operation example for dedicated DNN activation in a PDU session setup (or PDN connection establishment). According to an embodiment, the PDU session setup may include new PDU session establishment, existing PDU session release, and existing PDU session update (e.g., change of setup (e.g., QoS information, such as bandwidth or latency), and FIG. 17 may show an example of PDU session establishment. According to an embodiment, the electronic device 101 may include an MSA (or service agent) 520, an MSE (or service enabler) 530, and a modem (or communication processor (CP)) 1700.

With reference to FIG. 17, at operation 1701, in case of obtaining (or receiving) information about DNN setup, the MSA 520 may provide (or transfer) a first message (e.g., setUrspDNN) indicating to set the DNN to the MSE 530.

At operation 1703, the MSE 530 may update DNN information (e.g., update DNN Info) based on the first message (e.g., setUrspDNN) provided from the MSA 520.

At operation 1705, the MSA 520 may provide a second message (e.g., requestPduSession) indicating to establish a PDU session (or PDN connection) to the MSE 530.

At operation 1707, the MSE 530 may provide a third message (e.g., setup data call) indicating to establish a data call if the MSE 530 receives the second message (e.g., requestPduSession).

At operation 1709, if the third message (e.g., setup data call) is received from the MSE 530, the modem 1700 may set a data call based on preconfigured information for processing a service (e.g., MEC service), or set a data call based on the indicated information, and provide a fourth message (e.g., response message) corresponding to the third message to the MSE 530. According to an embodiment, the PDU session may be established based on a case that the modem 1700 requests the PDU session establishment from a core network (e.g., SMF) through the third message (e.g., setup data call).

At operation 1711, if the fourth message (e.g., response to a data call setup request) is received from the modem 1700, the MSE 530 may provide a fifth message (e.g., onAvailable) notifying that the PDU session has been established to the MSA 520.

At operation 1713, if the URSP rule is received using any one of methods as described above or through other methods, the MSA 520 may provide a sixth message (e.g., setUrspRules) indicating establishment of the URSP rule to the MSE 530. According to an embodiment, at operation 1715, the MSA 520 may provide a seventh message (e.g., setMaServiceEnableMode(true)) indicating to execute (true) a MEC service activation mode (e.g., MSE activation) to the MSE 530.

At operation 1717, the MSE 530 may establish (or add) a routing table based on the sixth message (e.g., setUrspRules) and the seventh message (e.g., setMaServiceEnableMode (true)) received from the MSA 520. According to an embodiment, the URSP rule may include usage PDU session information for each application or for each URI, and if the PDU session on the URSP rule is not established, the electronic device 101 (e.g., MSE 530) may establish the PDU session through setUrspDNN API. According to an embodiment, during the PDU session establishment, the electronic device 101 (e.g., MSE 530) may establish the routing table through setUrspRules API so that a data path for the corresponding application ID (AppID) or URI is established as the PDU session on the URSP rule.

Figure 18:
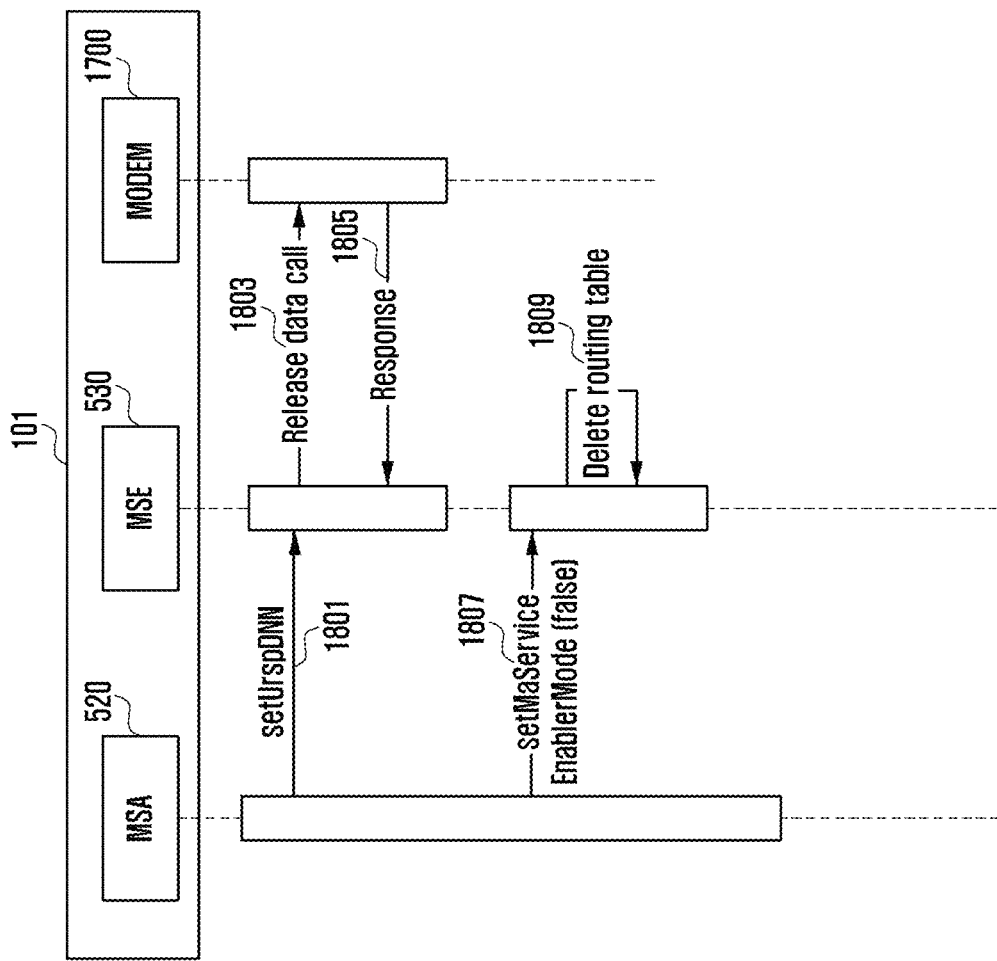
FIG. 18 is a diagram illustrating an operation example of PDU session setup performed by an electronic device according to various embodiments.

FIG. 18 is a diagram illustrating an operation example of PDU session setup performed by an electronic device 101 according to various embodiments.

As illustrated in FIG. 18, FIG. 18 may show an example of a PDU session release in a policy update (e.g., PDU session setup), and may show an operation example for releasing a PDU session (or PDN connection). According to an embodiment, the PDU session setup may include a new PDU session establishment, the existing PDU session release, and the existing PDU session update (e.g., change of a setup for characteristics for each PDU session (e.g., QoS information such as bandwidth or latency), and FIG. 17 may show a PDU session release example. According to an embodiment, the electronic device 101 may include an MSA (or service agent) 520, an MSE (or service enabler) 530, and a modem (or communication processor (CP)) 1700.

With reference to FIG. 18, at operation 1801, if it is required to release setup of information about DNN setup, the MSA 520 may provide (or transfer) a first message (e.g., setUrspDNN) indicating to release the corresponding DNN to the MSE 530.

At operation 1803, the MSE 530 may provide a second message (e.g., Release data call) indicating to release a data call based on the first message (e.g., setUrspDNN) provided from the MSA 520 to the modem 1700.

At operation 1805, if a third message (e.g., Release data call) is received from the MSE 530, the modem 1700 may release the set configuration to process the corresponding service (e.g., MEC service), and may provide a fourth message (e.g., response message) corresponding to the third message to the MSE 530. According to an embodiment, the PDU session may be released based on a case that the modem 1700 requests the PDU session release from a core network (e.g., SMF) by the third message (e.g., release data call).

At operation 1807, the MSA 520 may provide a fifth message (e.g., setMaServiceEnableMode(false)) indicating to execute (false) a MEC service inactivation mode (e.g., MSE inactivation) to the MSE 530.

At operation 1809, the MSE 530 may delete the routing table stored (or established) in a memory (e.g., memory 130 of FIG. 1 or FIG. 2) from the memory based on the fifth message (e.g., setMaServiceEnableMode(false)) received from the MSA 520.

Figure 19:
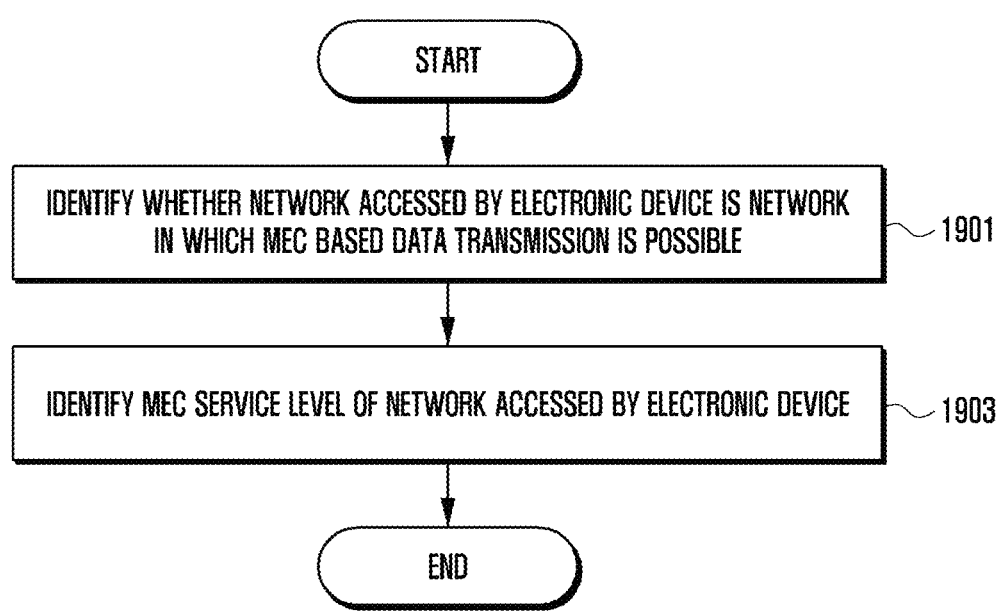
FIG. 19 is a flowchart illustrating a method by an electronic device for identifying whether it is possible to transmit MEC based data according to various embodiments.

FIG. 19 is a flowchart illustrating a method by an electronic device 101 for identifying whether it is possible to transmit MEC based data according to various embodiments.

According to various embodiments, operations illustrated in FIG. 19 may be performed, for example, in at least one of the case where the electronic device 101 attaches an operator's network, the case where the operator's network is changed (e.g., international roaming), depending on a designated cycle, or the case where subscriber information is changed.

With reference to FIG. 19, at operation 1901, the electronic device 101 may identify whether the network accessed by the electronic device 101 is a network in which MEC based data transmission is possible. According to an embodiment, the MEC service module 410 (e.g., MSE 530) may identify whether the MEC based data transmission is possible based on at least one of a cell ID of the network accessed by the electronic device 101, public land mobile network (PLMN), or data network name (DNN) (=access point name (APN)). According to an embodiment, at least one of the cell ID, PLMN, or DNN may be information pre-registered in the electronic device 101, or may be obtained in case that the electronic device 101 requests the MEC system 405 to provide the same.

At operation 1903, the electronic device 101 may identify a MEC service level of the network accessed by the electronic device 101. According to an embodiment, the MEC service level may include, for example, at least one of MEC usage authorization or MEC quality of service (QoS). For example, if a service quality rating is differentially applied in accordance with the subscription information for each user, the MEC QoS may mean information on this. For example, in case of a premium subscriber, more MEC service application kinds and/or more MEC host resources (e.g., resources, such as bandwidth, memory, cpu, or gpu) may be provided. According to an embodiment, the electronic device 101 may identify a MEC service level using at least one of information related to a SIM (or USIM) or user subscription information (e.g., IMEI) of the electronic device 101.

According to an embodiment, the network accessed by the electronic device 101 can transmit MEC data, and if the electronic device 101 has MEC usage authority, it may perform the discovery procedure. According to an embodiment, the electronic device 101 may identify whether the MEC data can be transmitted or the MEC service level before performing the discovery procedure, and thus unnecessary discovery can be prevented from occurring.

MEC Discovery

Hereinafter, a MEC discovery procedure according to various embodiments will be described. According to an embodiment, a MEC discovery procedure may include App list obtaining (e.g., MEC application lookup), application context create, MEC host selection, and/or DNS resolving operation.

Figure 20:
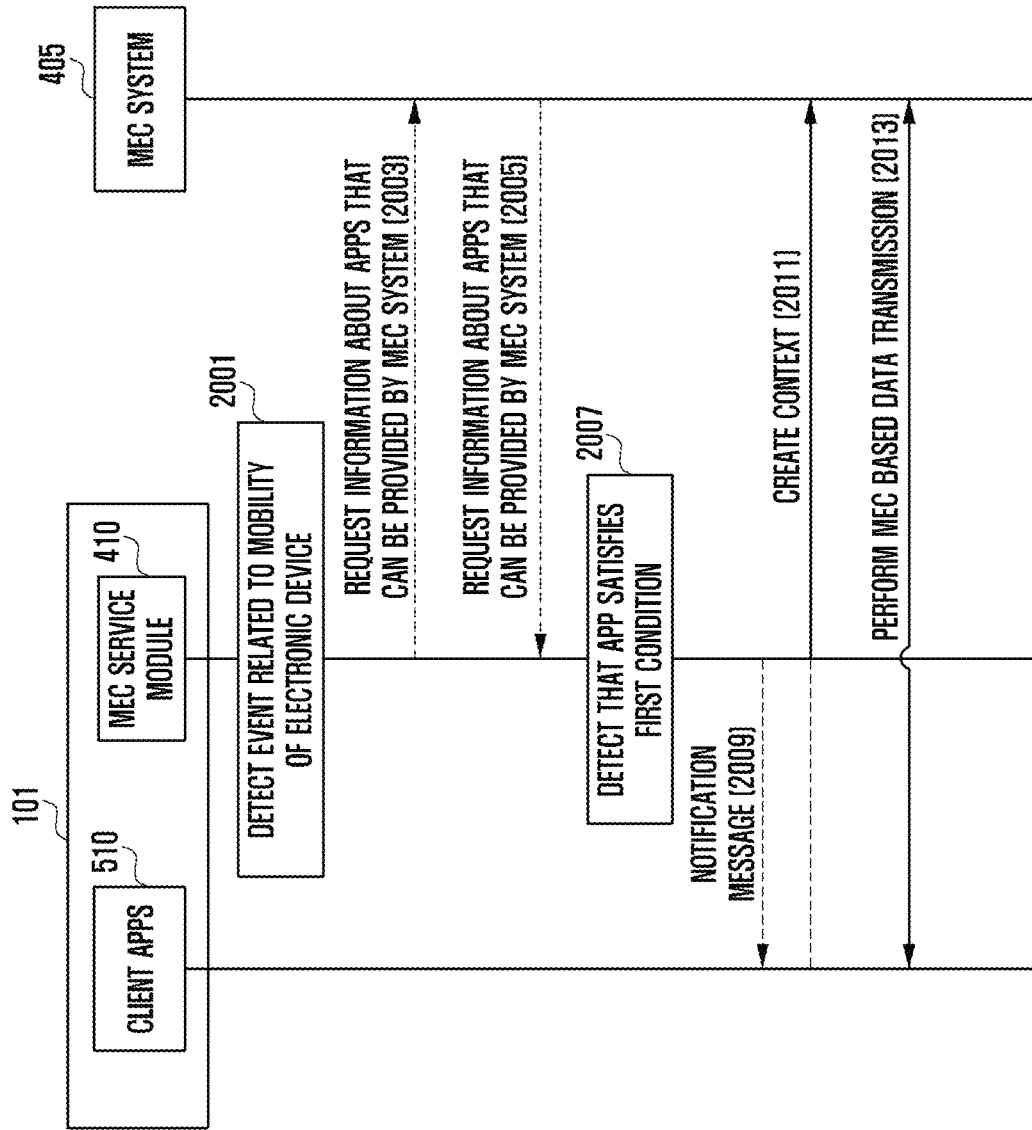
FIG. 20 is a diagram illustrating an example of a discovery procedure according to various embodiments.

FIG. 20 is a diagram illustrating an example of a discovery procedure according to various embodiments.

With reference to FIG. 20, at operation 2001, a MEC service module 410 (e.g., MSE 530) may detect an event (e.g., discovery trigger) related to mobility of the electronic device 101. According to an embodiment, the event related to the mobility may include, for example, an operation of detecting a movement of the electronic device 101, an operation of detecting a change of a base station connected to the electronic device 101, or an operation of detecting entry of the electronic device 101 into a designated area. The designated area may mean at least one of an LADN, a TA, a cell of a base station, area in which handover occurs between base stations, or an area determined by a location based service. According to an embodiment, the electronic device 101 may include a module (e.g., at least one sensor of a sensor module 176 of FIG. 1, a communication processor (e.g., auxiliary processor 123 of FIG. 1), an LADN detection module, or a GPS detection module) configured to detect the mobility related event. According to an embodiment, the MEC service module 410 may receive a notification for an event related to the mobility of the electronic device 101 from the corresponding module, or may detect the event related to the mobility of the electronic device 101 through monitoring of the corresponding module.

According to an embodiment, if an event related to the mobility of the electronic device 101 is detected, the MEC service module 410 may perform a MEC discovery procedure. The MEC discovery procedure may mean, for example, a series of operations for identifying (or discovering) application(s) (e.g., MEC application(s)) that can be provided by the MEC system 405. For example, the MEC discovery procedure may include operations 2003 to 2005. Although not illustrated in FIG. 20, the MEC service module may provide information indicating that an event related to the mobility of the electronic device 101 is detected to the client application 510.

According to an embodiment, at operation 2003, the MEC service module 4120 may request information related to applications that can be provided by the MEC system 405 from a MEC system 405 (e.g., MMP server 430 or LCM proxy server). For example, the MEC service module 410 may transmit an application lookup request message to the MEC system 405. According to an embodiment, information about applications that can be provided by the MEC system 405 may be called an App list. According to an embodiment, a data packet transmitted at operation 2003 may be a first data packet including control data, and may include a first address related to the MEC service module 410.

According to an embodiment, the MEC service module 410 may request information about the applications that can be provided by the MEC system 405 from a third server (not illustrated) separately from the MEC system 405. The third server may be deployed, for example, inside or outside an operator's network accessed by the electronic device 101. In this case, the electronic device 101 may obtain information about the operator's network from the network information, and may request information related to the applications that can be provided by the MEC system 405 from the third server based on the obtained information.

According to an embodiment, at operation 2005, the MEC service module 410 may receive information (e.g., App list of available applications) about the applications that can be provided by the MEC system 405 from the MEC system 405. According to an embodiment, the MEC service module 410 may transmit the application lookup request message to the MEC system 405 (e.g., operation 2003), and may obtain the App list of available applications by receiving an application lookup response message corresponding to the application lookup request message.

According to an embodiment, examples of parameters (e.g., App list request parameters) that can be included in the application lookup request message may be presented as in Table 1 below.

TABLE 1

| Name | Type | Cardinal | Description | ETSI MEC compatible |
|---|---|---|---|---|
| appName | String | 0 . . . N | Name to identify the user app | Y |
| appProvider | String | 0 . . . N | Provider of the MEC app | Y |
| appSoftVersion | String | 0 . . . N | Software version of the MEC app | Y |
| serviceCont | Enum (inlined) | 0 . . . 1 | Required service continuity mode for this application:<br>0 = SERVICE_CONTINUITY_NOT_REQUIRED<br>1 = SERVICE_CONTINUITY_REQUIRED | Y |
| vendorId | String | 0 . . . N | Vendor Identifier | Y |
| clientappName | String | 0 . . . N | Name to identify the client App | N |
| locationInfo | String | 0 . . . 1 | (Longitude, Latitude) or gNB ID or TAI or SSID or Predefined Location ID | N |
| deviceType | Enum (inlined) | 0 . . . N | Predefined device type Example:<br>0 = Default<br>1 = Smartphone<br>2 = Car<br>3 = Drone . . . | N |
| serviceCategory | Enum (inlined) | 0 . . . N | Predefined service category Example:<br>0 = Default<br>1 = Video streaming<br>2 = Game<br>3 = V2X<br>4 = AR/VR<br>5 = Enterprise . . . | N |
| contextType | Enum (inlined) | 0 . . . 1 | Required context type for this application:<br>0 = APP_CONTEXT_NOT_REQUIRED<br>1 = APP_CONTEXT_REQUIRED | N |
| URI Request | Boolean | 0 . . . 1 | Request for URI of MEC applications from App Look-up response if available | N |

NOTE:
The value of the attribute of the type String shall not exceed the length of 32 characters.

As exemplified in Table 1, the App list request parameters according to various embodiments may include, for example, at least one of clienttappName, locationInfo, deviceType, serviceType, contextType, or URI request in addition to parameters defined in the ETSI MEC standards. According to an embodiment, "clienttappName" may indicate an application name (e.g., AppName) transferred from the MSA 520. According to an embodiment, "Location Info" may indicate an accessed cell ID, tracking area (TA) ID, regional information (e.g., city, gu, dong, building, and the like), or preferred location information designated by a user. According to an embodiment, "Device Type" may indicate the kind of electronic device 101, such as smartphone, tablet, wearable, IoT, car, or drone. According to an embodiment, "Service Type" may indicate the kind of service, such as game, V2X, AR/VR, LBO, enterprise, or web. According to an embodiment, "Context Type" may indicate whether context information of a user or application is necessary in driving the MEC application. According to an embodiment, "URI Request Flag" may indicate a flag requesting that the corresponding URI is included in a response if the URI of the MEC application is available.

According to an embodiment, examples of an App list of available applications that the MEC service module 410 receives from the MEC system 405 may be presented as in Table 2 below.

TABLE 2

| Name | Type | Cardinal | Description | ETSI MEC Compatible |
|---|---|---|---|---|
| appList | Structure Array | 0 . . . N | List of MEC applications available to the client application. As defined below. | Y |
| >appInfo | Structure | 1 | | Y |
| >>appDId | String | 1 | Identifier of this MEC application descriptor. It is equivalent to the appDId defined in clause 6.2.1.2 of ETSI GS MEC 010-2 [1]. This attribute shall be globally unique. | Y |
| >>appName | String | 1 | Name of the MEC application. The length of the value shall not exceed 32 characters. | Y |
| >>appProvider | String | 1 | Provider of the MEC application. The length of the value shall not exceed 32 characters. | Y |
| >>appSoftVersion | String | 1 | Software version of the MEC application. The length of the value shall not exceed 32 characters. | Y |
| >>appDVersion | String | 1 | Identifies the version of the application descriptor. It is equivalent to the appDVersion defined in clause 6.2.1.2 of ETSI GS MEC 010-2 [1]. | Y |
| >>appDescription | String | 1 | Human readable description of the MEC application (see note 2). | Y |
| >>referenceURI | URI | 0 . . . 1 | Address of the MEC application. This can be provided if the address of the MEC application is currently available. | N |
| >>clientAppName | String | 0 . . . N | Client app name that is allowed to connect to the mec application. | N |
| >>clientAppPackageURL | String | 0 . . . 1 | Address for downloading the corresponding client application package to connect with the MEC application | N |
| >>uriTTL | uint32 | 0 . . . 1 | Time-to-live of the reference URI | N |
| >>uriLOC | String | 0 . . . 1 | Location (range) where the reference URI is available | N |
| >>carpRule | Structure | 0 . . . 1 | Client App Routing Policy Rules | N |
| >>>DNN | String | 0 . . . 1 | DNN selection for this application | N |
| >>>S-NSSAI | String | 0 . . . 1 | Network slice selection for this application | N |
| >>>accessType | String | 0 . . . 1 | Preferrend access type for this application (e.g., 4G, 5G, WiFi, etc.) | N |
| >>>sessionType | String | 0 . . . 1 | Ipv4, ipv6, etc. | N |
| >>>mptcp | Boolean | 0 . . . 1 | Indicates whether to use MPTCP for the matching application | N |
| >>fqdnList | String Array | 0 . . . 1 | FQDN list that can be routed to MEC applications by the DNS proxy | N |
| >>appCharcs | Structure | 0 . . . 1 | Characteristics of the application as defined below. The application characteristics relate to the system resources consumed by the application. Device application can use this information e.g. for estimating the cost of use of the application or for the expected user experience. | Y |
| >>>memory | String | 0 . . . 1 | The maximum size in Mbytes of the memory resource expected to be used by the MEC application instance in the MEC system. | Y |
| >>>storage | String | 0 . . . 1 | The maximum size in Mbytes of the storage resource expected to be used by the MEC application instance in the MEC system. | Y |

TABLE 2-continued

| Name | Type | Cardinal | Description | ETSI MEC Compatible |
|---|---|---|---|---|
| >>>latency | String | 0 . . . 1 | The target round trip time in milliseconds supported by the MEC system for the MEC application instance | Y |
| >>>bandwidth | String | 0 . . . 1 | The required connection bandwidth in kbit/s for the use of the MEC application instance | Y |
| >>>serviceCont | String | 0 . . . 1 | Required service continuity mode for this application. Permitted values: 0 = SERVICE_ CONTINUITY_ NOT_REQUIRED. 1 = SERVICE_ CONTINUITY_ REQUIRED | Y |
| >vendorSpecific Ext | String | 0 . . . 1 | Extension for vendor specific information (see note 1). | Y |
| >>vendorId | String | 1 | Vendor identifier. The length of the value shall not exceed 32 characters. The rest of the structure of vendor specific extension is not defined. | Y |

NOTE 1:
The vendor specific extension allows submitting information on the application lists that have been made available to the device application of the corresponding vendor.
NOTE 2:
The language support may be limited. The length of the value shall not exceed 128 characters.

As exemplified in Table 2, App list response parameters according to various embodiments may include, for example, at least one of referenceURI, clientAppName, clientAppPackageURI, uriTTL, uriLOC, carpRule, DNN, S-NSSAI, accessType, sessionType, mptcp, or fqdnList in addition to parameters defined in the ETSI MEC standards.

According to an embodiment, in addition to the information disclosed in Table 1 and Table 2, information about applications that can be provided by the MEC system 405 may include at least one piece of information usable corresponding to at least one piece of location information among identifier (ID) of a currently accessed base station, ID of a neighboring base station, GPS information, tracking area (TA) information, or Wi-Fi ID. According to an embodiment, the information about the applications that can be provided by the MEC system may include at least one piece of information usable corresponding to information about the state of the electronic device 101 (e.g., combination of one or more of movement (or motion) speed of the electronic device 101, screen ON/OFF, battery level, base station received signal strength, timeout information, or distance information between the electronic device 101 and the MEC host).

According to an embodiment, the information about the applications that can be provided by the MEC system 105 may include domain names of applications that can be provided by the MEC system 405. The electronic device 101 may access the MEC application using the domain name. According to an embodiment, an embodiment in which the electronic device 101 uses domain names will be described with reference to the drawings (e.g., FIGS. 36 to 40) to be described later.

According to an embodiment, the information about the applications that can be provided by the MEC system 405 may further include an IP address of the MEC system 405 (or MEC host 447) or the MEC application (e.g., 460-1 and 460-2).

According to an embodiment, the MEC service module 410 may perform the MEC discovery procedure in association with LADN dedicated PDU session setup. For example, if the PDU session (e.g., LADN dedicated session) is set, the MEC service module 410 may perform the MEC discovery procedure, and if the suitable result (e.g., name of the designated application or App list) is received through performing of the MEC discovery procedure, the MEC service module 410 may set the PDU session (e.g., LADN dedicated session).

According to an embodiment, the MEC service module 410 may directly perform operation 2007 without performing the discovery procedure. For example, if the an App list of available applications has already been stored in the electronic device 101, and the designated App list update period has not elapsed, or there is not an update request, the MEC service module 410 may not perform the discovery procedure.

According to an embodiment, the MEC service module 410 may further include an operation of identifying whether the electronic device 101 can perform MEC based data transmission in the accessed network before performing the discovery procedure. According to an embodiment, although not illustrated in FIG. 20, the MEC service module 410 may monitor context information of the electronic device 101 before or after an event related to the mobility of the electronic device 101 is detected. For example, the MEC service module 410 may monitor the context information before operation 2001, after operation 2001, after operation 2003, or after operation 2005. According to an embodiment, the context information may be monitored in a state where the application processor (AP) (e.g., processor 120 of FIG. 1) of the electronic device 101 is continuously in an active state, or a separate module (e.g., at least one of communication module 190 or sensor module 176 of FIG. 1) for detecting if the condition at operation 2001 or 620 is satisfied may transfer a message to the MEC service module 410.

According to an embodiment, at operation 2007, the MEC service module 410 may determine that the condition (e.g., first condition) in which at least one application (e.g., client application 510) among applications installed in the electronic device 101 is satisfied based on at least one of the App list or monitored context information. For example, the MEC service module 410 may determine that the first condition is satisfied (1) if an application corresponding to the application capable of using the MEC based data transmission in the received App list is provided in the electronic device 101, (2) if at least one usable application is provided in the electronic device 101 corresponding to at least one piece of location information among a currently accessed base station ID, neighboring base station ID, GPS information, TA information, or Wi-Fi ID, or (3) if at least one usable application is provided corresponding to information related to the state of the electronic device 101. In relation to the condition (3), the MEC service module 410 may determine that the first condition is satisfied if at least one usable application is provided corresponding to information about the state of the electronic device 101 that can be used by the application (e.g., moving speed of the electronic device 101, screen ON/OFF, battery level, base station received signal strength, or timeout information. For example, the first application (e.g., first App 310-1 of FIG. 3) may require state information of the electronic device, such as if it is determined that non-mobility state of the electronic device 101 continues for about one minute or more, screen is in an ON state, or the base station signal strength is equal to or higher than a threshold value (e.g., good). For example, the second application (e.g., second App 310-2) may require the state information of the electronic device 101, such as screen ON or battery level equal to or higher than a threshold value (e.g., 30%). The MEC service module 410 may determine that the first condition is satisfied in case that the state of the electronic device 101 coincides with the state information required by the respective applications.

According to an embodiment, the MEC service module 410 may directly perform operation 2009 without performing operation 2007.

According to an embodiment, at operation 2009, the MEC service module 410 may transmit, to the client application 510, a notification message indicating that the MEC based data transmission is usable. According to an embodiment, if an application capable of using the MEC based data transmission (e.g., client application 510) is not installed in the electronic device 101, the MEC service module 410 may transmit a message for guiding installation (or storage) of the application to an application layer 446.

According to an embodiment, the MEC service module 410 may not perform operation 2009. According to an embodiment, the MEC service module 410 may display a graphic user interface (GUI) indicating that the MEC based data transmission of a specific application is usable on an icon of the corresponding application on the display (e.g., display device 160 of FIG. 1) of the electronic device. According to another embodiment, the MEC service module 410 may display the MEC performance (e.g., signal strength) of the application capable of using the MEC based data transmission. For example, the signal strength may be displayed as "good", "normal", or "bad".

At operation 2011, the MEC service module 410 may request to execute the MEC application included in the MEC system 405 (e.g., create context). According to an embodiment, although not illustrated in FIG. 20, not only the MEC service module 410 but also the client application 510 may perform context create.

According to an embodiment, if the client application 510 is executed in the electronic device 101 or the client application 510 request an access to a domain name (e.g., uniform resource identifier (URI) of the MEC application, the MEC service module 410 may perform context create. As another example, the MEC service module 410 may perform context create in accordance with a designated cycle. As another example, if an event related to the mobility of the electronic device 101 is detected, the MEC service module 410 may perform context create.

According to an embodiment, the MEC service module 410 may perform context create with the MEC system 405 (e.g., MMP server 430) on a MEC control plane. If the MEC service module 410 requests execution of the MEC application through the context create, the MEC system 405 (e.g., MEP manager 445) may execute the MEC application. According to an embodiment, if the MEC application is not installed in the MEC system 405 (e.g., MEC host 447), the MEC system 405 (e.g., MEP manager 445) may install and execute the MEC application.

According to an embodiment, at operation 2013, the client application 410 may perform data transmission with the MEC system 405. For example, the client application 410 may perform data communication with the MEC application (e.g., 460-1 or 460-2) of the MEC system 405 on the user plane. According to an embodiment, a data packet transmitted and received at operation 2013 is a second data packet including user data, and may include a second address related to the client application 410 (or MEC application). According to an embodiment, if the MEC service module 410 obtains the IP address of the MEC host 447 (or MEC application) before operation 2013, the client application 410 may perform the data transmission using the obtained IP address. Embodiments in which the IP address of the MEC host 447 or the MEC application is obtained will be described later with reference to FIGS. 37 to 39. According to an embodiment, the client application 410 may perform hypertext transfer protocol (HTTP) based data transmission on an application layer (e.g., user plane of FIG. 3). According to another embodiment, the electronic device 101 may perform the data transmission based on other protocols in addition to the HTTP. For example, the electronic device 101 may perform the data transmission based on a remote procedure call (RPC) protocol or based on a lower layer of the application layer 446 (e.g., transmission control protocol/Internet protocol (TCP/IP) or user datagram protocol/Internet protocol (UDP/IP)).

Although not illustrated in FIG. 20, the MEC service 410 may request termination of the MEC application (context delete) in response to detection of deviation of the electronic device 101 from the designated area.

According to various embodiments, the electronic device 101 may integrally trigger the MEC based data transmission of a plurality of applications in accordance with the designated condition through various methods as described above, and thus the load of the electronic device 101 due to individual data transmission can be reduced.

According to an embodiment, the electronic device 101 may be provided with MEC based services from an enterprise or a school. If the electronic device 101 detects an event related to the mobility of the electronic device 101 (e.g., operation 2001), it may identify the MEC based service (or application supporting the MEC based data transmission) provided from the enterprise or the school through the MEC discovery (e.g., operations 2003 to 2005). The electronic device 101 may detect the existence of the MEC application usable in the location (e.g., inside of the enterprise or school) of the electronic device 101 determined using at least one of a location measurement technology (e.g., location measurement technology based on cellular, satellite, or Wi-Fi) or the sensor module 176 (e.g., operation 2007). As another example, the electronic device 101 may detect the existence of the MEC application that can be used by the electronic device 101 through a beacon signal received from a beacon device installed inside the enterprise (or school) or near field communication (NFC) tagging. The MEC service module 410 may transmit a notification message to the application capable of perform the MEC based data transmission at the enterprise or school (e.g., operation 2009). The application having received the notification message may be automatically executed by the electronic device 101, or a user interface indicating that the corresponding application can be used may be displayed through a display (e.g., display device 160 of FIG. 1). If the application is executed, the electronic device 101 may be provided with a service from the enterprise or school through the MEC based data transmission (e.g., operation 2013).

According to another embodiment, the electronic device 101 may be provided with the MEC based service from a place providing advertisement or coupons (e.g., department store or shopping mall). If the electronic device 101 enters a designated area (e.g., operation 2001), the electronic device 101 may identify the MEC based service provided from the department store or shopping mall through the MEC discovery (e.g., operations 2003 to 2005). The electronic device 101 may detect the existence of the MEC application that is usable at a location of the electronic device 101 (e.g., specific area of the department store (or shopping mall)) determined using at least one of the location measurement technology or the sensor module 176 (e.g., operation 2007). The MEC service module 410 may transmit a notification message to the application that can perform the MEC based data transmission in the department store or the shopping mall (e.g., operation 2009), and the application having received the notification message may display the advertisement or coupons in the form of a popup.

According to another embodiment, the electronic device 101 may be provided with a game service. If the electronic device 101 enters a designated area (e.g., operation 2001), it may obtain information about game applications through the MEC discovery (e.g., operations 2003 to 2005). The electronic device 101 may determine the game application that satisfy a reference (e.g., memory, latency, or frequency band) required by the game application installed in the electronic device 101 among the game applications provided by the MEC system (e.g. MEC server) 405 at least based on the information disclosed in Table 1 (e.g., operation 2007). As another example, if the game application installed in the electronic device 101 requires a motion of the electronic device 101, the electronic device 101 may detect the motion of the electronic device 101. The MEC service module 410 may transmit a notification message to the game application (e.g., operation 2009), and if the game application is executed, the electronic device 101 may be provided with the service through the MEC based data transmission (e.g., operation 2013).

Figure 21:
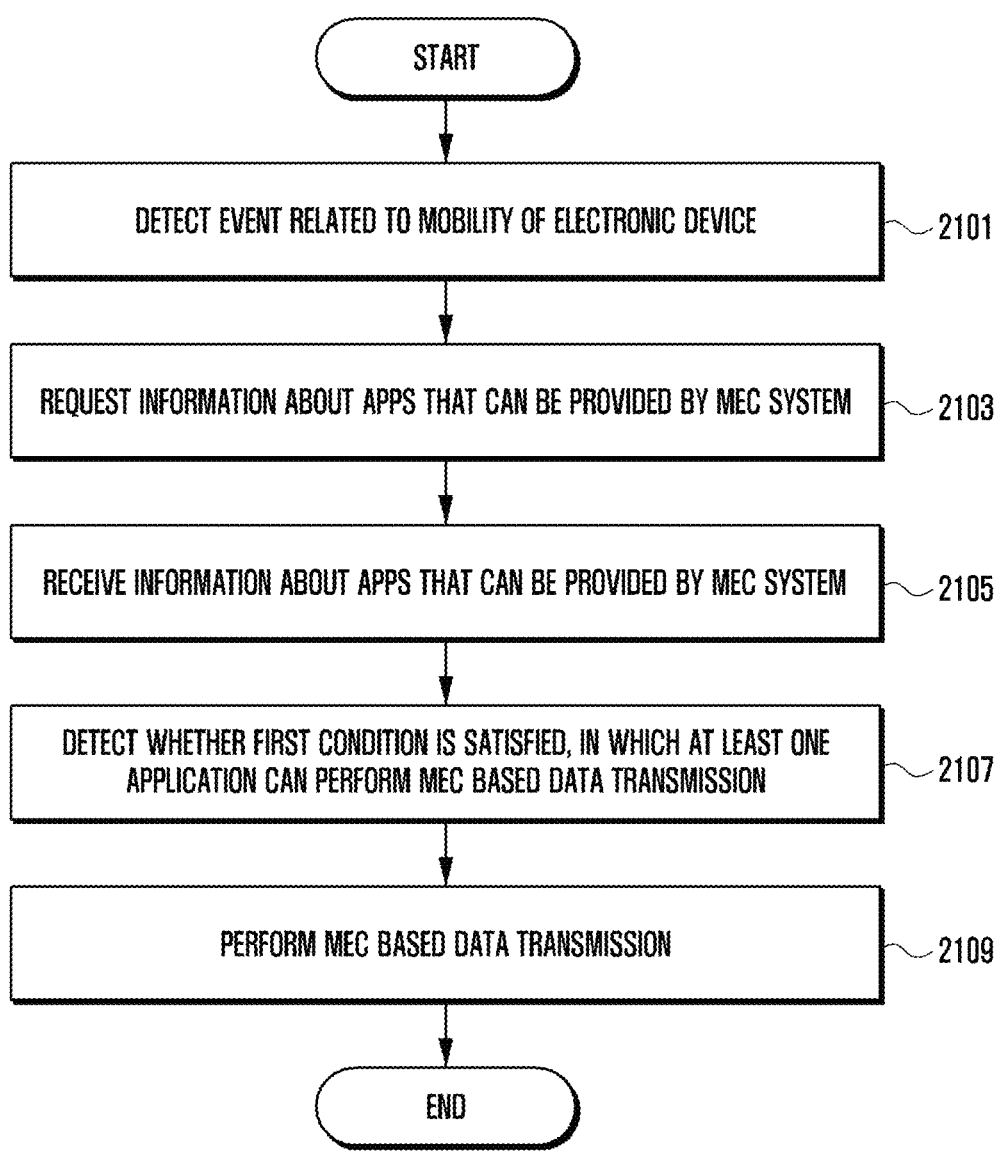
FIG. 21 is a flowchart illustrating an operation method of an electronic device for performing a discovery procedure according to various embodiments.

FIG. 21 is a flowchart illustrating an operation method of an electronic device 101 for a discovery procedure according to various embodiments.

According to various embodiments, operations illustrated in FIG. 21 may be performed, for example, by the electronic device 101 or the constituent element (e.g., processor 120 of FIG. 1 or MEC service module 410 of FIG. 4) included in the electronic device 101.

With reference to FIG. 21, at operation 2101, the electronic device 101 may detect an event related to the mobility of the electronic device 101. According to an embodiment, the electronic device 101 may detect the event related to the mobility based on location information (e.g., at least one of LADN ID, TA ID, base station ID, or cell ID) received from a base station (e.g., the AN 302 of FIG. 3) to which the electronic device 101 is connected, based on the location measurement technology, or through a separate sensor module 176 mounted in the electronic device 101.

At operation 2013, the electronic device 101 may request information (e.g., App list) about applications that can be provided by the MEC system 405. According to an embodiment, the electronic device 101 may request the App list from the MMP server 430.

At operation 2105, the electronic device 101 may receive information about applications that can be provided by the MEC system 405. For example, the information about the applications that can be provided by the MEC system 405 may include at least one of at least one application usable corresponding to at least one piece of location information among information disclosed in Table 1, an identifier (ID) of a currently accessed base station, an ID of a neighboring base station, GPS information, TA information, or an Wi-Fi ID, at least one application usable corresponding to information about the state of the electronic device 101, or an IP address of the MEC host 447 for a domain name.

At operation 2107, the electronic device 101 may determine whether an application (e.g., client application 510) installed in the electronic device 101 satisfies a first condition capable of performing MEC based data transmission based on at least one of information about applications that can be provided by the MEC system 405 or context information.

At operation 2109, the electronic device 101 may perform the data transmission through the application satisfying the first condition. For example, the application satisfying the first condition may perform data transmission on an application layer with the MEC application installed in the MEC system (e.g., MEC server) 405.

Figure 22:
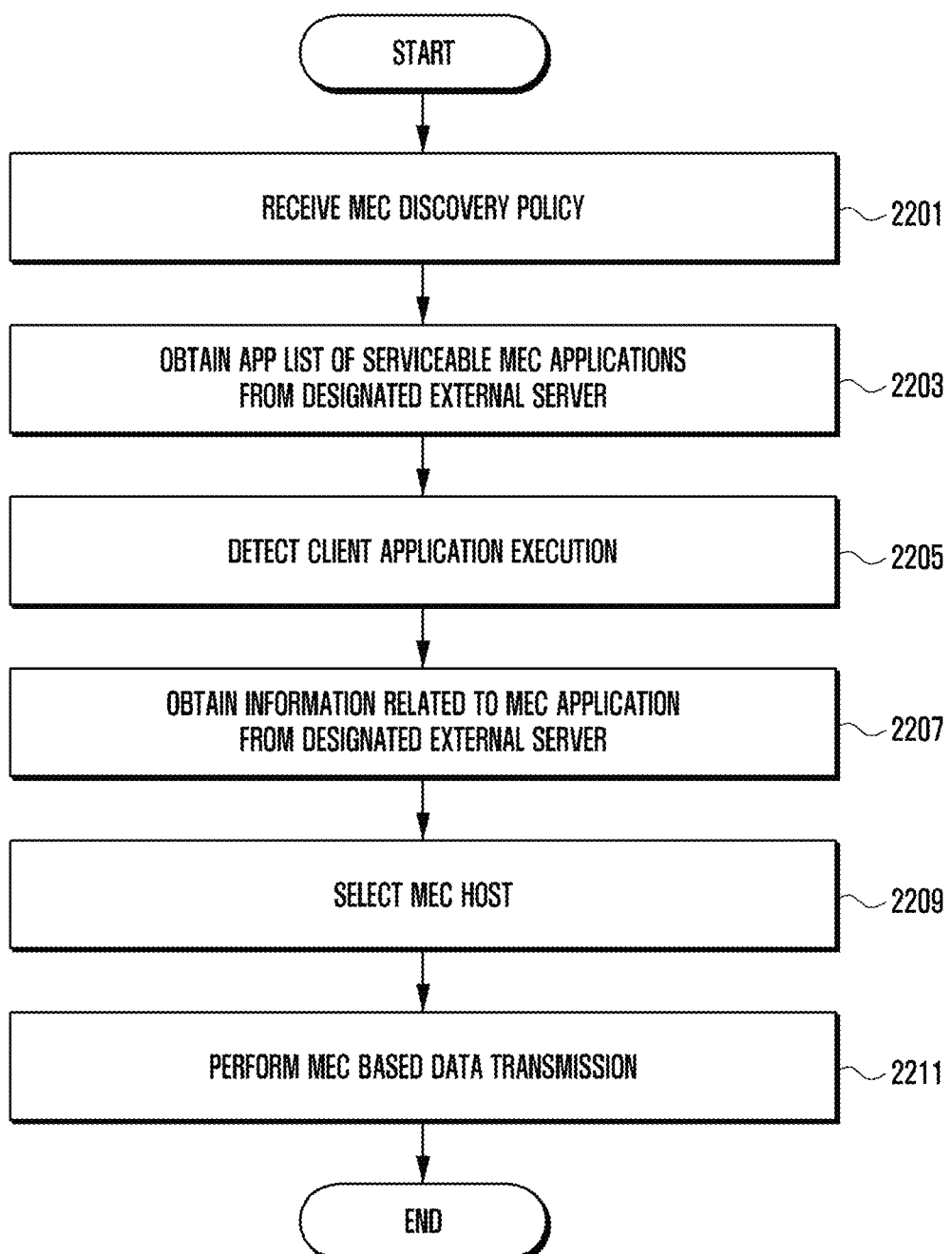
FIG. 22 is a flowchart illustrating an operation method by an electronic device 101 for a discovery procedure according to various embodiments.

FIG. 22 is a flowchart illustrating a method by an electronic device 101 for performing a discovery procedure according to various embodiments.

With reference to FIG. 22, at operation 2201, the processor 120 (or MEC service module 410) of the electronic device 101 may obtain (or receive) a MEC discovery policy from the MEC system 405. According to an embodiment, the MSA 520 of the electronic device 101 may receive the MEC discovery policy from the MEC system 405, and may transfer the MEC discovery policy to the MSE 530. According to an embodiment, the MEC service module 410 may obtain the MEC discovery policy using the MSA 520, and may perform the discovery procedure based on the MEC discovery policy received using the MSE 530. For example, the MSE 530 of the electronic device 101 may receive the MEC discovery policy from the MSA 520 through the MSE API. According to an embodiment, the MEC discovery policy may include parameters as exemplified in Table 1. For example, the MEC discovery policy may include at least one of client application name (e.g., clientAppNames), location (e.g., locationInfo), device type (e.g., deviceType), service type (e.g., serviceType), context type (e.g., contextType), application URI request (e.g., URI Request), or dynamic DNN (e.g., dynamicDnn). According to an embodiment, the client application name may be information for requesting an App list for identifying whether MEC can be used, and the location may be information for requesting a location based App list in accordance with the current location of the electronic device 101. The dynamic DNN may be information for identifying whether to use a dynamic DNN update. According to an embodiment, the electronic device 101 may request the App list corresponding to each type through inclusion of a device type and a service type in the MEC discovery policy, and may transfer whether the context of the application is necessary through inclusion of the context type. According to an embodiment, if the MEC discovery policy includes an application URI request and the URI of the MEC application is available, the electronic device 101 may request to include the URI in the App list.

At operation 2203, the processor 120 may obtain the App list of the serviceable MEC application from a designated external server (e.g., MMP server 430) based on the MEC discovery policy. According to an embodiment, the MSE 530 of the electronic device 101 may perform a procedure of obtaining the App list (e.g., MEC application lookup) based on the MEC discovery policy received from the MSA 520. According to an embodiment, the MSE 530 may request and receive the App list related to the serviceable MEC application from the MMP server 430 in accordance with the MEC discovery policy.

At operation 2205, the processor 120 may create an application context of a client application 510 (e.g., Application Context Create). According to an embodiment, the MEC service module 410 may request (context create) for executing the MEC application included in the MEC system 405. According to an embodiment, although not illustrated in FIG. 22, not only the MEC service module 410 but also the client application 510 may perform the context creation. According to an embodiment, the MEC service module 410 itself may detect the execution of the client application 510 by the MSA 520, and the client application 510 may call the corresponding API through a context create API provided by the MSA 520 or the MSE 530. According to an embodiment, the client application 510 may provide (or transfer) App Launch Detected or API (e.g., Context Create API) call to the MSA 520. The App Launch Detected may indicate, for example, a case where the client application 510 is executed. The API(Context Create) call may indicate, for example, a case where the URI for the MEC application name (e.g., MEC App Name) intended to be accessed is requested. According to an embodiment, if the App Launch Detected or API(Context Create) call is received, the MSA 520 may provide a state notification message (e.g., notifyClientAppState) for notifying the state of the client application 510 to the MSE 530. According to an embodiment, the state notification message may include, for example, the state of the client application (e.g., START) and the client application name (e.g., clientAppName) (and/or UID) to be provided as, for example, notifyClientAppState(START, clientAppName). According to an embodiment, if the execution of the client application 510 is detected, the MSA 520 may notify the MSE 530 of the execution state of the client application 510 by the MSE API call.

At operation 2207, if the execution of the client application 510 is detected, the processor 120 may obtain MEC application related information intended to be accessed in association with the client application 510 from the designated external server (e.g., MMP server 430) based on the App list. The MEC application related information may include, for example, at least one of a URL for a MEC application name (e.g., MEC App Name), dedicated DNN information, or MEC application package URI (e.g., in case that the MEC application is not provided). According to an embodiment, the MSE 530 of the electronic device 101 may receive a state notification message from the MSA 520, and may perform a procedure (e.g., application context create) to discover (or search or identify) the MEC application (or MEC host (e.g., edge server or MEC server) including the corresponding MEC application) based on the received state notification message. According to an embodiment, if the MSA 520 detects the execution of the client application 510, the application context create may be activated by the MSE API call. According to an embodiment, the application context create may be activated when the client application 510 calls the context create API.

At operation 2209, the processor 120 may select the MEC host based on the obtained information. According to an embodiment, the MSE 530 of the electronic device 101 may perform a host selection procedure (e.g., MEC host selection) for selecting the DNS server and the MEC host. According to an embodiment, the host selection procedure may be determined using predetermined information and/or information inquired to the DNS server, or a specific MEC host may be selected (or configured) by the information inquired to the DNS server and/or inquired to the user.

At operation 2211, the processor 120 may perform data transmission with the selected MEC host. For example, the client application 510 may perform data transmission on an application layer with the MEC application installed in the MEC system (e.g., MEC server) 405.

Figure 23:
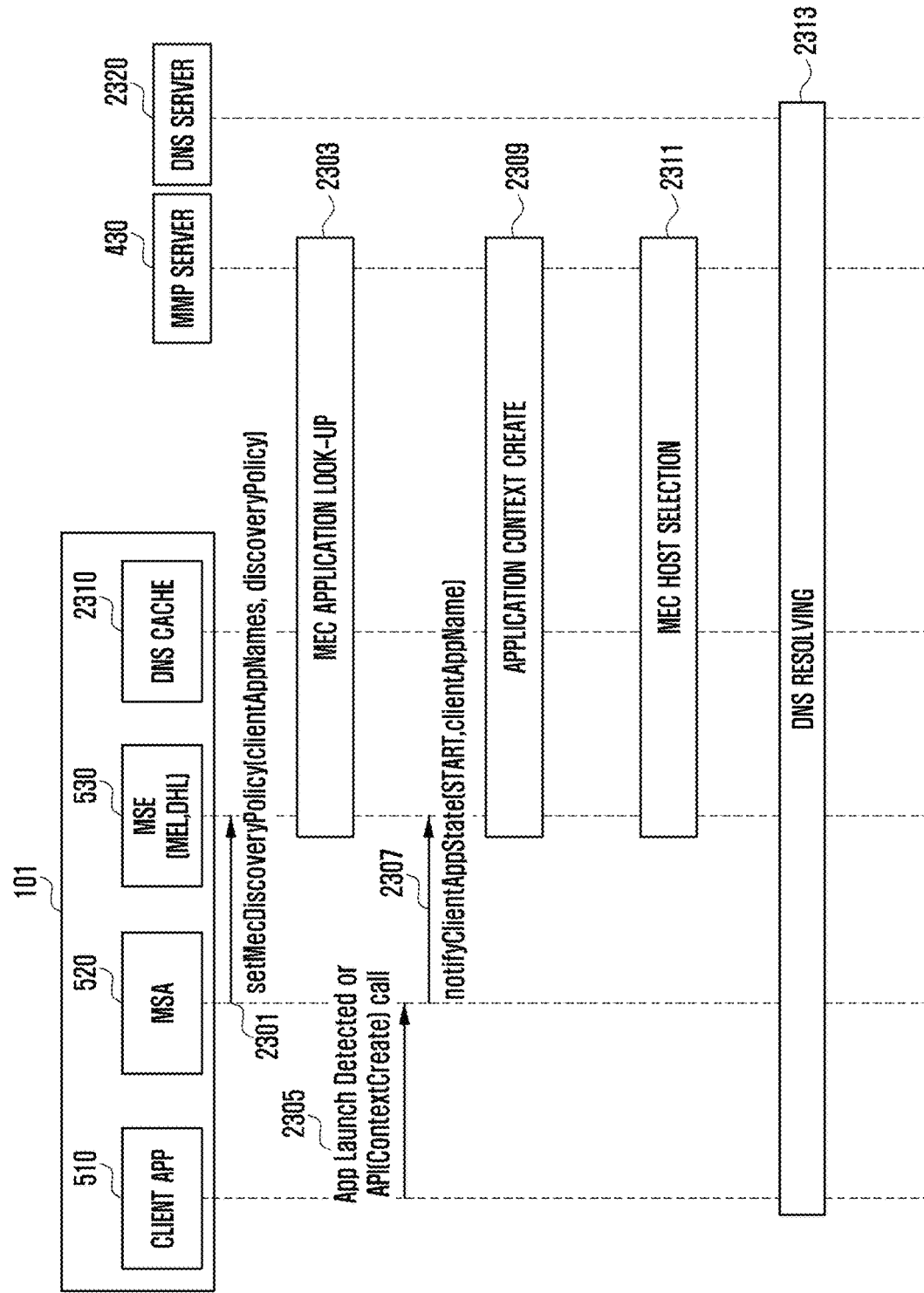
FIG. 23 is a diagram illustrating an example of a discovery procedure according to various embodiments.

FIG. 23 is a diagram illustrating an example of a discovery procedure according to various embodiments.

As illustrated, FIG. 23 may show an example of an application state based MEC discovery procedure. According to an embodiment, the electronic device 101 may include a client application (or client App) 510, an MSA (or service agent) 520, an MSE (or service enabler) 530 (e.g., including MEL 531 and UHL 533), and a DNS cache 2310.

With reference to FIG. 23, at operation 2301, the MSA 520 of the electronic device 101 may set a MEC discovery policy to the MSE 530. According to an embodiment, the MEC discovery policy may include a client application name (e.g., client AppNames) and the discovery policy (e.g., discoveryPolicy). According to an embodiment, the discoveryPolicy may include whether to use a dynamic DNN (e.g., dynamicDnn), and may include at least one piece of information denoted in Table 1, such as location (e.g., locationInfo), device type (e.g., deviceType), service type (e.g., serviceType), or context type (e.g., contextType). According to an embodiment, the MSA 520 may include the location (e.g., locationInfo), device type (e.g., deviceType), and service type (e.g., serviceType) in the discoveryPolicy, and may operate to receive only the App list matching the corresponding condition. According to an embodiment, the MSA 520 may include the context type (e.g., contextType) in the discoveryPolicy, and thus may include information on whether the application context is necessary. According to an embodiment, the MSA 520 may include a URI Request Flag in the discoveryPolicy, and if the URI of the MEC application is available, it may request to include the URI in the App list. According to an embodiment, the client application name (e.g., clientAppNames) may be information for requesting the App list for identifying whether the MEC is usable, and the location (e.g., locationInfo) may be information for requesting a location based App list in accordance with the current location of the electronic device 101. The dynamic DNN (e.g., dynamicDnn) may be information for identifying whether to use the dynamic DNN update.

At operation 2303, the MSE 530 may perform an obtaining procedure (e.g., MEC Application Lookup) for obtaining the App list (e.g., AppList) based on the information (e.g., MEC discovery policy) received from the MSA 520. According to an embodiment, the obtaining procedure (e.g., MEC Application Lookup) for obtaining the App list may start in accordance with the MEC discovery policy between the MSA 520 and the MSE 530. According to an embodiment, if the MEC discovery policy is received from the MSA 520 through the MSE API, the MSE 530 may activate the MEC Application Lookup, and if a specific condition (e.g., change of accessed base station cell ID during movement of the electronic device 101) of the electronic device 101 is satisfied, it may perform (or start) the MEC Application Lookup. According to an embodiment, the MSE 530 may request and receive the App list (e.g., MEC AppList) related to the serviceable MEC application (e.g., MEP App) from the MMP server 430 in accordance with the MEC discovery policy. According to an embodiment, the MSE 530 may request from the MMP server 430 by writing the MEC discovery policy in a MEC AppList request message Parameter as exemplified in Table 1, and the MMP server 430 may respond to the request from the MSE 530 by providing the serviceable App list (e.g., MEC AppList in Table 2) to match the MEC discovery policy to the MSE 530. The App list obtaining procedure (e.g., MEC Application Lookup) according to various embodiments will be described in detail with reference to the drawings to be described later.

At operation 2305, the client application 510 may provide (or transfer) App Launch Detected or API (Context Create) call to the MSA 520. According to an embodiment, the App Launch Detected may indicate a case where the client application 510 is executed. According to an embodiment, the API (Context Create) call may indicate a case where the URI for the MEC application name (e.g., MEC App Name) intended to be accessed is requested.

At operation 2307, if the App Launch Detected or API (Context Create) call is received, the MSA 520 may provide a notification message (e.g., notifyClientAppState) for notifying of the state of the client application 510 to the MSE 530. According to an embodiment, the notification message (e.g., notifyClientAppState) may include, for example, the client application state (e.g., START) and the client application name (e.g., clientAppName) (and/or UID) to be provided as, for example, notifyClientAppState(START, clientAppName).

At operation 2309, the MSE 530 may receive a notification message (e.g., notifyClientAppState) from the MSA 520, and may perform a procedure (e.g., application context create) to discover (or search or identify) the MEC application (or MEC host (e.g., edge server or MEC server) including the corresponding MEC application) based on the received notification message. According to an embodiment, if an event related to execution of the client application 510 is received from the MSA 520, the MSE 530 may activate the application context create. According to an embodiment, the MSE 530 may perform an application context create operation for searching for the MEC host including a desired MEC application through the MMP server 430 based on the information of the received notification message (e.g., notifyClientAppState). According to an embodiment, if the MSA 520 detects the execution of the client application 510, the application context create may be activated (or performed) by the MSE API call. According to an embodiment, the application context create may be activated (or performed) when the client application 510 performs the context create API call. According to an embodiment, the MSE 530 may request and receive the URI for the MEC application name (e.g., MEC App Name) intended to be accessed from the MMP server 430. According to an embodiment, if necessary, the MSE 530 may request and receive information about the dedicated DNN from the MMP server 430. According to an embodiment, if the corresponding MEC application is not provided, the MMP server 430 may transfer the MEC application package URI to the MSE 530. The application context create procedure according to various embodiments will be described in detail with reference to the drawings to be described later.

At operation 2311, the MSE 530 may perform a host selection procedure (e.g., MEC Host Selection) for selecting the MEC host with the DNS server 2320. According to an embodiment, if at least two MEC hosts are obtained through the MMP server 430, the MSE 530 may perform a host selection procedure (e.g., MEC Host Selection) for selecting any one MEC host with the DNS server 2320. According to an embodiment, if two or more MEC hosts are provided, the host selection procedure for selecting one MEC host is determined using predetermined information and/or information inquired through the DNS server 2320, or a specific MEC host may be selected (or configured) through information inquired to the DNS server 2320 and/or inquired to the user. According to an embodiment, if two or more MEC hosts are provided, information predetermined by the MSE 530 to configure a specific MEC host may include priority information. According to an embodiment, the host selection procedure may include a DNS pre-resolving operation and a MEC host prioritization operation. According to an embodiment, the DNS pre-resolving may include, for example, performing of the DNS resolving with respect to a fully qualified domain name (FQDN) for MEC through the MSE 530 itself regardless of the DNS query of the client application 510. According to an embodiment, the DNS resolving may be performed using the URI or domain name received through the MEC application lookup at operation 2303 or the application context create at operation 2309. According to an embodiment, the MEC host prioritization may include, for example, configuring of the IP priority in case that a plurality of IP addresses are received as a DNS query response. The host selection procedure (e.g., MEC host selection) according to various embodiments will be described in detail with reference to the drawings to be described later.

At operation 2313, the client application 510 may perform the DNS resolving operation using the information obtained through the above-described operation. According to an embodiment, the DNS resolving may be performed, for example, when the DNS query of the client application 510 occurs. According to an embodiment, the DNS resolving may include, for example, client-driven normal DNS resolving or DNS proxying (hooking DNS query). The DNS resolving according to various embodiments will be described in detail with reference to the drawings to be described later.

Figure 24:
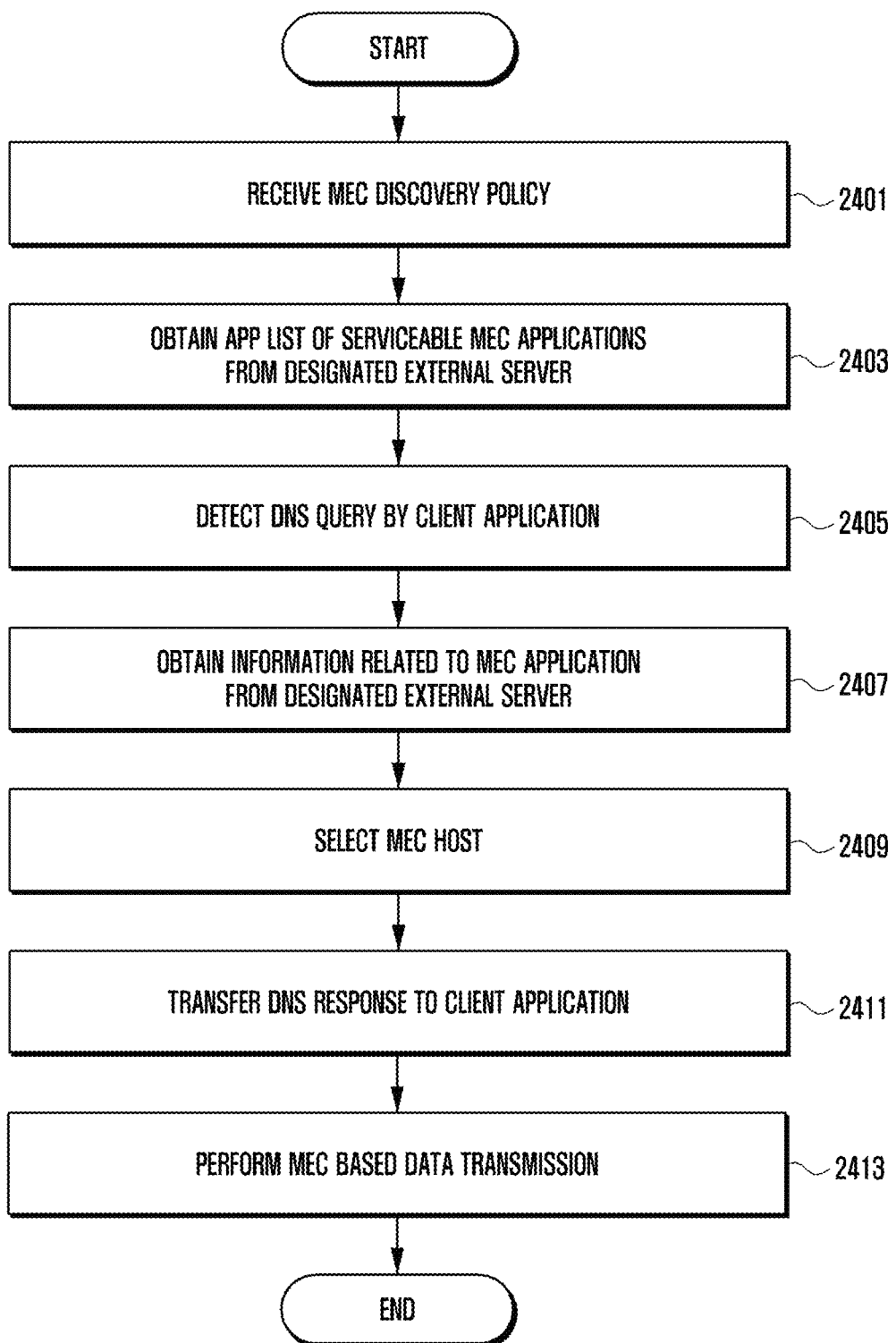
FIG. 24 is a flowchart illustrating an operation method of an electronic device for a discovery procedure according to various embodiments.

FIG. 24 is a flowchart illustrating an operation method of an electronic device 101 for a discovery procedure according to various embodiments.

With reference to FIG. 24, at operation 2401, the processor 120 (or MEC service module 410 of FIG. 4) of the electronic device 101 may receive a MEC discovery policy. According to an embodiment, the MSA 520 of the electronic device 101 may set the MEC discovery policy to the MSE 530. For example, the MSE 530 of the electronic device 101 may receive the MEC discovery policy from the MSA 520 through the MSE API. According to an embodiment, the MEC discovery policy may include at least one of information (or parameters) as described above with reference to Table 1.

At operation 2403, the processor 120 may obtain an App list of the serviceable MEC application from the designated external server (e.g., MMP server 430). According to an embodiment, the MSE 530 of the electronic device 101 may perform an obtaining procedure (e.g., MEC Application Lookup) for obtaining the App list based on the MEC discovery policy received from the MSA 520. According to an embodiment, the MSE 530 may request and receive the App list related to the serviceable MEC application from the MMP server 430 in accordance with the MEC discovery policy.

At operation 2405, the processor 120 may detect and hook a DNS query generated by the client application 510. According to an embodiment, the client application 510 of the electronic device 101 may transfer a message (e.g., DNS query message) for the DNS query to the MSE 530. According to an embodiment, the DNS query may be generated by the client application 510, and in general, it may be transferred to the DNS server 2320, and thus the DNS server 2320 may provide a response to the DNS query. According to various embodiments, the DNS query may be detected by the MSE 530 (e.g., DHL 535). For example, if the DNS query is generated by the client application 510, the MSE 530 may detect and hook the generated DNS query before the DNS query is transferred to the DNS server 2320, perform an operation 2407 (e.g., context create) to be described later and an operation 2409 (e.g., DNS resolving) to be described later, and then transfer a DNS response to the client application 510.

At operation 2407, if a DNS query message is generated by the client application 510, the processor 120 may obtain information related to the MEC application intended to be accessed in association with the client application 510 from the designated external server (e.g., MMP server 430). The information related to the MEC application may include, for example, at least one of the URI for the MEC application name (e.g., MEC App Name), dedicated DNN information, or the MEC application package URI (e.g., if there is not the MEC application). According to an embodiment, the MSE 530 of the electronic device 101 may perform an application context create operation with the MMP server in response to the DNS query. According to an embodiment, if the DNS query (with FQDN) message is generated by the client application 510, the MSE 530 may perform application context create for the corresponding MEC application.

At operation 2409, the processor 120 may select the MEC host based on the obtained information. According to an embodiment, the MSE 530 of the electronic device 101 may perform a host selection procedure (e.g., MEC host selection) for selecting the MEC host with the DNS server 2320. According to an embodiment, the hose selection procedure may be determined using predetermined information and/or information inquired to the DNS server 2320, or a specific MEC host may be selected (or configured) by the information inquired to the DNS server and/or inquired to the user.

At operation 2411, after selecting the MEC host, the processor 120 may transfer a DNS response to the client application. According to an embodiment, the MSE 530 of the electronic device 101 may provide the information obtained through the above-described procedures to the client application 510 as the DNS response. According to an embodiment, after selecting the MEC host, the MSE 530 may transfer the DNS response corresponding to the DNS query to the client application 510 having provided the DNS query.

At operation 2413, the processor 120 may perform data transmission with the selected MEC host. For example, the client application 510 may perform data transmission on an application layer with the MEC application installed in the MEC system (e.g., MEC server) 405.

Figure 25:
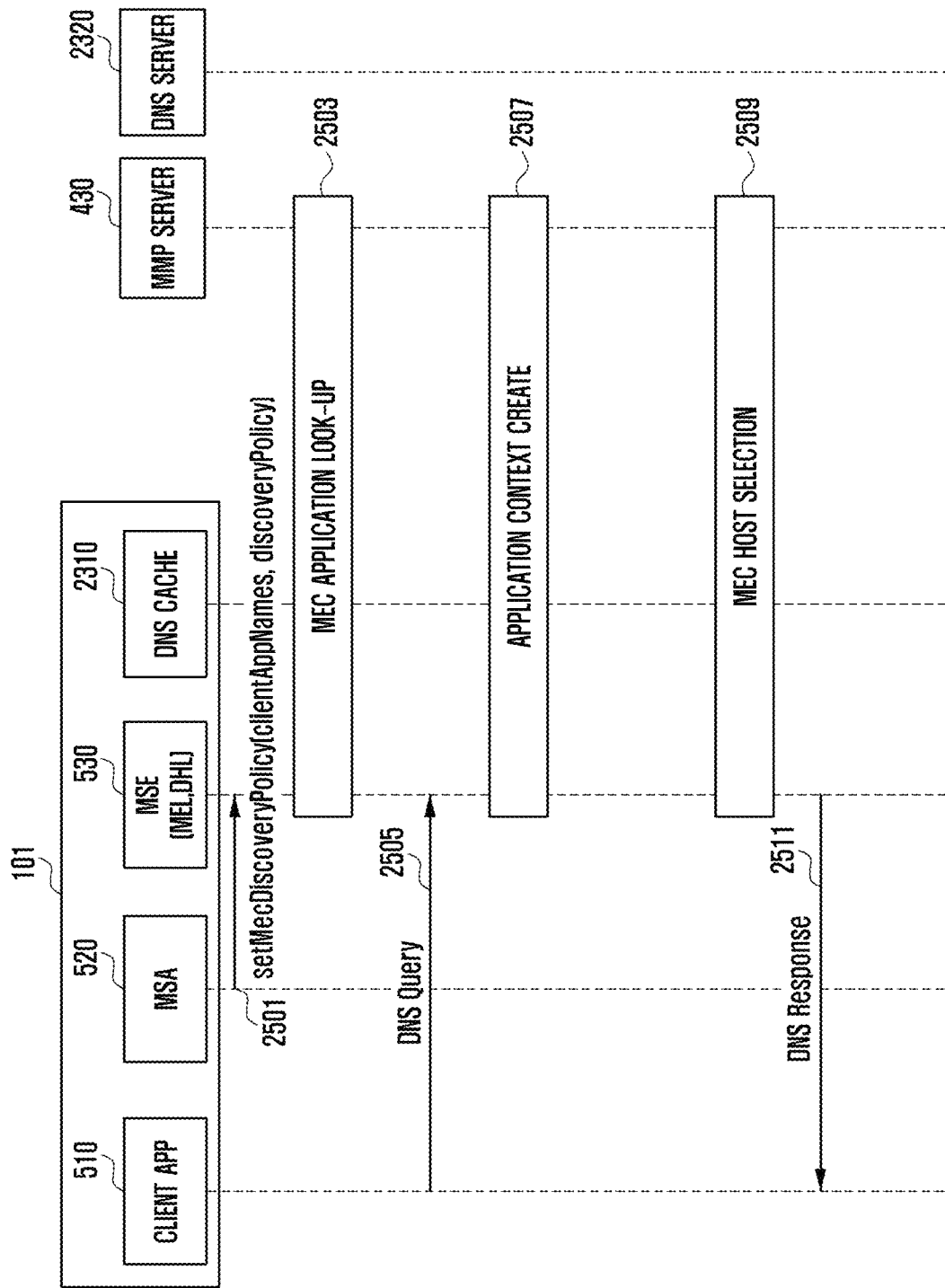
FIG. 25 is a diagram illustrating an example of a discovery procedure according to various embodiments.

FIG. 25 is a diagram illustrating an example of a discovery procedure according to various embodiments.

As illustrated, FIG. 25 may show an example of a DNS query based MEC discovery procedure. According to an embodiment, the electronic device 101 may include a client application (or client App) 510, an MSA (or service agent) 520, an MSE (or service enabler) 530 (e.g., including MEL 531 and UHL 533), and a DNS cache 2310.

With reference to FIG. 25, at operation 2501, the MSA 520 of the electronic device 101 may set a MEC discovery policy to the MSE 530. According to an embodiment, the MEC discovery policy may include a client application name (e.g., clientAppNames) and the discovery policy (e.g., discoveryPolicy). According to an embodiment, the discoveryPolicy may include whether to use a dynamic DNN (e.g., dynamicDnn), and may include at least one piece of information denoted in Table 1, such as location (e.g., locationInfo), device type (e.g., deviceType), service type (e.g., serviceType), or context type (e.g., contextType). According to an embodiment, the MSA 520 may include the location (e.g., locationInfo), device type (e.g., deviceType), and service type (e.g., serviceType) in the discoveryPolicy, and may operate to receive only the App list matching the corresponding condition. According to an embodiment, the MSA 520 may include the context type (e.g., contextType) in the discoveryPolicy, and thus may include information on whether the application context is necessary. According to an embodiment, the MSA 520 may include a URI Request Flag in the discoveryPolicy, and if the URI of the MEC application is available, it may request to include the URI in the App list.

At operation 2503, the MSE 530 may perform an obtaining procedure (e.g., MEC Application Lookup) for obtaining the App list (e.g., AppList) based on the information (e.g., MEC discovery policy) received from the MSA 520. According to an embodiment, the obtaining procedure (e.g., MEC Application Lookup) for obtaining the App list may start in accordance with the MEC discovery policy between the MSA 520 and the MSE 530. According to an embodiment, if the MEC discovery policy is received from the MSA 520 through the MSE API, the MSE 530 may activate the MEC Application Lookup, and if a specific condition (e.g., change of accessed base station cell ID during movement of the electronic device 101) of the electronic device 101 is satisfied, it may perform (or start) the MEC Application Lookup. According to an embodiment, the MSE 530 may request and receive the App list (e.g., MEC AppList) related to the serviceable MEC application (e.g., MEP App) from the MMP server 430 in accordance with the MEC discovery policy. According to an embodiment, the MSE 530 may request from the MMP server 430 by writing the MEC discovery policy in a MEC AppList request message Parameter as exemplified in Table 1, and the MMP server 430 may respond to the request from the MSE 530 by providing the serviceable App list (e.g., MEC AppList in Table 2) to match the MEC discovery policy to the MSE 530. The App list obtaining procedure (e.g., MEC Application Lookup) according to various embodiments will be described in detail with reference to the drawings to be described later.

At operation 2505, the client application 510 may transfer a message (e.g., DNS query message) for the DNS query to the MSE 530.

At operation 2507, the MSE 530 may perform an application context create operation with the MMP server 430 in response to the DNS query from the client application 510. According to an embodiment, the MSE 530 may perform the application context create for the corresponding NEC application (e.g., MEC App) if a DNS query (with FQDN) message is generated by the client application 510, or if FQDN for MEC is detected through FQDN filtering. According to an embodiment, the MSE 530 may request and receive the URI for the MEC application name (e.g., MEC App Name) intended to be accessed from the MMP server 430. According to an embodiment, if necessary, the MSE 530 may request and receive information about the dedicated DNN from the MMP server 430. According to an embodiment, if the corresponding MEC application is not provided, the MMP server 430 may transfer the MEC application package URI to the MSE 530. The application context create procedure according to various embodiments will be described in detail with reference to the drawings to be described later.

At operation 2509, the MSE 530 may perform a host selection procedure (e.g., MEC Host Selection) for selecting the MEC host with the DNS server 2320 in response to the DNS query from the client application 510. According to an embodiment, if at least two MEC hosts (e.g., MEC hosts 447 of FIG. 4) are obtained through the MMP server 430, the MSE 530 may perform a host selection procedure (e.g., MEC Host Selection) for selecting any one MEC host with the DNS server 2320. According to an embodiment, if two or more MEC hosts are provided, the host selection procedure for selecting one MEC host may be determined using predetermined information and/or information (e.g., IP address and location information for each IP) received through a request from the DNS server 2320, or a specific MEC host may be selected (or configured) through information received through the request from the DNS server 2320 and/or by the user through a user interface (UI) (e.g., selection button). According to an embodiment, if two or more MEC hosts are provided, information predetermined by the MSE 530 to configure a specific MEC host may include priority information. According to an embodiment, the priority information may include, for example, information of which the host priority is determined for each URI, or information of which the priority is determined for each corresponding IP address in case that a plurality of IP addresses exist as the result of DNS-resolving one URI. According to an embodiment, the host selection procedure may include a DNS resolving operation and a MEC host prioritization operation. According to an embodiment, the DNS resolving may include, for example, performing of the DNS resolving with respect to the FQDN for MEC through the MSE 530 itself regardless of the DNS query of the client application 510. According to an embodiment, the MEC host prioritization may include, for example, configuring of the IP priority in case that a plurality of IP addresses are received as a DNS query response. According to an embodiment, the priority may be predetermined for each URI or for each IP, and in case that a plurality of IP addresses are received, the IP priority may be dynamically determined according to the result of a performance text for each of the plurality of received IPs. The host selection procedure (e.g., MEC host selection) according to various embodiments will be described in detail with reference to the drawings to be described later.

At operation 2511, if the above-described procedures are completed, the MSE 530 may provide the information obtained through the above-described procedures to the client application 510 as the DNS response. According to an embodiment, after the MEC host selection (e.g., DNS resolving), the MSE 530 may transfer the DNS response corresponding to the DNS query to the client application 510 having provided the DNS query. The DNS response according to various embodiments will be described in detail with reference to the drawings to be described later.

Figure 26:
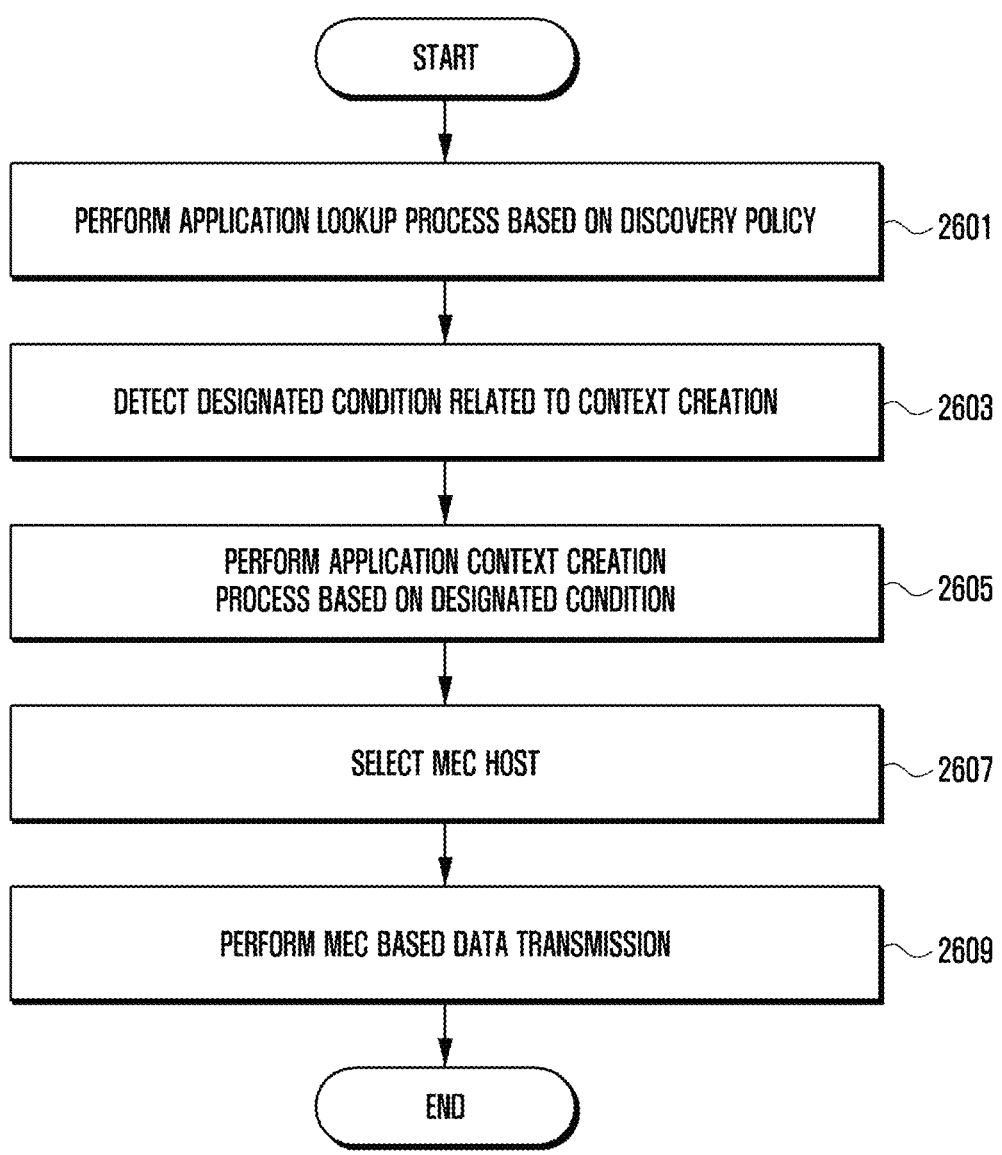
FIG. 26 is a flowchart illustrating an operation method of an electronic device for a discovery procedure according to various embodiments.

FIG. 26 is a flowchart illustrating an operation method of an electronic device 101 for a discovery procedure according to various embodiments.

According to various embodiments, operations illustrated in FIG. 26 may be performed, for example, by the electronic device 101 or a constituent element included in the electronic device 101 (e.g., processor 120 of FIG. 1 or MEC service module 410 of FIG. 4).

With reference to FIG. 4, at operation 2601, the electronic device 101 may perform an application lookup operation for obtaining information (e.g., App list) about MEC applications that can be provided by the MEC system 405 based on the discovery policy. According to an embodiment, the electronic device 101 may request the App list from the MMP server 430, and may obtain (or receive) the App list from the MMP server 430. According to an embodiment, the MSE 530 of the electronic device 101 may receive the MEC discovery policy from the MSA 520 through the MSE API, and based on the MEC discovery policy, it may obtain the App list of the serviceable MEC application through communication with the MMP server 430.

At operation 2603, the electronic device 101 may detect a designated condition related to context create. According to an embodiment, the designated condition may indicate a trigger for context creation. According to an embodiment, the trigger for context creation may include, for example, execution of the client application 510, request for context creation by the client application 510, or generation of a DNS query by the client application 510.

At operation 2605, the electronic device may perform an application context create operation for identifying the MEC host (e.g., edge server or MEC server) based on the designated condition. According to an embodiment, the electronic device 101 may obtain MEC application related information intended to be accessed in association with the client application 510 based on the App list from the MMP server 430. The MEC application related information may include, for example, at least one of a URL for a MEC application name (e.g., MEC App Name), dedicated DNN information, or MEC application package URI (e.g., in case that the MEC application is not provided).

According to an embodiment, Table 3 and Table 4 below may present examples of a context create request message (e.g., Table 3) and a context create response message (e.g., Table 4) being exchanged in a context create operation.

TABLE 3

| Name | Type | Cardinal | Description | ETSI MEC Compatible |
|---|---|---|---|---|
| contextId | String | 0 . . . 1 | Uniquely identifies the application context in the MEC system. Assigned by the MEC system and shall be present other than in a create request. The length of the value shall not exceed 32 characters. | Y |
| associateUeAppId | String | 1 | Uniquely identifies the device application. The length of the value shall not exceed 32 characters. | Y |
| callbackReference | URI | 0 . . . 1 | URI assigned by the device application to receive application lifecycle related notifications. Inclusion in the request implies the client supports the pub/sub-mechanism and is capable of receiving notifications. This endpoint shall be maintained for the lifetime of the application context. | Y |

TABLE 3-continued

| Name | Type | Cardinal | Description | ETSI MEC Compatible |
|---|---|---|---|---|
| appInfo | Structure (inlined) | 1 | — | Y |
| >appDId | String | 0 . . . 1 | Identifier of this MEC application descriptor. It is equivalent to the appDId defined in clause 6.2.1.2 of ETSI GS MEC 010-2 [1]. This attribute shall be globally unique. | Y |
| >appName | String | 1 | Name of the MEC application. The length of the value shall not exceed 32 characters. | Y |
| >appProvider | String | 1 | Provider of the MEC application. The length of the value shall not exceed 32 characters. | Y |
| >appSoftVersion | String | 0 . . . 1 | Software version of the MEC application. The length of the value shall not exceed 32 characters. | Y |
| >appDVersion | String | 1 | Identifies the version of the application descriptor. It is equivalent to the appDVersion defined in clause 6.2.1.2 of ETSI GS MEC 010-2 [1]. | Y |
| >appDescription | String | 0 . . . 1 | Human readable description of the MEC application (see note 2). | Y |
| >queriedURI | URI | 0 . . . 1 | It may be FQDN included in the DNS query of a client Application. | N |
| >appPackageSource | URI | 0 . . . 1 | URI of the application package. Included in the request if the application is not one in the ApplicationList. appPackageSource enables on-boarding of the application package into the MEC system. The application package shall comply with the definitions in clause 6.2.1.2 of ETSI GS MEC 010-2 [1]. This should be the MEC application package source. | Y |
| deviceLocation | String | 0 . . . 1 | Current location information of the user device | N |

NOTE 1:
If a value of the attribute is included in the request, the same value shall be included in the response.
NOTE 2:
The design of the current operation with callback reference assumes no web proxy between the entity that originates the notification and the entity that receives it.
NOTE 3:
The language support for the application description may be limited.

As exemplified in Table 3, the context create request message may include, for example, at least one of contextId, associatedUeAppId, app information, callbackReferenceURI, appPackageSource, or deviceLocation in addition to parameters defined in ETSI MEC standards. According to an embodiment, "contextId" may denote an ID for MEC application identification. According to an embodiment, "associatedUeAppId" may denote an ID for identifying the electronic device (e.g., user terminal) 101. According to an embodiment, "app information" may include, for example, appName, appVersion (e.g., appSoftVersion, appDVersion), appProvider, and appDescription. According to an embodiment, "callbackReferenceURI" may denote a callback address of the electronic device 101 for receiving a notification from the MMP server 430. According to an embodiment, "appPackageSource" may denote a download address of a MEC app package for supporting so that the MEC system 405 can download and install a corresponding application if the related MEC application does not exist on the MEC system 405. According to an embodiment, "deviceLocation" may denote location information of the electronic device 101 (e.g., for instantiation of the MEC application in the MEC host 447 neighboring the corresponding location. According to an embodiment, "deviceLocation" is to provide the location of the electronic device 101 at the context create time, and the MEC system 405 may perform context create of the MEC application in the adjacent MEC host 447 based on the location of the electronic device 101.

According to various embodiments, the context create request message may include "queriedURI". According to an embodiment, "queriedURI" may include a DNS-querried URI (FQDN) in the client application 510, and in this case, the context create response message may include corresponding app URI (referenceURI). According to an embodiment, referenceURI may include the FQDN or IP address for accessing the MEC application.

TABLE 4

| Name | Type | Cardinal | Description | ETSI MEC Compatible |
|---|---|---|---|---|
| contextId | String | 0 . . . 1 | Uniquely identifies the application context in the MEC system. Assigned by the MEC system and shall be present other than in a create request. The length of the value shall not exceed 32 characters. | Y |
| associateUeAppId | String | 1 | Uniquely identifies the device application. The length of the value shall not exceed 32 characters. | Y |
| callbackReference | URI | 0 . . . 1 | URI assigned by the device application to receive application lifecycle related notifications. Inclusion in the request implies the client supports the pub/sub mechanism and is capable of receiving notifications. This endpoint shall be maintained for the lifetime of the application context. | Y |

TABLE 4-continued

| Name | Type | Cardinal | Description | ETSI MEC Compatible |
|---|---|---|---|---|
| appInfo | Structure (inlined) | 1 | — | Y |
| >appDId | String | 0...1 | Identifier of this MEC application descriptor. It is equivalent to the appDId defined in clause 6.2.1.2 of ETSI GS MEC 010-2 [1]. This attribute shall be globally unique. | Y |
| >appName | String | 1 | Name of the MEC application. The length of the value shall not exceed 32 characters. | Y |
| >appProvider | String | 1 | Provider of the MEC application. The length of the value shall not exceed 32 characters. | Y |
| >appSoftVersion | String | 0...1 | Software version of the MEC application. The length of the value shall not exceed 32 characters. | Y |
| >appDVersion | String | 1 | Identifies the version of the application descriptor. It is equivalent to the appDVersion defined in clause 6.2.1.2 of ETSI GS MEC 010-2 [1]. | Y |
| >appDescription | String | 0...1 | Human readable description of the MEC application (see note 2). | Y |
| >referenceURI | URI | 0...1 | Address of the user application. It shall only be included in the response. | Y |
| >clientAppName | String | 0...N | Client app name that is allowed to connect to the MEC application. If the MEC application is open to all the client application, this field can be omitted. | N |
| >uriTTL | uint32 | 0...1 | Time-to-live of the reference URI | N |
| >uriLOC | String | 0...1 | Location (range) where the reference URI is available | N |
| >carpRule | Structure | 0...1 | Client App Routing Policy Rules | N |
| >>DNN | String | 0...1 | DNN selection for this application | N |
| >>S-NSSAI | String | 0...1 | Network slice selection for this application | N |
| >>accessType | String | 0...1 | Preferred access type for this application (e.g., 4G, 5G, WiFi, etc.) | N |
| >>sessionType | String | 0...1 | Ipv4, ipv6, etc. | N |
| >>mptcp | Boolean | 0...1 | Indicates whether to use MPTCP for the matching application | N |

NOTE 1:
If a value of the attribute is included in the request, the same value shall be included in the response.
NOTE 2:
The design of the current operation with callback reference assumes no web proxy between the entity that originates the notification and the entity that receives it.
NOTE 3:
The language support for the application description may be limited.

As exemplified in Table 4, the context create response message according to various embodiments may include, for example, at least one of App information, clientAppName, referenceURI, uriTTL, uriLOC, or CARP rule in addition to parameters defined in ETSI MEC standards. According to an embodiment, "app information" may include appName, appProvider, appVersion (e.g., appSoftVersion, appDVersion), or appDescription. According to an embodiment, "app information" and "clientAppName" may denote a client App list permitted to access the MEC application. According to an embodiment, "referenceURI" may denote a MEC application access address. According to an embodiment, "uriTTL" may denote a MEC application access address available time. According to an embodiment, "uriLOC" may denote MEC application accessible area information. According to an embodiment, "CARP rule" may denote path information, such as DNN, for accessing the corresponding application.

At operation 2607, the electronic device 101 may perform a MEC host selection operation for selecting the MEC host. According to an embodiment, the electronic device 101 may select an optimum MEC host through a MEC host selection operation with the DNS server 2320 based on information related to the obtained MEC application. According to an embodiment, the optimum MEC host may be selected based on at least one of a MEC host location and user's current location, user movement (or motion) speed, or MEC host performance (e.g., round trip time (RTT) or throughput). For example, the electronic device 101 may select a MEC host which is located closest to the electronic device 101, which has an optimum performance through prior performance measurement (or test) (e.g., ping probing or bandwidth estimation), or which includes the optimum MEC application matching (or requesting) the client application 510.

At operation 2609, the electronic device 101 may perform the data transmission with the selected MEC host. For example, the electronic device 101 may perform the data transmission on an application layer with the client application 510 and the MEC application installed in the selected MEC host.

Figure 27:
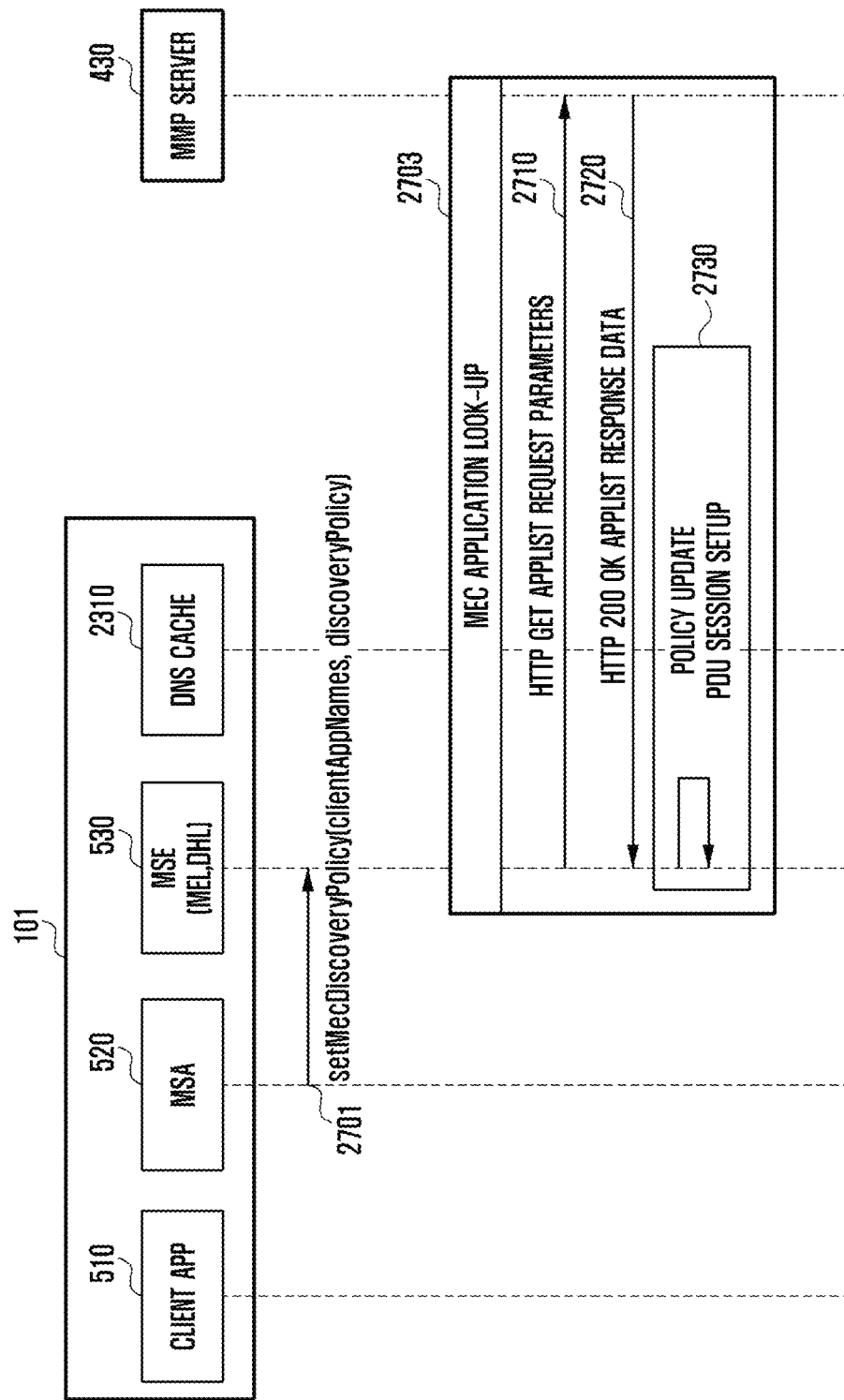
FIG. 27 is a diagram illustrating an operation example in which a discovery procedure obtains an App list according to various embodiments.

FIG. 27 is a diagram illustrating an operation example in which a discovery procedure obtains an App list according to various embodiments.

As illustrated, FIG. 27 may show an operation example of App list creation and obtaining (e.g., MEC application lookup) by the MEC discovery procedure according to an embodiment.

With reference to FIG. 27, at operation 2701, the MSA 520 of the electronic device 101 may transfer the MEC discovery policy to the MSE 530. According to an embodiment, the MEC service module 410 may obtain the MEC discovery policy using the MSA 520, and may perform the discovery procedure based on the MEC discovery policy received using the MSE 530. According to an embodiment, the MEC discovery policy may include at least one of client application name (e.g., clientAppNames), location (e.g., locationInfo), device type (e.g., deviceType), service type (e.g., serviceType), context type (e.g., contextType), URI request flag (e.g., URI Request), or dynamic DNN (e.g., dynamicDnn). According to an embodiment, the discovery policy may include at least one piece of information as described above with reference to Table 1.

At operation 2703, the MSE 530 may perform a procedure (e.g., MEC application lookup) for obtaining the App list (e.g., AppList) based on the information (e.g., MEC discovery policy) received from the MSA 520. According to an embodiment, the operation of obtaining the App list may start in accordance with the MEC discovery policy setup between the MSA 520 and the MSE 530. According to an embodiment, the App list obtaining procedure may be activated when the MSA 520 calls the MEC discovery policy API, and the MSE 530 may request and receive the MEC App list and/or URI corresponding to the MEC discovery policy from the MMP server 430. According to an embodiment, the App list obtaining procedure may include operation 2710, operation 2720, and operation 2730.

At operation 2710, the MSE 530 may transmit a request message (e.g., HTTP Get AppList Request Parameters) for requesting the App list to the MMP server 430. According to an embodiment, the MSE 530 may include (or write) the MEC discovery policy in the request message (e.g., HTTP Get AppList Request Parameters) to be provided to the MMP server 430. For example, the MSE 530 may include the App list request parameters as exemplified in Table 1 in the request message, and may provide the request message to the MMP server 430. For example, the request message may include at least one piece of information (or parameters) as described above with reference to Table 1.

According to an embodiment, field information that can be supported in a request parameter may be defined as MMP Info in an authorization response in an authentication (AA) stage. According to an embodiment, the parameter (or information) related to the App list request (e.g., AppList Request Parameters) may be included in a parameter field of the request message (e.g., HTTP GET). According to an embodiment, the App list request parameter may include at least one of an application name (e.g., clientAppNames) transferred from the MSA 520 (e.g., setMecDiscoveryPolicy (clientAppNames, discoveryPolicy) at operation 2701), accessed cell ID, tracking area (TA) ID, regional information (e.g., city, gu, dong, building, and the like), or location Info related to the location of the electronic device 101 including at least one piece of preferred location information designated by a user, device type capable of identifying the kind of the electronic device 101 (e.g., smartphone, tablet, wearable, IoT, car, or drone), service type capable of identifying the kind of service (e.g., game, V2X, AR/VR, LBO, enterprise, or web), context type capable of identifying whether the context information is necessary (e.g., whether context information of a user or an application is necessary in driving the MEC application), or a flag (e.g., URI request flag) requesting that the corresponding URI is included in a response if the URI of the MEC application is available. According to an embodiment, the context type is information for identifying the service application type of the electronic device 101, and it may include, for example, at least one of an application (e.g., specific launcher or designated application) installed in the electronic device 101, executed application name, or domain.

According to an embodiment, in the procedure of requesting the App list, the electronic device 101 may transfer application information (e.g., specific launcher or designated application) installed in the electronic device 101 to the MMP server 430. According to an embodiment, if there is a change (e.g., update) of the application information installed in the electronic device 101, the electronic device 101 may transfer the application information installed in the electronic device 101 in the procedure of requesting the App list from the MMP server 430.

At operation 2720, the MMP server 430 may provide a response message (e.g., HTTP 200 OK AppList response Data) including the App list (e.g., MEC AppList) to the MSE 530 as a response corresponding to the request message received from the MSE 530. According to an embodiment, the MMP server 430 may search for the MEC application based on the received client application name, and may include the App list including the searched MEC application in the response message to be provided to the MSE 530.

According to an embodiment, data (or information) (e.g., AppList Response Data) related to the App list response may be included in a message body of the response message (e.g., HTTP 200 OK). The response message may include at least one piece of information as described above with reference to Table 2.

According to an embodiment, when providing the App list, the MMP server 430 may provide a serviceable MEC App List based on at least one of the whole available MEC App List or request parameters. According to an embodiment, accessible MEC App Name for each client App may be included, and may be used (or necessary) in an application context create operation thereafter.

According to an embodiment, if the operator's location API is available, the MMP server 430 may include a notification in the App list to be provided. According to an embodiment, if the URI request flag is true in the request message, and the corresponding MEC App is being executed in the available MEC host neighboring the electronic device (e.g., user terminal) 101, the MMP server 430 may include the URI of the corresponding MEC App in the App list to be provided. According to an embodiment, even in case that there is not a URI request flag in the request message, and the corresponding MEC App is being executed in the MEC host, the MMP server 430 may include the URI of the corresponding MEC App in the App list to be provided. According to an embodiment, if the App list request is received from the electronic device 101, the MMP server 430 may include the corresponding URI in the App list to be provided after driving the MEC App in case that the MEC App can be directly driven in accordance with the context type in the request message. According to an embodiment, the MMP server 430 may further include URI validity period/validity location information in the App list to be provided. According to an embodiment, the URI validity period information may be determined by the electronic device 101, or may be variably determined by the MMP server 430 in accordance with the MEC App driving state. According to an embodiment, if a dedicated DNN rule for each application exists, the MMP server 430 may provide the corresponding rule.

According to an embodiment, the URI included in the App list may be discriminated through hyperlink and/or highlight, and the electronic device 101 may discriminatingly display them based on the MEC App that does not include the URI and hyperlink and/or highlight in the App list. According to another embodiment, the electronic device 101 may display the MEC App including the URI and the MEC App that does not include the URI in the same manner without discriminating them from each other in the App list. According to an embodiment, the electronic device 101 may include a serviceable location for each application and/or time information in the App list to be provided.

According to an embodiment, if the DNN configuration is possible in the unit of an application in the procedure of responding to the App list, the MMP server 430 may not include the usage DNN information for each application (or for each App) in the App list. According to an embodiment, the corresponding DNN server may be a DNN included in the DNN list received in an authentication (AA) procedure.

According to an embodiment, the electronic device 101 may request the App list from the MMP server 430, and in the procedure of receiving the corresponding response, it may obtain (or receive) information (e.g., URI) about the App list and the MEC host (e.g., edge server or MEC server) for the corresponding application(s) of the App list. According to an embodiment, if the information (e.g., URI) about the MEC host is not received, the electronic device 101 may obtain the information (e.g., URI) of the MEC host for the corresponding application from an external server by further performing, for example, the application context create procedure with respect to the corresponding App. According to an embodiment, if the information (e.g., URI) about the MEC host is received, the electronic device 101 may directly access the corresponding MEC host (e.g., using the URI) without performing the application context create procedure with respect to the corresponding application.

According to an embodiment, the electronic device 101 may request the App list from the MMP server 430, and in the procedure of receiving the corresponding response, it may receive information (e.g., DNN) about the App list and the designated networking path for the corresponding application(s) of the App list. According to an embodiment, if the information (e.g., DNN) about the designated networking path is received, the electronic device 101 may perform the procedure of configuring the network and the designated networking path. According to an embodiment, the electronic device 101 may configure the DNN path so as to communicate with only the applications having received the DNN information on the designated (or dedicated) DNN. According to an embodiment, in the procedure of requesting context create from the MEC host (e.g., application context create), the electronic device 101 may configure the designated DNN path with respect to the applications having received the DNN information.

At operation 2730, the MSA 530 may perform the policy update. According to an embodiment, in the operation 2703 of obtaining the App list, the MSE 530 may include additional (or selective) policy update operation. According to an embodiment, if the dedicated PDU session is necessary (or if a new dedicated DNN rule is set), the MSE 530 may receive the URSP rule (e.g., DNN), and may set and use a separate PDU session for each application or for each URI in accordance with the URSP rule. For example, the URSP rule (or CARP rule) may be received as the result of the authentication procedure (e.g., the MSA 520 receives and transfers the result to the MSE 530), or may be received by the MSE 530 as the result of an application lookup (e.g., App lookup) or the result of context create, and if a new DNN rule is set in the URSP rule, the PDU session setup may be performed. According to an embodiment, if the MSE 530 requests the PDU session setup (e.g., PDU session establishment of FIG. 17 and PDU session release of FIG. 18) from the modem 1700 as described above with reference to FIG. 17 or FIG. 18, the modem 1700 may establish/release the PDU session setup by requesting from the SMF of a 5G network (or core network).

Figure 28:
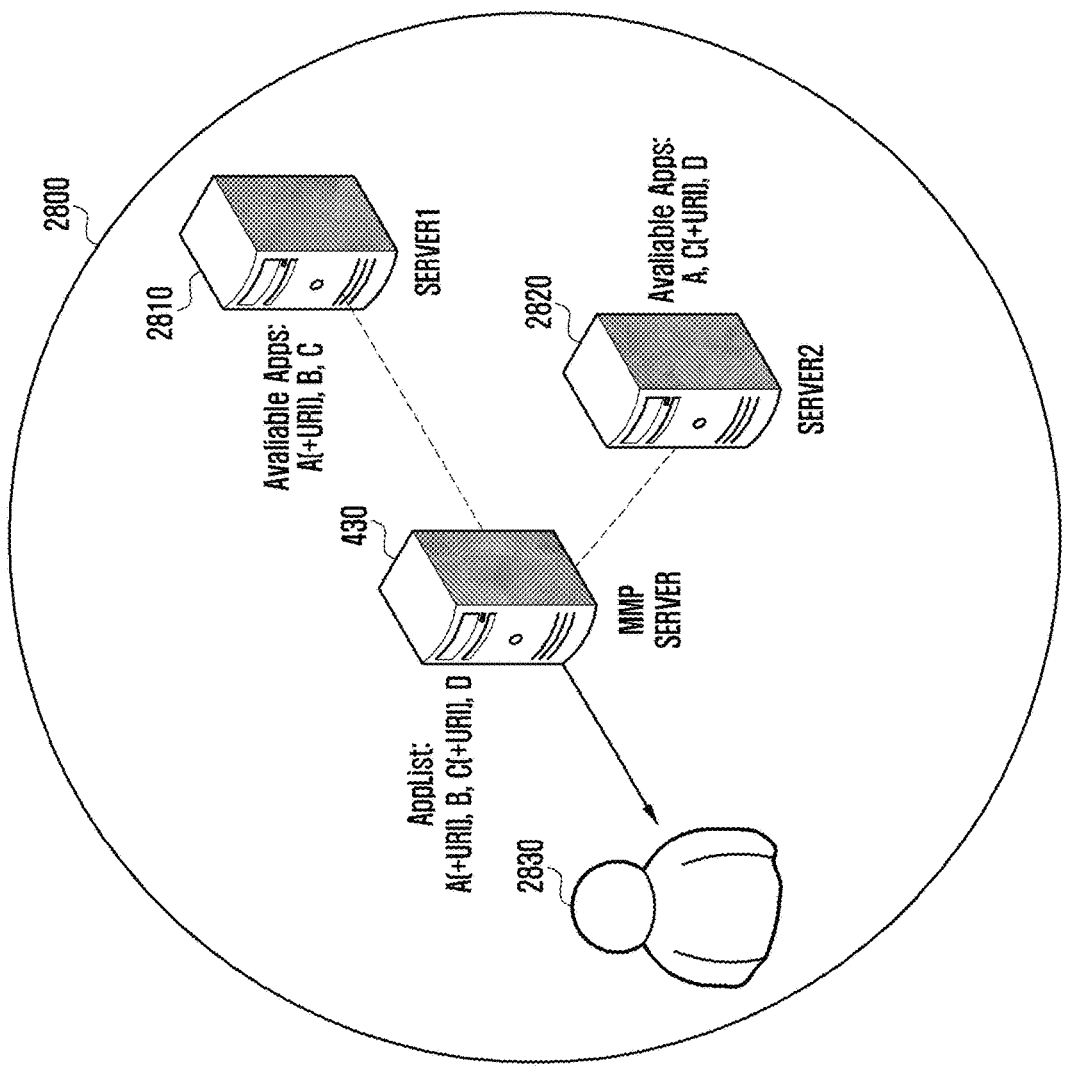
FIG. 28 is a diagram explaining an example for providing an App list according to various embodiments.

FIG. 28 is a diagram explaining an example for providing an App list according to various embodiments.

As illustrated, FIG. 28 may exemplify a location based service area.

With reference to FIG. 28, according to an embodiment, it may be assumed that the MMP server 430 obtains first information (e.g., A(+URI), B, C) for available applications (available Apps) from a first server (server 1) 2810 (or first MEC host adjacent to a user) (e.g., MEC host 447 of FIG. 4). According to an embodiment, it may be assumed that the MMP server 430 obtains second information (e.g., A(+URI), C(+URI), D) for the available applications from a second server (server 2) 2820 (or second MEC host adjacent to the user) (e.g., MEC host 447 of FIG. 4).

According to various embodiments, the MMP server 430 may create (or obtain), for example, information of A(+URI), B, C(+URI), D by combining information for respective applications (e.g., first information and second information) obtained from the first server 2810 and the second server 2820. According to an embodiment, the MMP server 430 may create the App list including A(+URI), B, C(+URI), and D created from the first server 2810 and the second server 2820, and may provide the generated App list to a user 2830 (e.g., electronic device 101).

Figure 29:
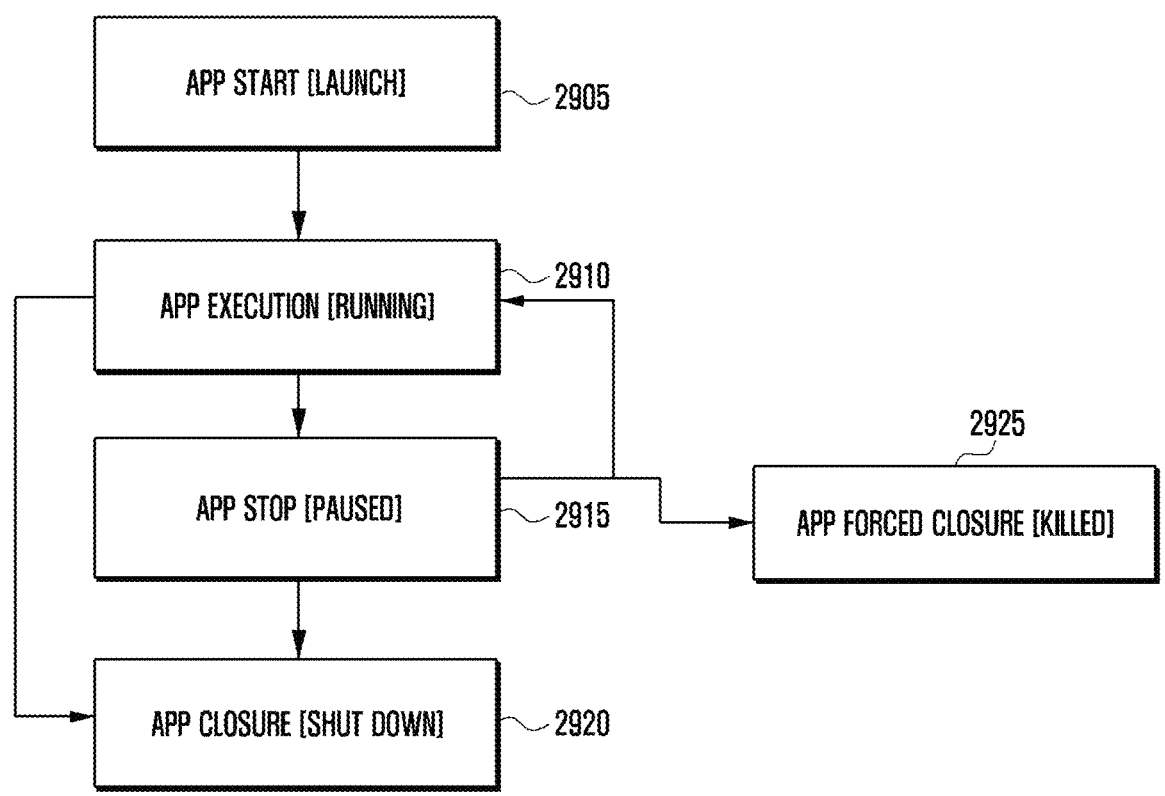
FIG. 29 is a diagram illustrating a lifecycle of an application according to various embodiments.

FIG. 29 is a diagram illustrating a lifecycle 2900 of an application according to various embodiments.

According to various embodiments, the state of the application installed in the electronic device 101 may be changed by a user input or instructions of a processor (e.g., processor 120 of FIG. 1).

With reference to FIG. 29, the lifecycle 2900 of an application (e.g., client application 510) may mean, for example, a series of cycles in which the state of the application is changed to a launch state 2905, a running state 2910, a pause state 2915, a shut-down state 2920, or a killed state 2925.

According to an embodiment, the application installed in the electronic device 101 may be in a launch state by a user input or under a predetermined condition. The application may be in a running state (or a foreground state) where a screen related to the application is shown to a user, or may be in a pause state (or a background state) where the screen related to the application is not shown to the user although the application is being executed by the processor 120 (e.g., application processor (AP)) of the electronic device 101. Further, the application may be in a shut-down state in response to the user input, or may be in a killed state due to lack of a memory.

According to an embodiment, because the MEC system 405 performs MEC based data transmission in accordance with the state of the application, the MEC system 405 may waste resources if a lifecycle is not synchronized. According to an embodiment, the MSE 530 may notify the MMP server 430 whether to use applications 310-1, 310-2, and the like. According to an embodiment, only in case that the applications 310-1, 310-2, and the like are in use, the MEC applications (e.g., 460-1, 460-2, and the like) operate (e.g., data transmission), and in case that the applications 310-1, 310-2, and the like are not in use (e.g., in case that at least one of screen off, client application background state change, or user movement speed having a predetermined level or more is satisfied), the MEC applications (e.g., 460-1, 460-2, and the like) may stop their operations (e.g., data transmission). According to an embodiment, because the MSE 530 notifies the MMP server 430 whether to use the applications 310-1, 310-2, and the like as described above, it is possible to efficiently manage the resource of the MEC host 447 (or edge server 305). According to an embodiment, with respect to the unused application, the resource allocation of the MEC application is released, and thus the resource consumption of the MEC host 447 can be reduced. According to various embodiments, the MEC service module 410 (e.g., MSE 530) may monitor, in real time, the lifecycles of the applications (e.g., client applications (e.g., 310-1, 310-2, and the like) and the MEC applications (e.g., 460-1, 460-2, and the like) of the MEC host 447, and may notify the MEC system 505 (e.g., MMP server 430 (or LCM proxy server)) of the monitored lifecycles, thereby reducing unnecessary resource consumption.

According to an embodiment, applications requiring lifecycle synchronization and applications not requiring the lifecycle synchronization may be present among a plurality of applications. For example, in case of an application related to video surveillance, because an MEC application (e.g., 460-1 or 460-2) included in the MEC system 405 analyzes image data obtained by a camera module (e.g., camera module 180 of FIG. 1) of the electronic device 101, and it transmits the result of the analysis only at the request from the electronic device 101, the lifecycle synchronization between the electronic device 101 and the MEC application may not be required. As another example, in case of an augmented reality (AR) application, because the MEC application analyzes an image obtained by the camera module 180 in real time, and it provides the electronic device 101 with a service related to the analyzed image, the lifecycle synchronization between the electronic device 101 and the MEC application may be required.

According to an embodiment, if the lifecycle of the application 310-1 or 310-2 is changed, the MEC service module 410 (e.g., MSE 530) may request the change of the lifecycle from the MEC system 405. For example, the MEC service module 410 may request at least one of context create, context delete, suspend, or resume of the MEC application.

Figure 30:
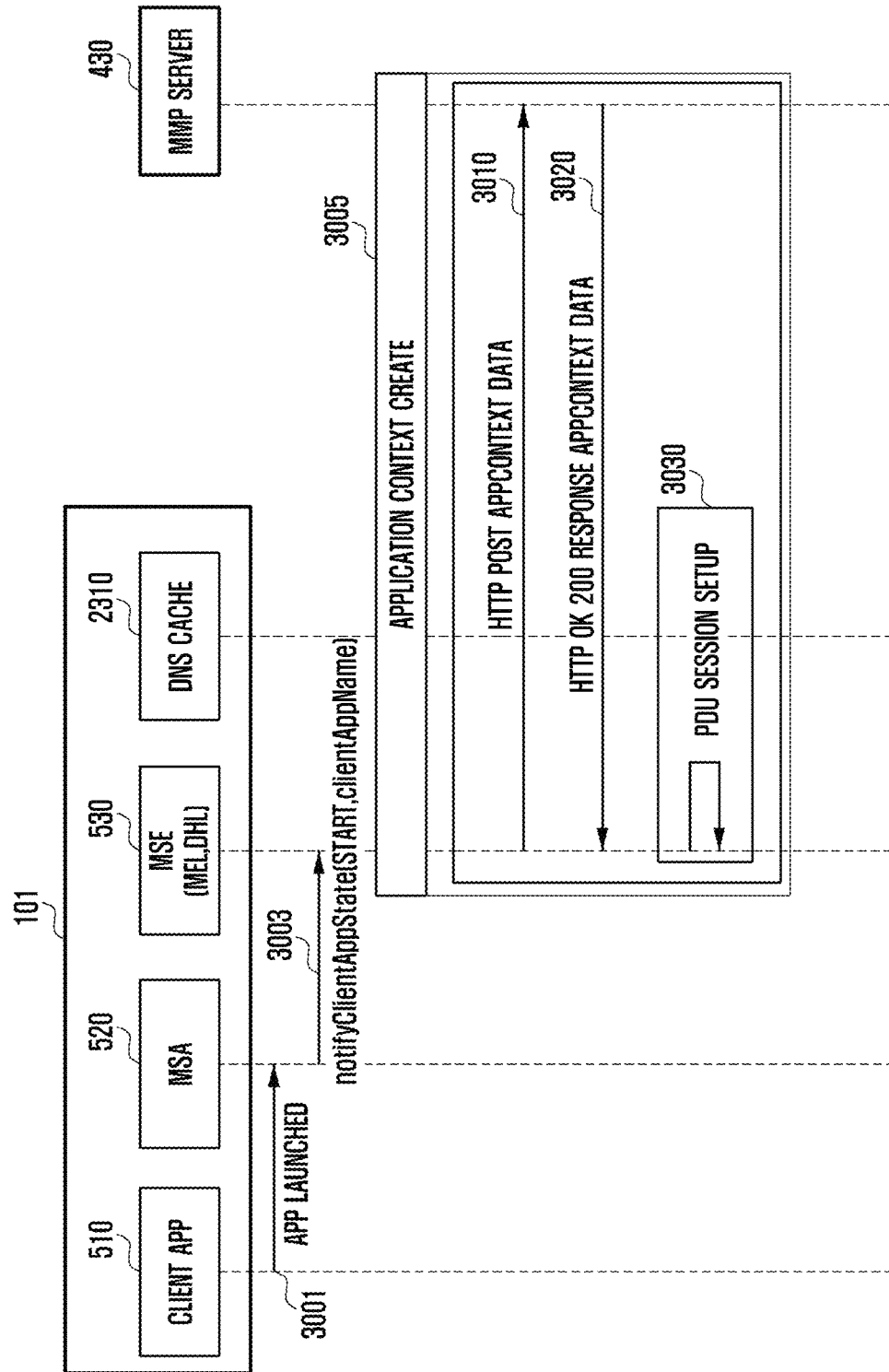
FIG. 30 is a diagram illustrating an example of a context create operation in a discovery procedure according to various embodiments.

FIG. 30 is a diagram illustrating an example of a procedure in which a discovery procedure creates a context according to various embodiments.

As illustrated, FIG. 30 shows an operation example of application context create by a MEC discovery procedure according to an embodiment. According to an embodiment, in case that the client application 510 is executed, an application context create procedure may be performed in a manner that the MSA 520 transfers application start information to the MSE 530 through the MSE API together with information related to the corresponding client application (e.g., package name or UID). According to various embodiments, the application context create may be launched by the application on the App list (first case), the application may request the context create (e.g., context create API call) through the MSE API (second case), or the application context create may be performed if the name and/or URI (e.g., FQDN) of the application during transmission of the DNS query match the name and/or URI of the application included in the pre-received App list (third case). According to an embodiment, the application context create may be performed, for example, if location information transferred through the MEC discovery policy (e.g., setDiscoveryPolicy (discoveryPolicy)) or an available location (e.g., uriLOC) for each application included in the App list transferred through an application lookup response matches the location of the current user (or electronic device 101) (fourth case).

According to various embodiments, if at least one of conditions according to the first to fourth cases is satisfied, the application context create may be performed. FIG. 30 may show an operation example in which the application context create is performed in accordance with the first case.

With reference to FIG. 30, at operation 3001, if a specific client application 510 is launched, the corresponding client application 510 may provide information (e.g., App Launched) notifying of the launching of the application to the MSA 520. According to an embodiment, operation 3001 may not be performed. For example, if the client application 510 is launched, the MSA 520 itself (e.g., framework level) may detect the launching of the client application 510 without notifying of the launching of the client application 510.

At operation 3003, if information (e.g., App Launched) notifying of the launching of the client application 510 is received, the MSA 520 may provide a notification message (e.g., notifyClientAppState) for notifying of the state of the client application 510 to the MSE 530. According to an embodiment, the notification message (e.g., notifyClientAppState) may include, for example, the state (e.g., START) of the client application and the name of the client application (e.g., clientAppName) (and/or UID) to be provided as, for example, notifyClientAppState (START, clientAppName).

At operation 3005, the MSE 530 may receive a notification message (e.g., notifyClientAppState) from the MSA 520, and may perform an application context create procedure based on the information of the received notification message. According to an embodiment, the application context create procedure (operation 3005) may include operation 3010, operation 3020, and operation 3030.

At operation 3010, the MSE 530 may transmit a request message (e.g., HTTP POST AppContext Data) for requesting the application context create to the MMP server 430. According to an embodiment, if the MEC application context create is necessary (e.g., if URI is not in the App list), the MSE 530 may transmit a request message for requesting the URI to the MMP server 430. According to an embodiment, if the MEC application is in the MMP server 430, the MSE 530 may include the MEC application name (MEC App Name) in the request message to be transmitted to the MMP server 430. According to another embodiment, if there is not the MEC application in the MMP server 430, the MSE 530 may include only URI (e.g., application package download URI (App package download URI)) that can download the corresponding MEC application in the request message to be transmitted to the MMP server 430.

At operation 3020, the MMP server 430 may provide a response message (e.g., HTTP OK 200 Response AppContext Data) including the URI of the MEC application to the MSE 530 as a response corresponding to the request message received from the MSE 530. According to an embodiment, the response message may include the URI (FQDN) of the corresponding application (e.g., MEC application). According to an embodiment, the response message may include information about the URI of the MEC application and validity period and/or validity location of the corresponding URI. According to an embodiment, if the validity period exceeds or the validity location is changed, the MSE 530 may re-perform the application context or may perform handover triggering. According to an embodiment, the response message may include DNN information.

At operation 3030, the MSE 530 may perform policy update. According to an embodiment, in the application context create procedure (operation 3005), the MSE 530 may include additional (or selective) policy update operation. According to an embodiment, if the dedicated PDU session is necessary (or a new dedicated DNN rule is set), the MSE 530 may receive the URSP rule (e.g., DNN), and may set the PDU session for each application or for each URI in accordance with the URSP rule. For example, the URSP rule (or CARP rule) may be received as the result of the authentication procedure (e.g., the MSA 520 receives and transfers the result to the MSE 530), or may be received by the MSE 530 as the result of the application lookup (e.g., App lookup) or the result of the context create, and if a new DNN rule is set in the URSP rule, the PDU session setup may be performed. According to an embodiment, if the MSE 530 requests the PDU session setup (e.g., PDU session establishment of FIG. 17 and PDU session release of FIG. 18) from the modem 1700 as described above with reference to FIG. 17 or FIG. 18, the modem 1700 may establish/release the PDU session setup by requesting from the SMF of a 5G network (or core network).

According to various embodiments, the application context create procedure (operation 3005) may be omitted, for example, if the MEC application to be accessed by the client application 510 has already been driven and the URI is received in the App list obtaining procedure (e.g., MEC application lookup).

Figure 31:
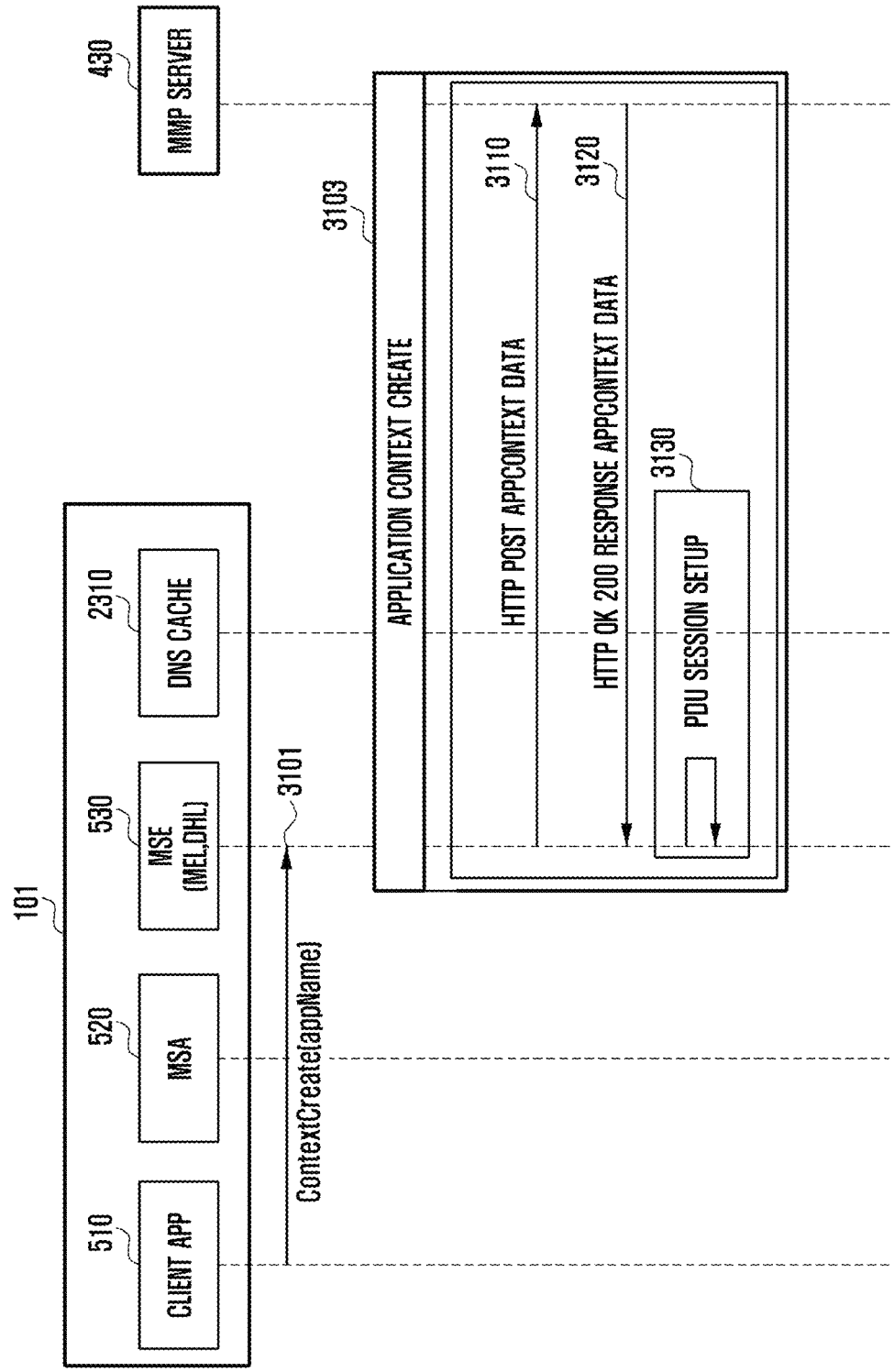
FIG. 31 is a diagram illustrating an example of a context create operation in a discovery procedure according to various embodiments.

FIG. 31 is a diagram illustrating an example of an operation in which a discovery procedure creates a context according to various embodiments.

As illustrated, FIG. 31 shows an operation example of application context create by a MEC discovery procedure according to an embodiment. According to an embodiment, an application context create operation may be performed, for example, in a manner that the client application 510 transfers a context create request to the MSE 530 through the MSE API. According to various embodiments, the application context create may be launched by the application on the App list (first case), the application may request the context create (e.g., context create API call) through the MSE API (second case), or the application context create may be performed if the name and/or URI (e.g., FQDN) of the application during transmission of the DNS query match the name and/or URI of the application included in the pre-received App list (third case). According to an embodiment, the application context create may be performed, for example, if location information transferred through the MEC discovery policy (e.g., setDiscoveryPolicy(discoveryPolicy)) or an available location (e.g., uriLOC) for each application included in the App list transferred through an application lookup response matches the location of the current user (or electronic device 101) (fourth case). According to various embodiments, if at least one of conditions according to the first to fourth cases is satisfied, the application context create may be performed. FIG. 31 may show an operation example in which the application context create is performed in accordance with the second case.

With reference to FIG. 31, at operation 3101, the client application 510 may transfer a message (e.g., contextCreate) for creating context to the MSE 530. According to an embodiment, if the context create is necessary, the client application 510 may transfer a context create request to the MSE 530 through the MSE API together with information related to the corresponding client application (e.g., application name (appName) or UID).

At operation 3103, the MSE 530 may receive a message for creating context from the client application 510, and may perform an application context create procedure based on the information of the received message (e.g., application name). According to an embodiment, the application context create procedure (operation 3103) may include operation 3110, operation 3120, and operation 3130. According to an embodiment, the application context create operation (operation 3103) may correspond to the above-described explanation with reference to operation 3010, operation 3020, and operation 3030 in accordance with the application context create operation at operation 3005 of FIG. 30.

Figure 32:
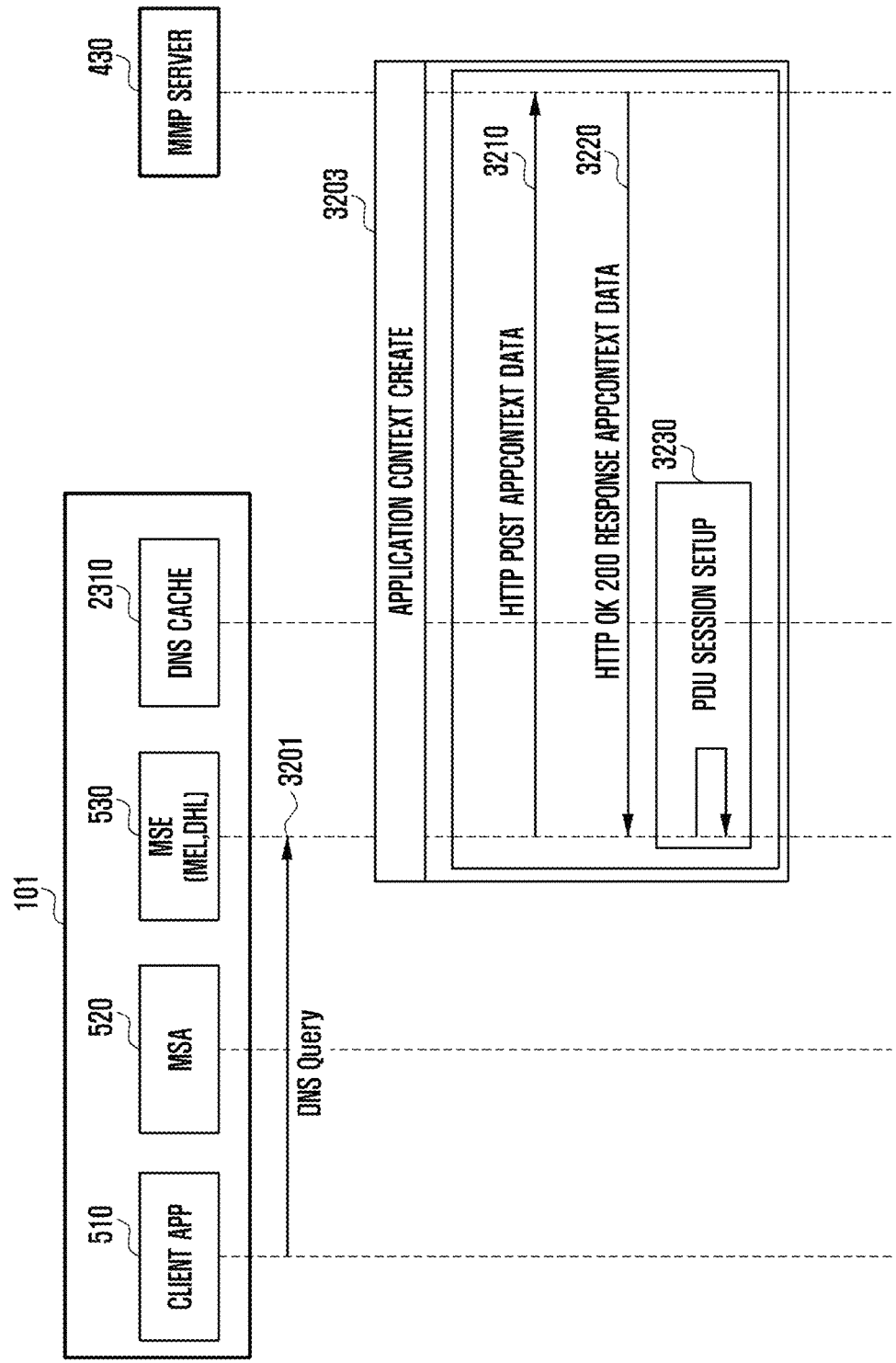
FIG. 32 is a diagram illustrating an example of a context create operation in a discovery procedure according to various embodiments.

FIG. 32 is a diagram illustrating an example of an operation in which a discovery procedure creates a context according to various embodiments.

As illustrated, FIG. 32 shows an operation example of application context create by a MEC discovery procedure according to an embodiment. According to an embodiment, an application context create operation may be performed, for example, in a manner that the client application 510 transfers a DNS query to the MSE 530. According to various embodiments, the application context create may be launched by the application on the App list (first case), the application may request the context create (e.g., context create API call) through the MSE API (second case), or the application context create may be performed if the name and/or URI (e.g., FQDN) of the application during transmission of the DNS query match the name and/or URI of the application included in the pre-received App list (third case). According to an embodiment, the application context create may be performed, for example, if location information transferred through the MEC discovery policy (e.g., setDiscoveryPolicy(discoveryPolicy)) or an available location (e.g., uriLOC) for each application included in the App list transferred through an application lookup response matches the location of the current user (or electronic device 101) (fourth case). According to various embodiments, if at least one of conditions according to the first to fourth cases is satisfied, the application context create may be performed. FIG. 32 may show an operation example in which the application context create is performed in accordance with the third case.

With reference to FIG. 32, at operation 3201, the client application 510 may transfer a message (e.g., DNS Query) for DNS query to the MSE 530.

At operation 3203, the MSE 530 may receive the DNS query from the client application 510, and if the DNS query matches the application or URI included in the pre-received App list, the MSE 530 may perform an application context create operation. According to an embodiment, the application context create operation (operation 3203) may include operation 3210, operation 3220, and operation 3230. According to an embodiment, the application context create operation at operation 3203 may correspond to the above-described explanation with reference to operation 3010, operation 3020, and operation 3030 in accordance with the application context create operation at operation 3005 of FIG. 30.

In various embodiments, although not illustrated, the application context create operation according to various embodiments may be performed, for example, even in case that an available location (e.g., uriLOC) for each application included in the location information transferred through the MEC discovery policy (e.g., setDiscoveryPolicy (discoveryPolicy)) or the App list transferred through the application lookup response matches the location of the current user (or electronic device 101).

Figure 33:
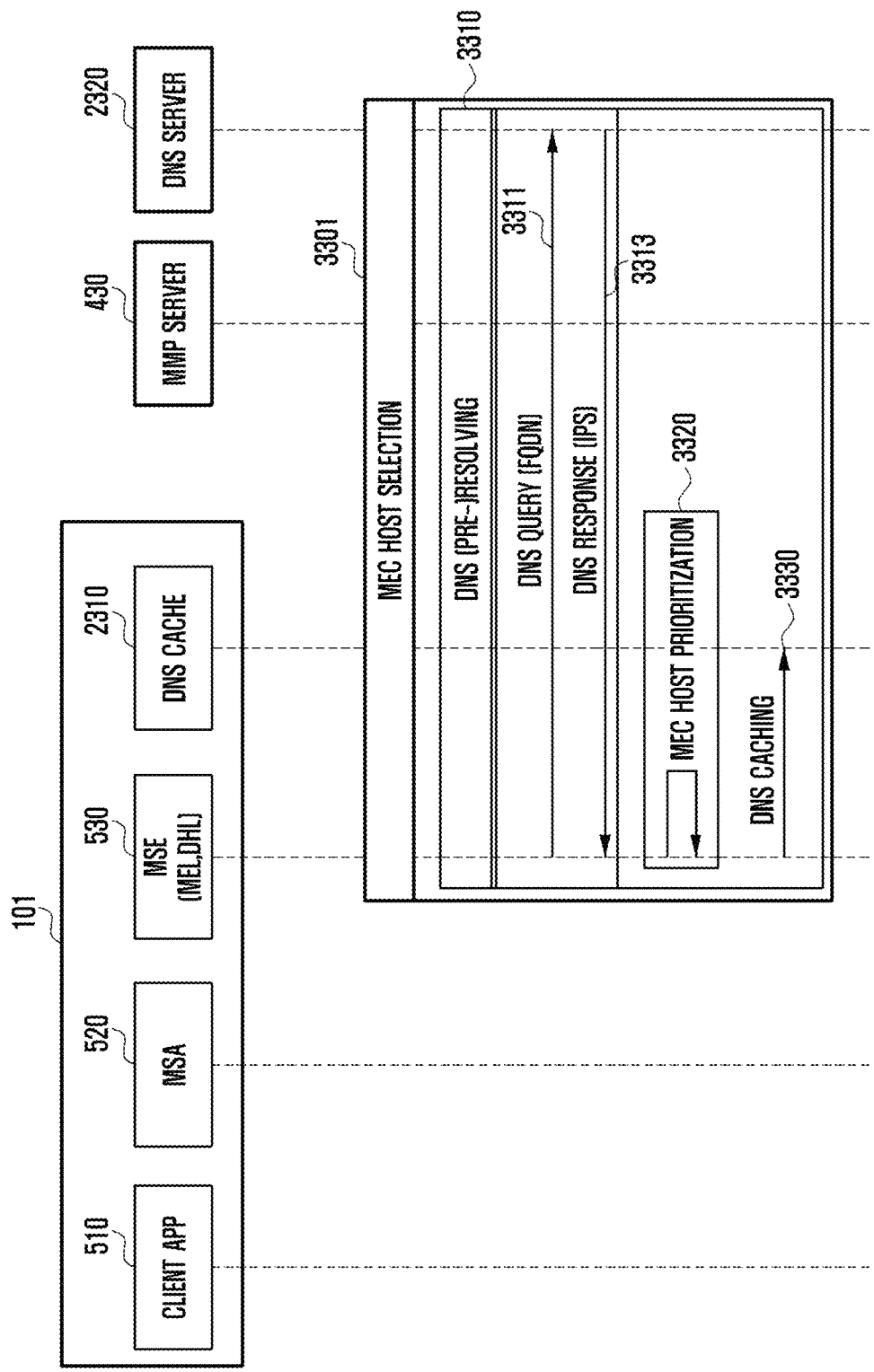
FIG. 33 is a diagram illustrating an example of a MEC host selection operation in a discovery procedure according to various embodiments.

FIG. 33 is a diagram illustrating an example of a procedure in which a discovery procedure selects a MEC host according to various embodiments.

As illustrated, FIG. 33 may show a MEC host selection operation 3301 in which the MSE 530 selects the DNS server 2320 and the MEC host. According to an embodiment, the MEC host selection operation (operation 3301) may include a DNS (pre)resolving operation (e.g., operation 3310), a MEC host prioritization operation (e.g., operation 3320), and a DNS caching operation (e.g., operation 3330).

With reference to FIG. 33, at operation 3310, the MSE 530 may perform DNS resolving (or pre-resolving). According to an embodiment, the DNS resolving may be performed, for example, in a manner that the MSE 530 itself performs the DNS resolving with respect to the FQDN for MEC regardless of the DNS query of the client application 510. According to an embodiment, the DNS resolving (operation 3310) may include operation 3311 and operation 3313.

According to an embodiment, at operation 3311, the MSE 530 may perform the DNS resolving operation by DHL 535. According to an embodiment, the MSE 530 may transmit the DNS query to the DNS server 2320 through URI (FQDN) for the MEC application.

According to an embodiment, at operation 3313, the DNS server 2320 may receive the DNS query from the MSE 530, and as a response corresponding to the DNS query, the DNS server 2320 may transmit a DNS response to the MSE 530. According to an embodiment, the DNS response may include at least one piece of address information (e.g., URI or IP address) related to the MEC host.

At operation 3320, the MSE 530 may perform a MEC host prioritization operation. According to an embodiment, the MEC host prioritization may include, for example, configuration of IP prioritization if a plurality of IP addresses are received as the DNS query response. For example, the MSE 530 may configure the prioritization of the MEC host.

According to an embodiment, the MSE 530 may obtain (or receive) a candidate IP list of a plurality of MEC hosts from the MMP server 430, and may perform prioritization designation or access IP selection among MEC host candidate IPs and remote server (e.g., remote server 306 of FIG. 3) IP addresses from at least one of additional information of the candidate IP list (e.g., a MEC host location and user's current location, user speed, or MEC host performance (e.g., round trip time (RTT) or throughput). According to an embodiment, if the access IP is selected from the candidate IP list, any one of the MEC host IP or remote server IP may be selected. For example, if locations of all MEC hosts are apart over a predetermined distance from the user location, if the RTT value is equal to or larger than a predetermined value, or if a user movement speed is equal to or larger than a predetermined value, the remote server IP may be selected without selecting the MEC host IP. According to an embodiment, the MSE 530 (e.g., MEL 531) may select an optimum MEC host through prior performance measurement (or test) (e.g., ping probing or bandwidth estimation) with respect to a plurality of candidate MEC hosts. According to an embodiment, the DNS server 2320 may record the location information of the corresponding MEC host in the DNS response message together with the IP address of the MEC host. For example, if the location information of the MEC host is included in the location record type (e.g., LOC record type) among DNS types in the DNS response message received after the DNS query during the DNS resolving, the MSE 530 may select an adjacent MEC host using the corresponding location information. According to an embodiment, the MSE 530 may obtain location information (e.g., latitude, longitude, serving cell ID, urban information, or ID) of the MEC host from the DNS server 2320 in the DNS query operation for obtaining the IP address of the MEC host. For example, the location information of the MEC host may be included in the DNS type field.

At operation 3330, the MSE 530 may perform DNS caching with DNS cache 2310. According to an embodiment, if a DNS response including address information is received from the DNS server 2320 corresponding to the DNS query, the MSE 530 may store the address information (e.g., IP address corresponding to the URI (FQDN) related to the MEC host) included in the DNS response in a local DNS cache for MEC (e.g., DNS Cache 2). According to an embodiment, if address information (e.g., URI or IP address) for the MEC application is requested from the client application 510, the MSE 530 may transfer the address information stored in the local DNS cache for MEC. According to various embodiments, in relation to the operation of the local DNS cache (e.g., DNS Cache 2) for MEC, a scheme for separately operating the MEC local DNS cache (e.g., DNS Cache 2) of FIG. 34 to be described later or a scheme for including the MEC local DNS cache (e.g., DNS Cache 2) in the MSE 530 of FIG. 35 to operate the MEC local DNS cache may be used. The operation of operating the MEC local DNS cache according to an embodiment will be described in detail with reference to the drawing to be described later.

According to various embodiments, the electronic device 101 may receive plural pieces of MEC host information (e.g., URI or IP address) for operating the MEC application based on the MEC host selection operation. According to an embodiment, the electronic device 101 may select and communicate with any one MEC host among a plurality of MEC hosts being received. According to various embodiments, the electronic device 101 may select the plurality of MEC hosts for operating the MEC host in accordance with the prioritization. According to an embodiment, the prioritization may be determined at least based on latency measurement information between the electronic device 101 and the MEC host or location information of the MEC host.

Hereinafter, according to various embodiments, an operation will be described, in which the electronic device 101 maintains and/or manages DNS caching data for the MEC client application (e.g., MEC client Apps) separately from the DNS caching data for a general client application (e.g., general client Apps).

Figure 34:
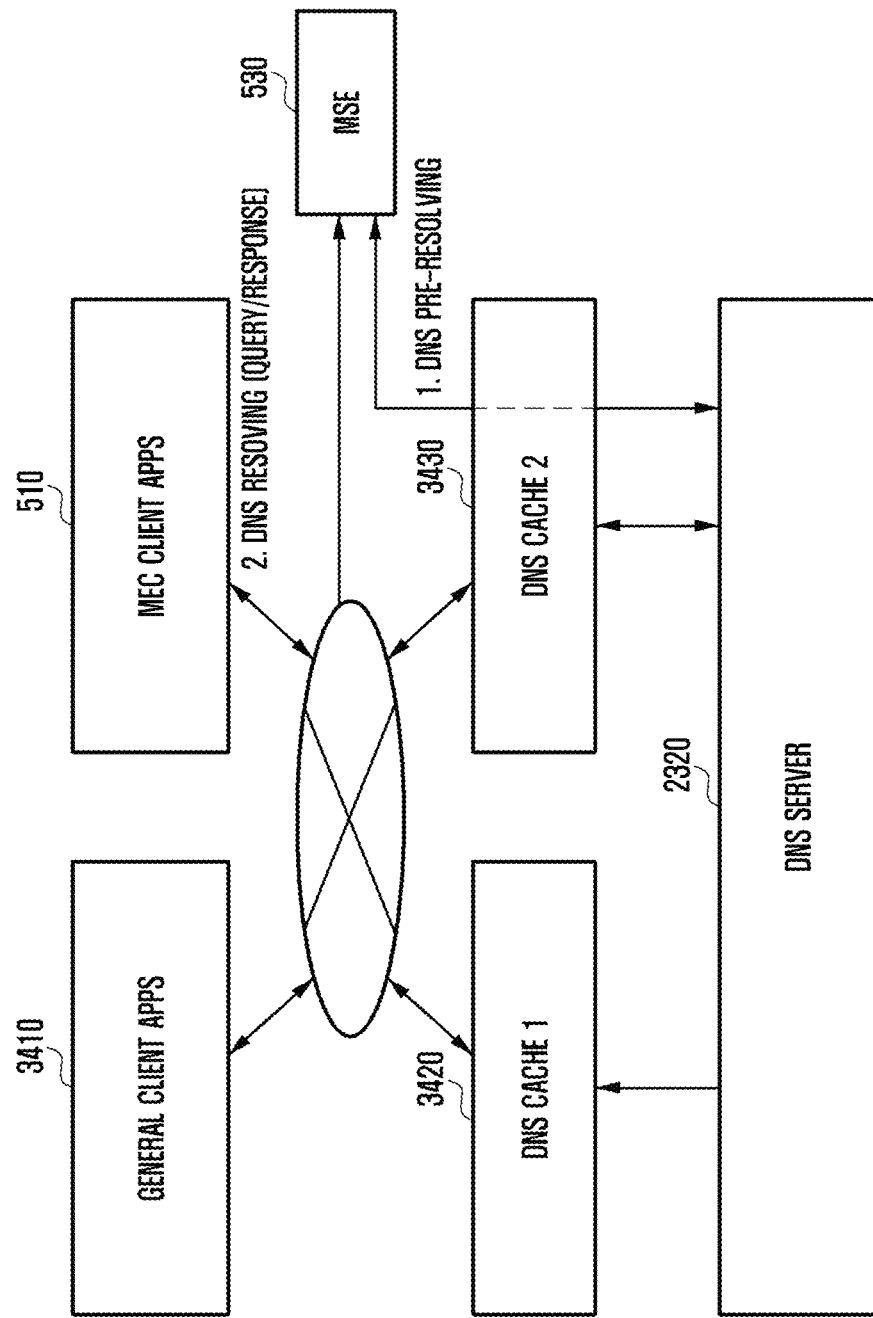
FIG. 34 is a diagram illustrating an example in which an electronic device separately operates a local DNS cache for MEC according to various embodiments.

FIG. 34 is a diagram illustrating an example in which an electronic device 101 separately operates a local DNS cache for MEC according to various embodiments.

With reference to FIG. 34, an example in which the MEC local DNS cache (e.g., second DNS cache 3430) is configured separately from the MSE 530 of the electronic device 101 will be described. According to an embodiment, a general client application (e.g., general client Apps) 3410 may perform DNS caching through the first DNS cache 3420, and the MEC client application (e.g., MEC Client Apps) 510 may perform DNS caching through the second DNS cache 3430. For example, the general client application 3410 may use the first DNS cache 3420, and the MEC client application (e.g., MEC Client Apps) may use the second DNS cache 3430.

According to an embodiment, only a request may be performed using the DNS resolving API with respect to the URI intended to access the client application, and the corresponding IP address may be received. For example, the MSE 530 (e.g., DHL 535) (or the OS of the electronic device 101 or a DNS processing module on a frame work) may change the corresponding request of the client application to a DNS query (FQDN) message to request from the DNS server 2320, receive and cache a DNS response (e.g., FQDN) to transfer the DNS response to the client application. According to an embodiment, the MSE 530 may determine what DNS cache for each client application or each URI (FQDN) is to be used by the MSE 530, and thus a separate DNS processing module (e.g., FIG. 34) or the DHL (FIG. 35) of the MSE may transfer the IP address to the client application with reference to a first DNS cache 23420 or a second DNS cache 3430. According to an embodiment, the DNS processing module or the DHL may transfer the IP corresponding to the corresponding URI with respect to the requested URI (FQDN) first with reference to the DNS cache if the IP corresponding to the URI exists, and if the cache does not exist, the DNS processing module or the DHL may perform the DNS query with respect to the DNS server 2320.

According to various embodiments, performing of the DNS caching through discrimination of the general client application 3410 and the MEC client application 510 from each other will be described in detail with reference to the drawing (e.g., FIG. 36).

Figure 35:
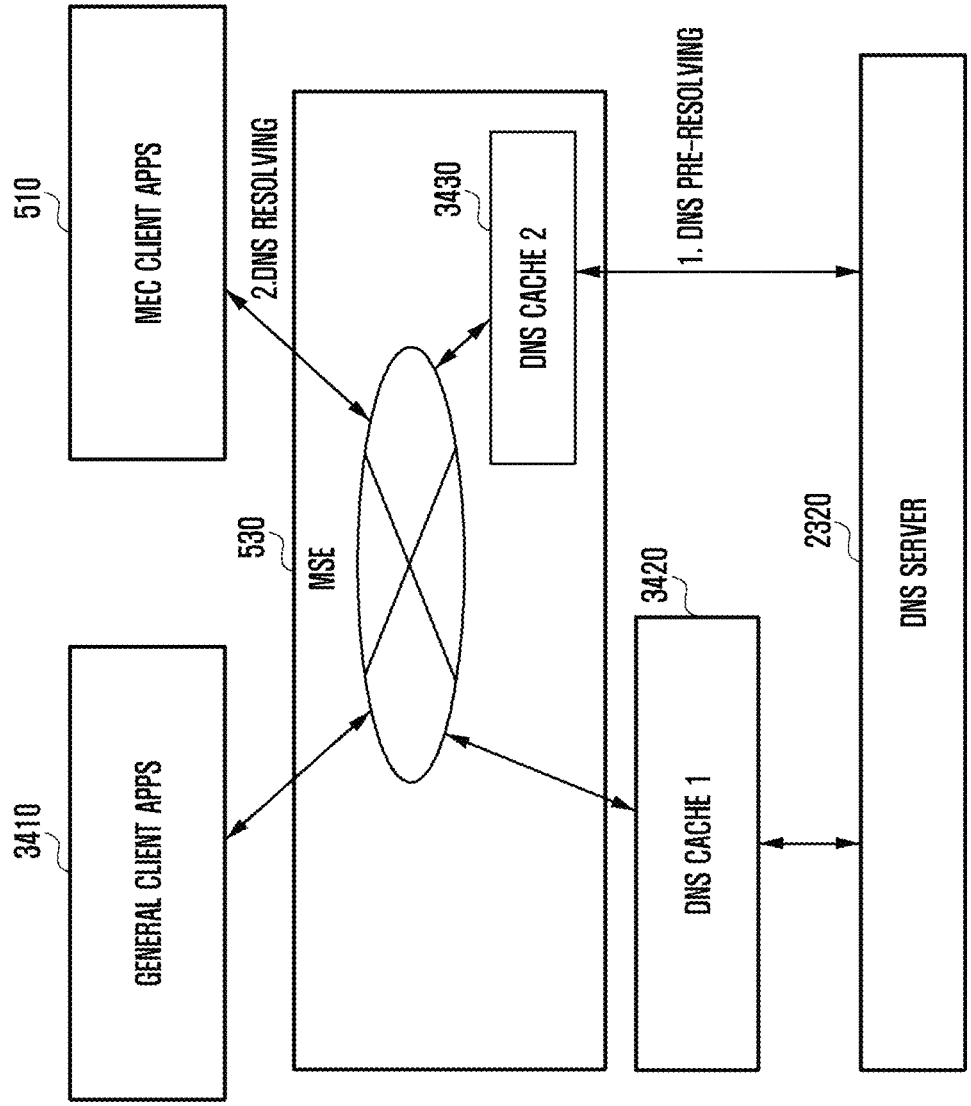
FIG. 35 is a diagram illustrating an example in which an electronic device operates a local DNS cache in MSE according to various embodiments.

FIG. 35 is a diagram illustrating an example in which an electronic device 101 operates a local DNS cache in MSE 530 according to various embodiments.

With reference to FIG. 35, an example in which the MEC local DNS cache (e.g., second DNS cache 3430) is configured within the MSE 530 of the electronic device 101 will be described. According to an embodiment, a general client application (e.g., general client Apps) 3410 may perform DNS caching through the first DNS cache 3420, and the MEC client application (e.g., MEC Client Apps) 510 may perform DNS caching through the second DNS cache 3430. For example, the general client application 3410 may use the first DNS cache 3420, and the MEC client application (e.g., MEC Client Apps) may use the second DNS cache 3430.

According to an embodiment, only a request may be performed using the DNS resolving API with respect to the URI intended to access the client application, and the corresponding IP address may be received. For example, the MSE 530 (e.g., DHL 535) (or the OS of the electronic device 101 or a DNS processing module on a frame work) may change the corresponding request of the client application to a DNS query (FQDN) message to request from the DNS server 2320, receive and cache a DNS response (e.g., FQDN) to transfer the DNS response to the client application. According to an embodiment, the MSE 530 may determine what DNS cache for each client application or each URI (FQDN) is to be used by the MSE 530, and thus a separate DNS processing module (e.g., FIG. 34) or the DHL (FIG. 35) of the MSE may transfer the IP address to the client application with reference to a first DNS cache 23420 or a second DNS cache 3430. According to an embodiment, the DNS processing module or the DHL may transfer the IP corresponding to the corresponding URI with respect to the requested URI (FQDN) first with reference to the DNS cache if the IP corresponding to the URI exists, and if the cache does not exist, the DNS processing module or the DHL may perform the DNS query with respect to the DNS server 2320.

According to various embodiments, performing of the DNS caching through discrimination of the general client application 3410 and the MEC client application 510 from each other will be described in detail with reference to the drawing (e.g., FIG. 36).

Figure 36:
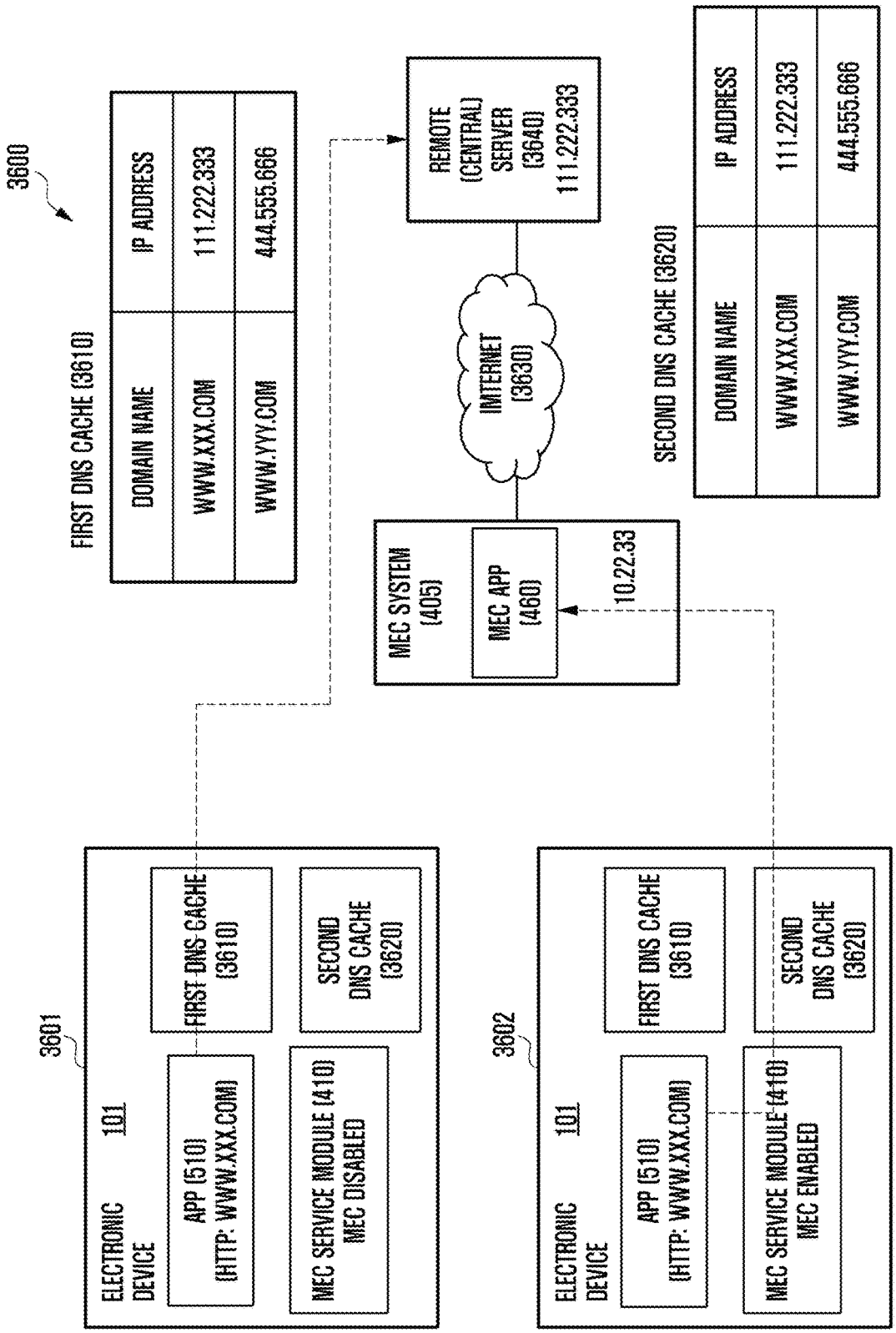
FIG. 36 is a diagram illustrating an operation using an IP address of a domain name according to various embodiments.

FIG. 36 is a diagram illustrating an operation using an IP address of a domain name according to various embodiments.

With reference to FIG. 36, in a network environment 3600 (e.g., network environment 300 of FIG. 3), a first state 3601 may indicate a state where the MEC service module 410 (e.g., MSE 530) is disabled, and a second state 3602 may indicate a state where the MEC service module 410 is enabled.

According to an embodiment, the electronic device 101 may include a first DNS cache (domain name server cache) 3610 and a second DNS cache 3620, each of which is configured to store a domain name and the IP address for the domain name. According to an embodiment, the first DNS cache 3610 may store at least one of the application name, the domain name, or the IP address for the domain name of a general application, and the second DNS cache 3620 may store at least one of the application name, the domain name, or the IP address for the domain name of a MEC application 460. According to an embodiment, because the electronic device 101 accesses the IP address mapped to the domain name, the domain name and the IP address for the domain name may be stored in pairs.

According to an embodiment, the MEC service module 410 may obtain the domain name of an application from a proxy server (e.g., MMP server 430 of FIG. 4 (or LCM proxy server) or a separate proxy server). For example, the domain name may include at least one of fully qualified domain name (FQDN) or URI. According to an embodiment, the MEC service module 410 may obtain the domain name in a discovery procedure.

According to an embodiment, the MEC service module 410 may obtain the IP address for the domain name based on the domain name. If the obtained IP address is an IP address for the domain name capable of accessing the MEC application supporting the MEC service, the MEC service module 410 may store the IP address in the second DNS cache 3620.

According to an embodiment, if the MEC service module 410 is in a disabled state (e.g., the first state 3601) in case that the application (e.g., client application 510) attempts to access a domain name (e.g., http:www.xxx.com), the application 510 may access a remote (or central) server 3640 connected through Internet 3630 using the IP address (e.g., 111.222.333) of the domain name stored in the first DNS cache 3610. For example, if the MEC service module 410 is disabled, it may convert the domain name into an IP address with reference to the IP address (e.g., 111.222.333) stored in the first DNS cache 3610. If the IP address corresponding to the domain name to be accessed by the application 510 is not present in the first DNS cache 3610, the MEC service module 410 may request the IP address from a separate server (e.g., DNS server).

According to an embodiment, if the MEC service module 410 is enabled (e.g., in the second state 3602), the MEC service module 410 may convert the domain name to be accessed by the application 510 into the IP address (e.g., 10.22.33) corresponding to the domain name with reference to the second DNS cache 3620, and may guide the application 510 to access the MEC application 460 included in the MEC system 405 through the converted IP address. If the IP address corresponding to the domain name to be accessed by the application 510 is not present in the second DNS cache 3620, the MEC service module 410 may request the IP address from a separate server (e.g., DNS server).

Figure 37:
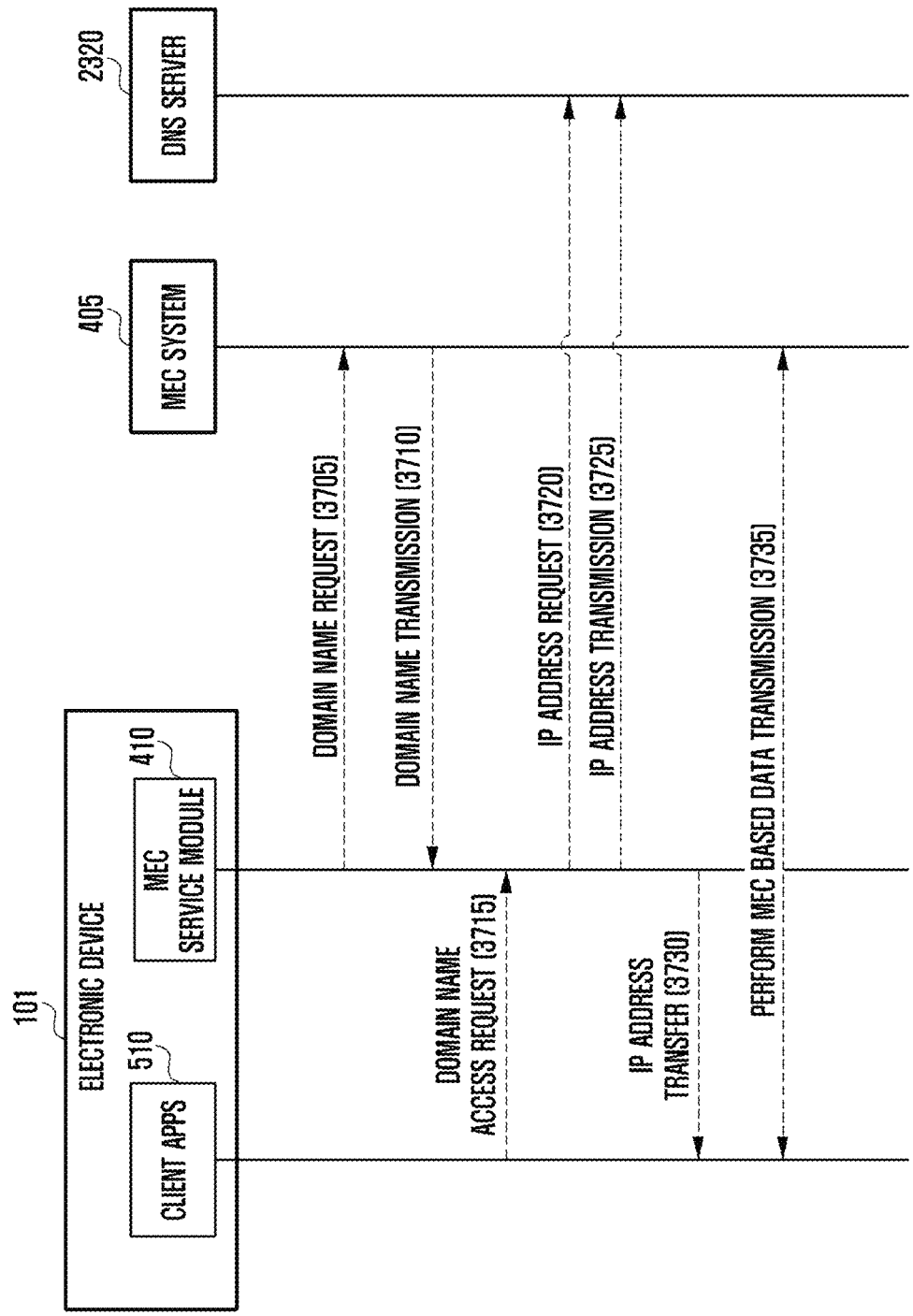
FIG. 37 is a signal flowchart for sharing an IP address according to various embodiments.

FIG. 37 is a signal flowchart 3700 for sharing an IP address according to various embodiments.

With reference to FIG. 37, a DNS server 2320 may be an entity independent of the MEC system 405, and may be included in the MEC system 405.

At operation 3705, the MEC service module 410 may request the domain name for the application (e.g., client application 510) from the MEC system 405 (e.g., MMP server of FIG. 4 (or LCM proxy server)). For example, the domain name may include FQDN. According to an embodiment, the MEC service module 410 may request the address of the DNS server 2320 together with the domain name for the application 510.

At operation 3710, the MEC system 405 may transmit information including the domain name to the MEC service module 410. According to an embodiment, the MEC system 405 may transmit the address of the DNS server 2320 to the MEC service module 410 together with the domain name.

According to an embodiment, operation 3705 and operation 3710 may be included in a MEC discovery procedure. For example, the MEC service module 410 may request the domain name together with information about applications that can be provided by the MEC system 405. As another example, the MEC service module 410 may request the domain name independently of the information about applications that can be provided by the MEC system 405 in the MEC discovery procedure. The MEC system 405 may transmit the domain name and the information about applications that can be provided by the MEC system 405 together or separately.

According to another embodiment, the MEC service module 410 may perform operation 3705 and operation 3710 independently of the MEC discovery procedure. For example, the MEC service module 410 may perform operation 3705 and operation 3710 if the application 510 is installed in the electronic device 101, if an event related to the mobility of the electronic device 101 is detected, if it is detected that the application 501 satisfies the first condition of FIG. 20, or in accordance with a designated cycle.

At operation 3715, the application 510 may request the access to the domain name. According to an embodiment, operation 3715 may be called a DNS query. According to an embodiment, because the application 510 requires the IP address for the MEC application 460 to perform MEC based data transmission with the MEC application (e.g., MEC application 460 of FIG. 36), the DNS query may be performed for this.

According to an embodiment, the MEC service module 410 may or may not perform operations 3720 to 3725 based on information included in the DNS query and/or information stored in a second DNS cache (e.g., second DNS cache 3620 of FIG. 36). For example, the MEC service module 410 may identify at least one of the application names or the domain name stored in the second DNS cache 3620 corresponding to at least one of the application name included in the DNS query or the domain name (e.g., FQDN or URI).

According to an embodiment, if the IP address corresponding to at least one of the identified application name or the identified domain name is present in the second DNS cache 3620, the MEC service module 410, at operation 3730, may transfer the IP address to the application 510.

According to an embodiment, if the IP address corresponding to at least one of the identified application name or the identified domain name is not present in the second DNS cache 3620, the MEC service module 410, at operation 3720, may request the IP address for the MEC application from the DNS server 2320. For example, the message (or data packet) transmitted at operation 3720 may include the domain name received from the MEC system 405 at operation 3710. At operation 3725, the DNS server 2320 may transmit the IP address for the MEC application to the MEC service module 410. At operation 3730, the MEC service module 410 may transfer the received IP address to the application 510.

According to an embodiment, FIG. 37 illustrates an embodiment in which the MEC service module 410 requests the IP address in response to the DNS query operation. However, according to other embodiments, the MEC service module 410 may request the IP address from the DNS server 2320 independently of the DNS query. In this case, because the domain name for the MEC application is required for the MEC service module 410 to request the IP address, the MEC service module 410 may request the IP address after operation 3710. For example, the MEC service module 410 may request the IP address through the context create operation.

At operation 3735, the application 510 may perform data transmission with the MEC application included in the MEC system 405 using the IP address transferred from the MEC service module 410.

According to various embodiments, the electronic device 101 may collectively manage the IP addresses of a plurality of ME applications corresponding to a plurality of applications through the MEC service module 410, and thus resource consumption can be reduced, and stable service can be provided.

Figure 38:
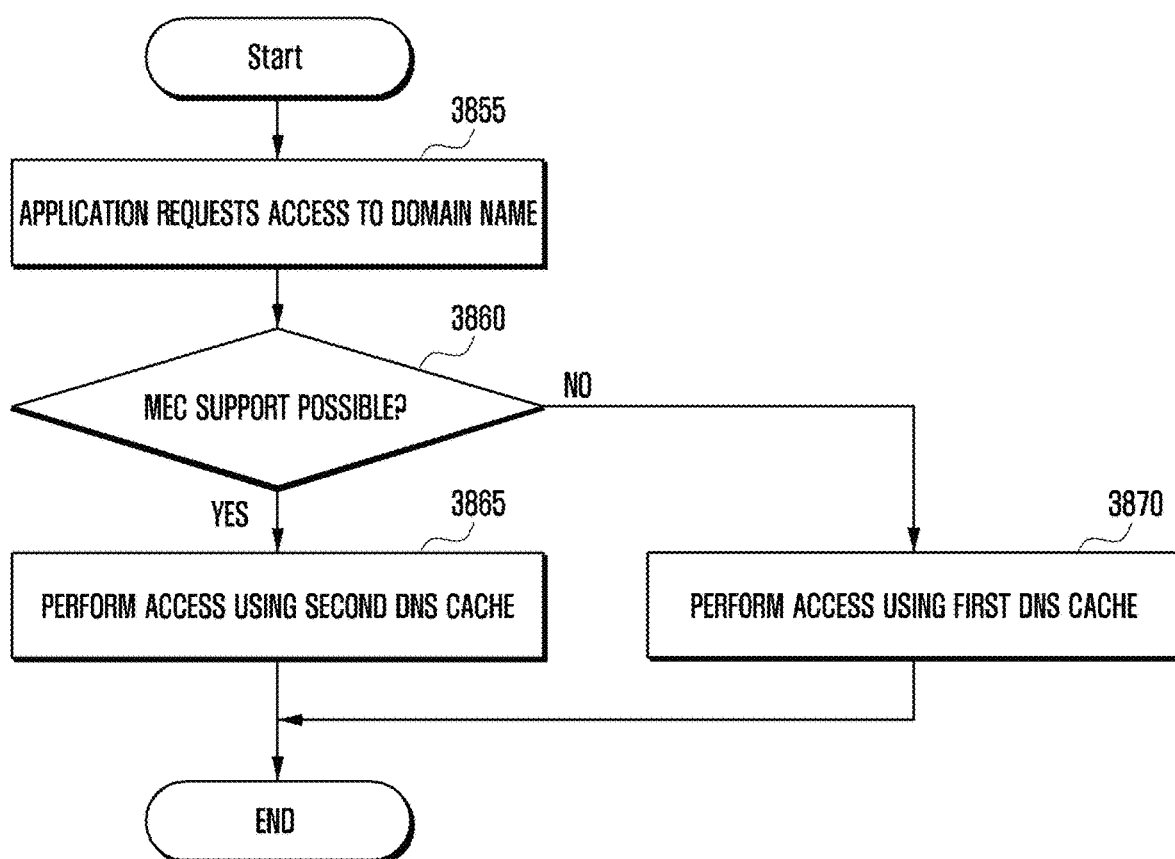
FIG. 38 is a flowchart illustrating a method by an electronic device for using an IP address of a domain name according to various embodiments.

FIG. 38 is a flowchart illustrating a method by an electronic device 101 for using an IP address of a domain name according to various embodiments.

According to various embodiments, operations illustrated in FIG. 38 may be performed by the electronic device 101, a constituent element (e.g., processor 120 of FIG. 1) included in the electronic device 101, or a MEC service module 410 of FIG. 4.

With reference to FIG. 38, at operation 3855, the electronic device 101 (e.g., MEC service module 410) may detect that the application (e.g., client application 510) request an access to a domain name (e.g., operation 3715 of FIG. 37).

At operation 3860, the electronic device 101 may identify whether the domain name to which the application 510 requests an access can support the MEC. For example, the electronic device 101 may identify whether the domain name to which the application 510 requests an access can support the MEC based on the information received through the discovery procedure.

At operation 3860, if the access-requested domain name can support the MEC (e.g., YES at operation 3860), the electronic device 101, at operation 3865, may access the domain name using the second DNS cache 3820.

At operation 3860, if the access-requested domain name cannot support the MEC (e.g., NO at operation 3860), the electronic device 101, at operation 3870, may access the domain name using the first DNS cache 3610.

Figure 39:
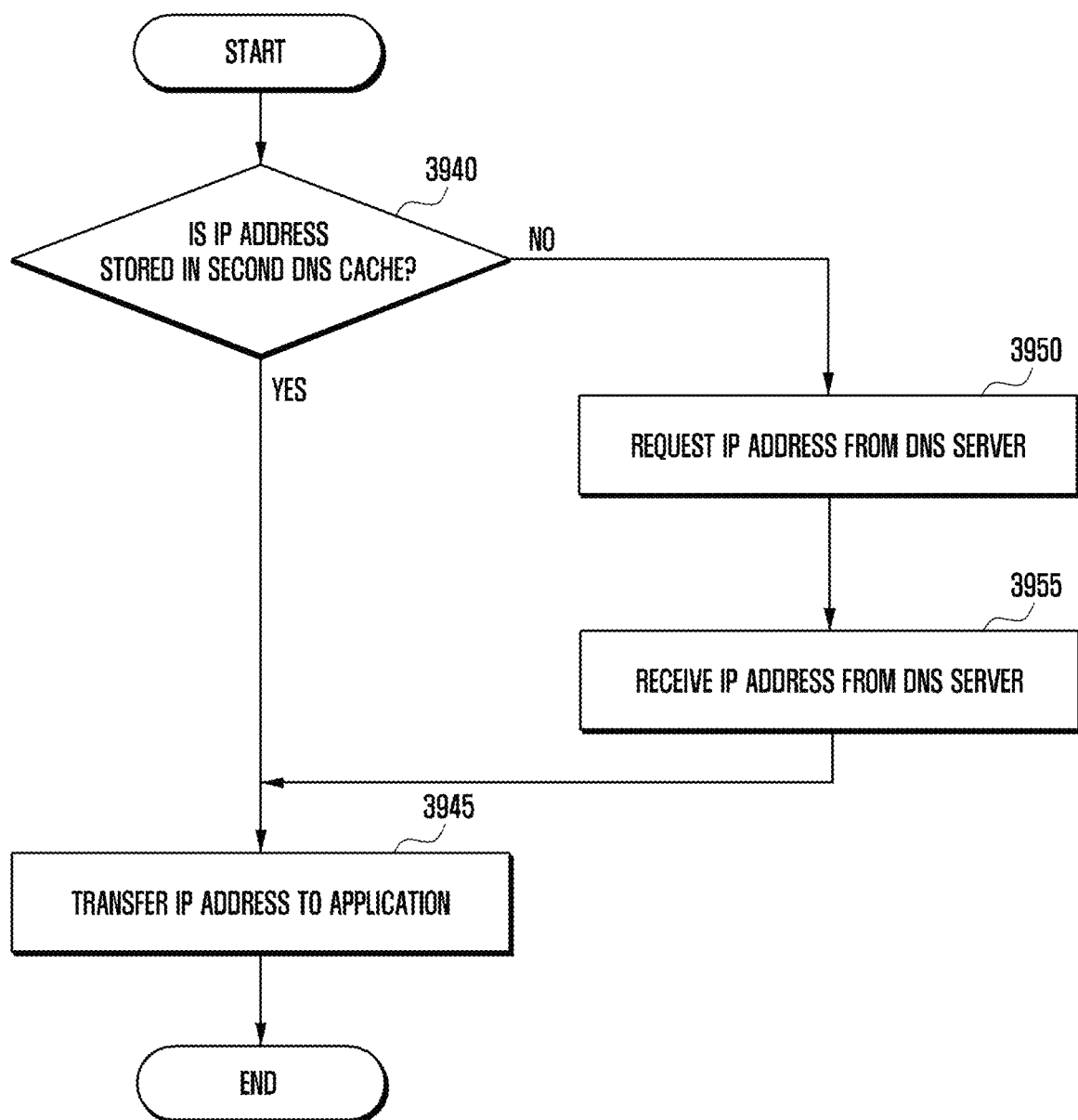
FIG. 39 is a flowchart illustrating a method by an electronic device for requesting an IP address according to various embodiments.

FIG. 39 is a flowchart illustrating a method by an electronic device 101 for requesting an IP address according to various embodiments.

According to various embodiments, operations illustrated in FIG. 39 may be performed by the electronic device 101 or a constituent element (processor 120 of FIG. 1 or MEC service module 410 of FIG. 4) included in the electronic device 101.

With reference to FIG. 39, at operation 3940, the MEC service module 410 may identify whether an IP address for an MEC application is stored in the second DNS cache 3620.

At operation 3940, if the IP address is stored in the second DNS cache 3620 (e.g., YES at operation 3940), the MEC service module 410, at operation 3945, may transfer the IP address stored in the second DNS cache 3620 to the application 510.

At operation 3940, if the IP address is not stored in the second DNS cache 3620 (e.g., NO at operation 3940), the MEC service module 410, at operation 3950, may request the IP address from the DNS server 2320.

At operation 3955, the MEC service module 410 may receive the IP address from the DNS server 2320. According to an embodiment, before performing operation 3945, the MEC service module 410 may temporarily store the received IP address in the second DNS cache 3620. According to an embodiment, if the MEC service module 410 includes information indicating a validity period together with the IP address, the MEC service module 410, at operation 3955, may store the IP address in the second DNS cache 3620 during the validity period indicated by the information.

At operation 3945, the MEC service module 410 may transfer the IP address stored in the second DNS cache 3620 to the application 510.

Figure 40:
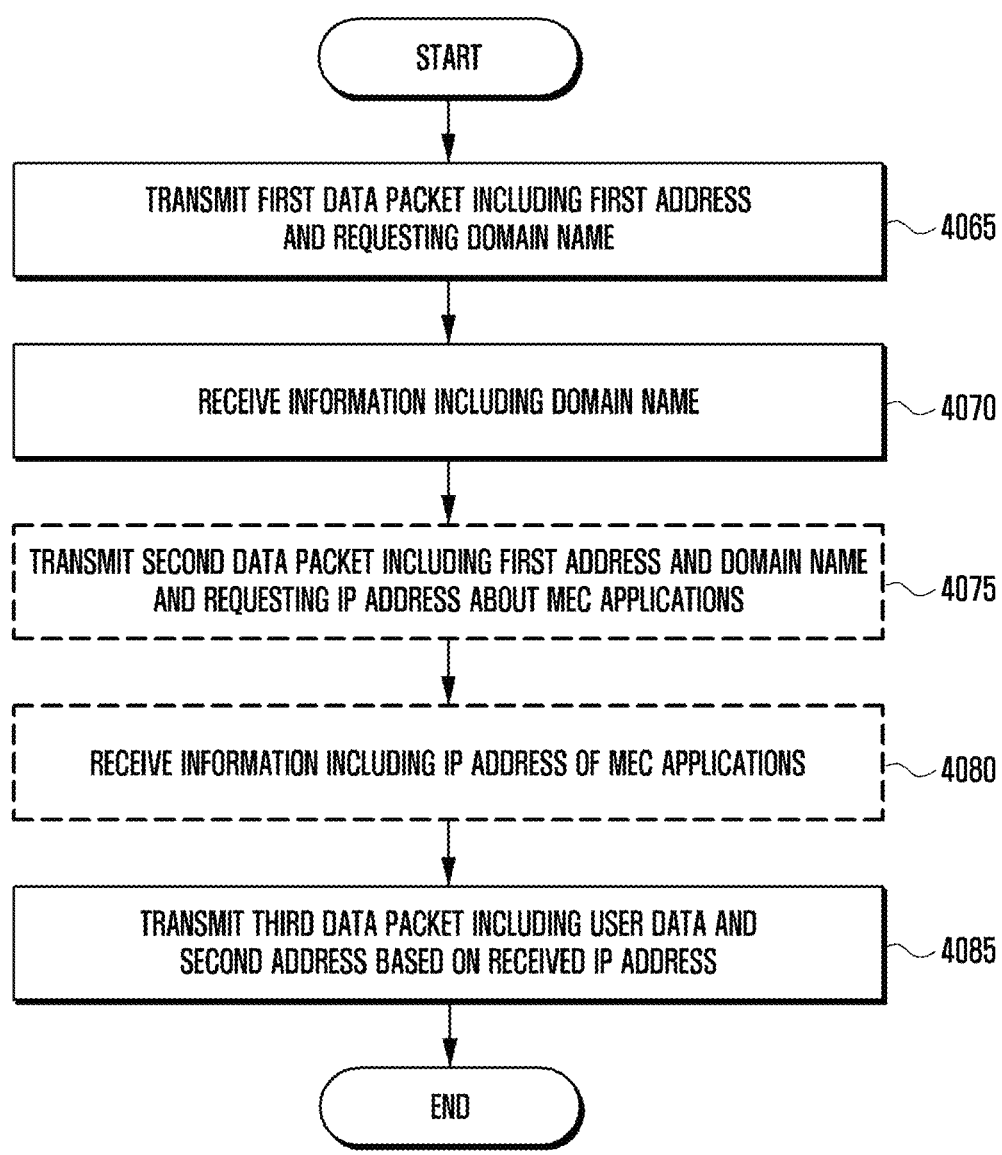
FIG. 40 is a flowchart illustrating a method by an electronic device for performing MEC based data transmission using an IP address according to various embodiments.

FIG. 40 is a flowchart illustrating a method by an electronic device 101 for performing MEC based data transmission using an IP address according to various embodiments.

According to various embodiments, operations illustrated in FIG. 40 may be performed by the electronic device 101 or a constituent element (e.g., processor 120 of FIG. 1 or MEC service module 410 of FIG. 4) included in the electronic device 101.

With reference to FIG. 40, at operation 4065, the electronic device 101 may transmit a first data packet, which includes a first data packet including a first address related to the MEC service module 410 (e.g., MSE 530) and which requests a domain name to at least one external server (e.g., NEC system 405 (or edge server or MEC server)). According to an embodiment, the first address may include the IP address of the electronic device 101 and an IP port identification related to the MEC service module 410. According to an embodiment, the domain name may be a domain name related to a MEC application (e.g., MEC application 460 of FIG. 36) included in the external server.

According to an embodiment, the electronic device 101 may transmit the first data packet in response to a case where the application 510 requests an access to the MEC application 510. For example, if the application 510 is installed in the electronic device 101 or if a user input to request execution of the application 510 is received, the application 510 may request the access to the MEC application. According to another embodiment, the electronic device 101 may transmit the first data packet in the MEC discovery procedure. According to another embodiment, if the mobility of the electronic device 101 is detected or if the application 510 satisfies a condition (e.g., first condition of FIG. 20) capable of performing MEC based data transmission, the electronic device 101 may transmit the first data packet. According to another embodiment, the electronic device 101 may transmit the first data packet at a designated cycle.

At operation 4070, the electronic device 101 may receive information including the domain name from at least one external server. For example, the domain name may be a domain name related to the MEC applications.

At operation 4075, the electronic device 101 may transmit a second data packet, which includes a first address and the domain name related to MEC applications and which requests the IP address for the domain name, to at least one external server (e.g., the DNS server 2320).

According to an embodiment, the electronic device 101 may transmit the second data packet in the MEC discovery procedure, or may transmit the second data packet if the mobility of the electronic device 101 is detected, if the first condition is satisfied, or at a designated cycle.

At operation 4080, the electronic device 101 may receive information including the IP address for the domain name from at least one external server.

At operation 4085, the electronic device 101 may transmit a third data packet including user data and the second address to at least one external server (e.g., partial constituent element of the MEC system 405). The second address may include the IP address of the electronic device 101 and an IP port identification related to the application 510. According to an embodiment, the IP port identification related to the application 510 may be different from the IP port identification related to the MEC service module 410.

According to another embodiment, if the IP address for the domain name related to the MEC application is pre-stored in the electronic device 101, the electronic device 101 may omit operation 4075 and operation 4080, and may perform operation 4085.

Figure 41:
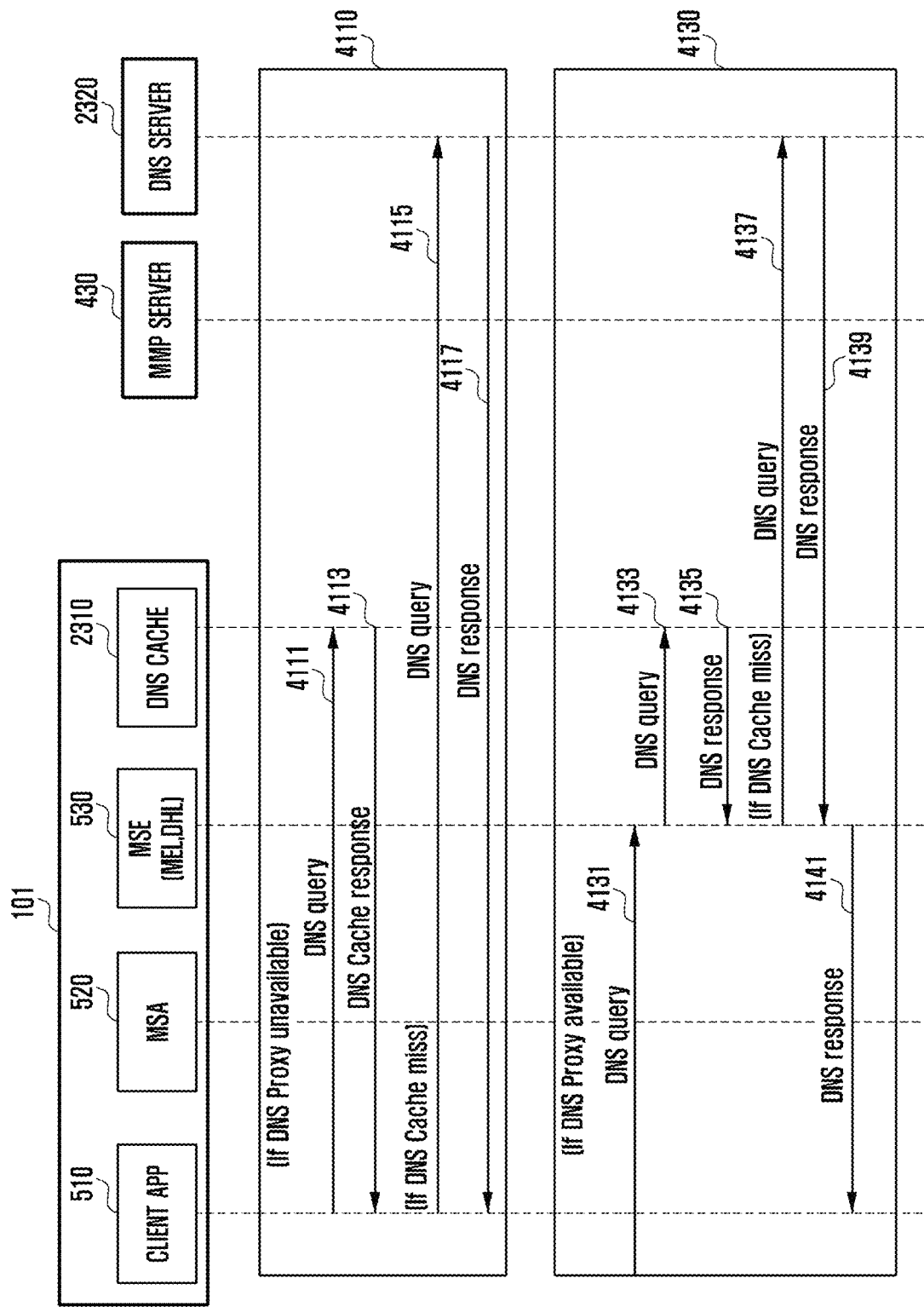
FIG. 41 is a diagram illustrating an example of a DNS resolving operation in a discovery procedure according to various embodiments.

FIG. 41 is a diagram illustrating an example of a DNS resolving operation in a discovery procedure according to various embodiments.

As illustrated, FIG. 41 may show the DNS resolving operation for the DNS query of the client application 510. According to an embodiment, the DNS resolving operation may include an operation (e.g., operation 4110) in case that the DNS server 2320 is in a deactivate state and an operation (e.g., operation 4130) in case that the DNS server 2320 is in an activate state.

According to an embodiment, the DNS resolving operation at operation 4110 may indicate, for example, an operation example in a state where the MEC local DNS cache (e.g., second DNS cache 3430) is in a deactivate state in the DNS cache 2310. With reference to FIG. 41, the client application 510 may transfer (operation 4111) the DNS query for the URI to the DNS cache 2310, and the DNS cache 2310 may transfer (operation 4113) a response (e.g., DNS cache response) to the DNS query of the client application 510 to the client application 510. According to an embodiment, the DNS cache 2310 may store at least one of an application name of the MEC application, domain name, or an IP address for the domain name. According to an embodiment, if the IP address of the MEC application of the corresponding URI does not exist (e.g., DNS cache miss) in the DNS cache 2310 during the DNS query for the URI of the client application 510, the client application 510 may transfer (operation 4115) the DNS query to the DNS server 2320, and may obtain the IP address based on a response 4117 corresponding to the DNS query from the DNS server 2320.

According to an embodiment, the DNS resolving operation at operation 4130 may indicate, for example, an operation example in a state where the MEC local DNS cache (e.g., second DNS cache 3430) is in an activate state in the DNS cache 2310. With reference to FIG. 41, the client application 510 may transfer (operation 4131 or operation 4133) the DNS query for the URI to the DNS cache 2310 through the MSE 530. According to an embodiment, the DNS cache 2310 may transfer (operation 4135) the DNS response to the DNS query to the MSE 530. According to an embodiment, if the IP address of the MEC application of the corresponding URI does not exist (e.g., DNS cache miss) in the DNS cache 2310 during the DNS query for the URI of the client application 510, the MSE 530 may transfer (operation 4137) the DNS query to the DNS server 2320, receive (operation 4139) a response corresponding to the DNS query from the DNS server 2320, and forward (operation 4141) the received response to the client application 510.

According to an embodiment, if the IP address of the MEC application of the corresponding URI exists in the DNS cache 2310 during the DNS query for the URI of the client application 510, it is possible to access the MEC application with the corresponding address. According to an embodiment, in case of the DNS cache miss in the DNS resolving, it is possible to access a remote server (e.g., remote server 306 of FIG. 3) or a client App-driven MEC application through the DNS resolving. According to an embodiment, if there is a DNS proxy in the DNS resolving, the DNS proxy may perform the DNS resolving in accordance with the NEC App list by hooking the DNS query of the client application.

According to an embodiment, the MSE 530 may support the DBS ore-resolving or DNS proxy function to the $3^{rd}$ party application (party application). For example, if the MEC client application 510 performs the DNS query for accessing a specific service in a state where the data connection is made through the existing basic PDU session, the DNS proxy may query the DNS server 2320 with the domain name for MEC by hooking the DNS query, or the DNS cache 2310 may return the corresponding MEC domain IP address through the lookup. Through this, the $3^{rd}$ party application may provide the MEC service without separate software correction and without separate traffic filtering (or steering) work of an operator.

FIG. 42 is a diagram illustrating an example of a service close operation in a discovery procedure according to various embodiments.

As illustrated, FIG. 42 may show an operation example in which the MEC discovery procedure performs MEC service close (e.g., MEC application context delete) operation. According to an embodiment, the application context delete operation may be performed, for example, in a manner that if the client application 510 is stopped, the MSA 520 transfers an App stop event to the MSE 530 through the MSE API. According to various embodiments, the application context delete may be performed in case that the use of the client application is stopped (first case), or the client application request context delete (e.g., contextDelete) is requested directly through the MSE API (second case). FIG. 42 may indicate an operation example of performing the application context delete in accordance with the first case.

With reference to FIG. 42, at operation 4201, if a specific client application 510 is stopped (e.g., App step detected), the corresponding client application 510 may provide information (e.g., App Stop) notifying of the usage end of the application to the MSA 520.

At operation 4203, if information notifying of the end of the client application 510 is received, the MSA 520 may provide a notification message (e.g., notifyClientAppState) for notifying of the state of the client application 510 to the MSE 530. According to an embodiment, the notification message (e.g., notifyClientAppState) may include, for example, the state (e.g., STOP) of the client application and the client application name (e.g., clientAppName) (and/or UID) to provide, for example, notifyClientAppState (STOP, clientAppName).

At operation 4205, the MSE 530 may receive the notification message (e.g., notifyClientAppState) from the MSA 520, and may perform the application context delete operation based on information of the received notification message. According to an embodiment, the application context delete operation (operation 4205) may include operation 4210, operation 4220, and operation 4230.

At operation 4210, the MSE 530 may transmit a request message for requesting the application context delete (e.g., HTTP DELETE AppContext Data) to the MMP server 430. According to an embodiment, if several client applications are stopped once at a time (e.g., power off or network off), the MSE 530 may repeat transmission of the context delete request to the MMP server 430 several times, or may include several pieces of context information (e.g., Context Info) in one context delete request to be transmitted to the MMP server 430.

At operation 4220, the MMP server 430 may provide a response message (e.g., HTTP OK 204 No Content) to the MSE 530 as a response corresponding to the request message received from the MSE 530. According to an embodiment, the MMP server 430 may end the MEC application of which the context delete is requested in the MEC application being driven, and may include the result (e.g., No content) in the response message to be provided to the MSE 530.

At operation 4230, the MSE 530 may perform a PDU session release. According to an embodiment, the MSE 530 may perform release of the corresponding PDU session if needed (e.g., PDU session release is needed) after requesting the context delete from the MMP server 430. For example, the URSP rule (or CARP rule) may be received as the result of the authentication procedure (e.g., the MSA 520 receives and transfers the result to the MSE 530), or may be received by the MSE 530 as the result of the application lookup (e.g., App lookup) or the result of the context create, and if a new DNN rule is set in the URSP rule, the PDU session setup may be performed. According to an embodiment, if the MSE 530 requests the PDU session setup (e.g., PDU session establishment of FIG. 17 and PDU session release of FIG. 18) from the modem 1700 as described above with reference to FIG. 17 or FIG. 18, the modem 1700 may establish/release the PDU session setup by requesting from the SMF of a 5G network (or core network).

FIG. 43 is a diagram illustrating an example of a service close operation in a discovery procedure according to various embodiments.

As illustrated, FIG. 43 may show an operation example in which the MEC discovery procedure performs MEC service close (e.g., MEC application context delete) operation. According to an embodiment, the application context delete operation may be performed, for example, in a manner that the client application 510 transfers the context delete request to the MSE 530 through the MSE API. According to various embodiments, the application context delete may be performed in case that the use of the client application is stopped (first case), or the client application request context delete (e.g., contextDelete) is requested directly through the MSE API (second case). FIG. 43 may indicate an operation example of performing the application context delete in accordance with the second case.

With reference to FIG. 43, at operation 4301, the client application 510 may transfer a message (e.g., contextDelete) for deleting the context to the MSE 530. According to an embodiment, if the usage is ended, the client application 510 may transfer the contest delete request to the MSE 530 through the MSE API together with information related to the corresponding client application (e.g., application name (e.g., appName) or UID).

At operation 4303, the MSE 530 may receive a message for deleting the context from the client application 510, and may perform the application context delete operation based on the information (e.g., application name) of the received message. According to an embodiment, the application context delete operation (operation 4303) may include operation 4310, operation 4320, and operation 4330. According to an embodiment, the application context delete operation (operation 4303) may correspond to the description of operation 4210, operation 4220, and operation 4230 in accordance with the application context delete procedure at operation 4205 of FIG. 42 as described above.

It will be understood that the embodiments of the disclosure as disclosed in the description and drawings are specific examples to help easy understanding of the technical contents according to the embodiments of the disclosure and do not limit the scope of the embodiments of the disclosure. Accordingly, the scope of the disclosure is defined by the appended claims, and it will be construed that all corrections and modifications derived from the meanings and scope of the following claims and the equivalent concept fall within the scope of the disclosure.

What is claimed is:

1. A portable communication device for supporting an edge computing (EC) service, the portable communication device comprising:
 a communication circuitry;
 memory configured to store a service enabler for supporting the EC service, a first application and instructions; and
 a processor operatively connected to the communication circuitry and the memory,
 wherein the instructions, when executed, cause the processor to be operable to control to:
  obtain, using the service enabler, a list of at least one second application corresponding to a host server from an external server when the first application is executed, wherein the at least one second application is associated with the first application and can support the EC service by the host server,
  select a second application from the list of the at least one second application corresponding to the host server, and
  connect, through the communication circuitry, with the host server to operate the EC service.

2. The portable communication device of claim 1, wherein the first application is operable to control to perform one or more functions corresponding to the second application that can be executed by the host server through the portable communication device, and
 wherein the instructions further cause the processor to be operable to control to provide information on the second application to the first application.

3. The portable communication device of claim 1, wherein the instructions further cause the processor to be operable to control to:
 transmit, to the external server through the communication circuitry, a request for the list, and
 receive, from the external server through the communication circuitry, the list.

4. The portable communication device of claim 3, wherein the instructions further cause the processor to be operable to control to transmit the request for the list to the external server, if the portable communication device is changed to be connected from another base station to a base station through which the portable communication device is connected to the external server or the host server.

5. The portable communication device of claim 3, wherein the instructions further cause the processor to be operable to control to transmit, to the external server, a parameter for use in selecting one or more second applications corresponding to the list as at least a part of the request.

6. The portable communication device of claim 5, wherein the instructions further cause the processor to be operable to control to transmit, to the external server, at least one of a device type of the portable communication device, location information of the portable communication device, a service type that can be provided from the second application, or information related to one or more applications stored in the memory as at least a part of the parameter.

7. The portable communication device of claim 1, wherein the instructions further cause the processor to be operable to control to:
 receive a request for a domain name system (DNS) query from the first application; and
 select a domain name or an IP address corresponding to the second application as information related to the second application to be provided to the first application in response to the DNS query.

8. The portable communication device of claim 1, wherein the host server comprises a first EC host server and a second EC host server, and
 wherein the instructions further cause the processor to be operable to control to:
 receive, from the external server, first server information corresponding to the first EC host server and second server information corresponding to the second EC host server as at least a part of the list;
 select one server information from the first server information and the second server information based on at least a part of a designated priority, the designated priority is determined at least based on latency measurement information between the portable communication device and the host server or location information of the host server; and
 transmit data to the host server, which corresponds to the one server information selected from the first EC host server and the second EC host server, as at least a part of an operation of connecting.

9. The portable communication device of claim 1, wherein the instructions further cause the processor to be operable to control to receive a domain name corresponding to the second application as at least a part of the list.

10. The portable communication device of claim 1, wherein the instructions further cause the processor to be operable to control to transmit, to the external server, a request for the host server to enable the second application using the service enabler before an operation of connecting.

11. The portable communication device of claim 1, wherein the communication circuitry is operable to control to perform a communication connection between the portable communication device, the host server located outside the portable communication device, the external server, or a remote server through a base station; and
 wherein the instructions further cause the processor to be operable to control to:
 transmit a request for the list to the external server using the service enabler while the portable communication device is connected to the base station through the communication connection set using the communication circuitry;
 receive a response including the list from the external server using the service enabler;
 determine, using the service enabler, that the received list includes first information corresponding to the second application that corresponds to one or more functions that the first application is operable to control to perform;

provide the first information corresponding to the second application or second information obtained based on the first information to the first application in case that the first information is determined to be included in the received list using the service enabler; and transmit data generated by the first application to the host server based on the information provided to the first application between the first information and the second information.

12. The portable communication device of claim 1, wherein the instructions further cause the processor to be operable to control to:

perform a context create operation for searching the host server including the second application corresponding to the first application.

13. The portable communication device of claim 12, wherein the instructions further cause the processor to be operable to control to:

activate the context create operation based on detection of an execution of the first application.

14. The portable communication device of claim 13, wherein the instructions further cause the processor to be operable to control to:

if the execution of the first application is detected, obtain second application related information intended to be accessed in association with the first application from the external server based on the list.

15. The portable communication device of claim 1, wherein the instructions further cause the processor to be operable to control to:

if the execution of the first application is detected, select the host server for executing the second application based on a pre-set priority.

16. The portable communication device of claim 15, wherein the instructions further cause the processor to be operable to control to:

select an optimum host server based on at least one of location of the host server and user's current location, user movement speed, or performance of the host server.

17. A method of operating a portable communication device for supporting an edge computing (EC) service, the method comprising:

obtaining a list of at least one second application corresponding to a host server from an external server when a first application is executed, wherein the at least one second application is associated with the first application and can support the EC service by the host server;

selecting a second application from the list of the at least one second application corresponding the host server; and connecting, through a communication circuitry, with the host server to operate the EC service.

18. The method of claim 17, further comprising:

transmitting, to the external server, a parameter for use in selecting one or more second applications corresponding to the list as at least a part of a request for the list, and wherein the parameter comprises at least one of a device type of the portable communication device, location information of the portable communication device, a service type that can be provided from the second application, or information related to one or more applications stored in a memory.

19. The method of claim 17, further comprising:

receiving a request for a domain name system (DNS) query from the first application; and selecting a domain name or an IP address corresponding to the second application as information related to the second application to be provided to the first application in response to the DNS query.

20. A non-transitory computer-readable recording medium having recorded thereon at least one program including commands which when executed cause a portable communication device to perform operations including a method for supporting an edge computing (EC) service, the method comprising:

obtaining a list of at least one second application corresponding to a host server from an external server when a first application is executed, wherein the at least one second application is associated with the first application and can support the EC service by the host server;

selecting a second application from the list of the at least one second application corresponding the host server; and connecting, through a communication circuitry, with the host server to operate the EC service.

* * * * *